US006179030B1

(12) United States Patent
Rietheimer

(10) Patent No.: US 6,179,030 B1
(45) Date of Patent: Jan. 30, 2001

(54) APPARATUS AND METHOD FOR CONFIGURING, LOCATING, AND APPLYING INFORMATION TO A LABEL, AND PRINTING AND APPLYING LABELS TO ARTICLES

(75) Inventor: William R. Rietheimer, Cashmere, WA (US)

(73) Assignee: Automated Systems Technology, L.L.C., Cashmere, WA (US)

(*) Notice: Under 35 U.S.C. 154(b), the term of this patent shall be extended for 0 days.

(21) Appl. No.: 09/124,103

(22) Filed: Jul. 28, 1998

(51) Int. Cl.[7] .................. B32B 31/20

(52) U.S. Cl. .................. 156/360; 156/361; 156/362; 156/363; 156/542

(58) Field of Search .................. 156/DIG. 5, DIG. 49, 156/DIG. 28, DIG. 30, 64, 277, 302, 350, 360, 362, 363, 367, 384, 361, DIG. 44, DIG. 45, 541, 542, 540; 101/483, 485, 486

(56) References Cited

U.S. PATENT DOCUMENTS

| | | | |
|---|---|---|---|
| 3,616,050 | 10/1971 | Schrotz | 156/358 |
| 4,129,473 | 12/1978 | Perret | 156/364 |
| 4,194,941 | 3/1980 | Briggs et al. | 156/361 |
| 4,294,644 | 10/1981 | Anderson | 156/361 |
| 4,328,063 | 5/1982 | Ingalls | 156/361 |
| 4,386,860 | 6/1983 | Price et al. | 400/124 |
| 4,488,925 | 12/1984 | Craig et al. | 156/351 |
| 4,519,868 | 5/1985 | Hoffman | 156/353 |
| 4,552,608 | 11/1985 | Hoffman et al. | 156/351 |
| 4,561,921 * | 12/1985 | Treiber | 156/297 |
| 4,583,644 | 4/1986 | Niemann | 209/660 |
| 4,584,047 | 4/1986 | Vanderpool et al. | 156/361 |
| 4,615,757 * | 10/1986 | Treiber | 156/350 |
| 4,896,493 | 1/1990 | Briggs et al. | 221/73 |
| 5,015,324 | 5/1991 | Goodwin et al. | 156/384 |
| 5,041,850 | 8/1991 | Kahoyashi et al. | 346/153.1 |
| 5,047,956 | 9/1991 | Hirami et al. | 364/519 |
| 5,132,709 | 7/1992 | West | 346/76 PH |
| 5,170,880 | 12/1992 | Low | 198/626.5 |
| 5,254,189 | 10/1993 | Hirobe et al. | 156/64 |
| 5,286,317 | 2/1994 | Treat et al. | 156/64 |
| 5,387,302 | 2/1995 | Bernard et al. | 156/352 |
| 5,431,274 | 7/1995 | Schaupp | 198/474.1 |
| 5,489,360 | 2/1996 | Shimizu et al. | 156/542 |
| 5,524,993 | 6/1996 | Durst | 400/279 |
| 5,547,293 | 8/1996 | Koch et al. | 400/120.17 |
| 5,645,680 | 7/1997 | Rietheimer | 156/567 |
| 5,657,066 | 8/1997 | Adams et al. | 347/198 |
| 5,823,693 * | 10/1998 | Henderson et al. | 400/611 |
| 5,885,012 * | 3/1999 | Hastings et al. | 400/83 |

* cited by examiner

*Primary Examiner*—Richard Crispino
*Assistant Examiner*—George R. Koch, III
(74) *Attorney, Agent, or Firm*—Wells, St. John, Roberts, Gregory & Matkin, P.S.

(57) ABSTRACT

A labelling machine is operable for applying carrier-supported labels for delivery to produce articles arranged in rows in a tray. The labelling machine includes at least one label transfer mechanism operative to apply labels from a carrier onto produce articles. The labelling machine also includes memory operative to store print information. A printer of the labelling machine is positioned upstream of the label transfer mechanism and is operative to print user-configurable print information. Control circuitry of the labelling machine is electrically coupled to the printer and the memory, and is operative to configure the printer to print user-configurable print information. A user interface of the labelling machine is signal-coupled to the control circuitry and memory, and is operable by a user to select the user-configurable print information to be printed by the printer. A method is also provided.

17 Claims, 53 Drawing Sheets

"Ready",
"Prn",
"Jammed",
"No Stock?",
"No Response",
"Bad Memory",
"Down Load",
"Sending Image",
"Complete",
"Enter PLU#",
"Not Found",
"Use Arrows",
"OK",
"Send Fault",
"Password?"
"OldPassword:"
"NewPassword:"
"Repeat New:"
"TIME OUT"
"Sel. Prn#"
"Delay time:"
"Set defaults"
"Not Implemented"
"BUSY"
"No image"

APPARATUS AND METHOD FOR CONFIGURING, LOCATING, AND APPLYING INFORMATION TO A LABEL, AND PRINTING AND APPLYING LABELS TO ARTICLES

TECHNICAL FIELD

This invention relates to automated labelling machines and the like. More particularly, this invention relates to improved labelling machines capable of controllably printing label information onto labels and delivering such printed labels onto rows of tray supported articles such as fruits and vegetables.

BACKGROUND OF THE INVENTION

One previously known technique for applying labels to articles is to utilize a hand-held label machine, or labeller, which is operable by a user to hand apply labels to individual articles needing identification. Several such hand-held labellers are presently commercially available. One such hand-held labeller is disclosed in U.S. Pat. No. 5,015,324 to Goodwin, et al. This labeller has a thermal print head for custom printing of information onto labels. Labels are then individually hand applied to articles by an operator. However, one problem with such hand-held labellers results from the fact that an operator is required to hand apply the labels to individual articles. Another problem is caused by the fact that an operator is unable to apply labels at a fast enough rate to process a large number of articles when the articles are being sorted and delivered via an automated storing, stacking and delivering operation. For example, different grades and sizes of fruits or vegetables need to be labelled during a sorting and/or packing operation, which requires the ability to apply a large number of labels in a relatively fast manner.

Another previously known technique for applying labels to articles uses an automated labelling machine such as that disclosed in U.S. Pat. No. 4,194,941 to Briggs, et al. According to such a device, a mechanism is presented for automatically labelling articles by delivering the articles through a delivery chute where they are guided into contact with an upstanding label. As each article engages with the label, the label is transferred to the article, which causes movement of a new label into a transfer position. The new label is then positioned to be delivered to a subsequent article that is delivered into contact with the upstanding new label. However, such labelling machines require that the articles be delivered down a chute. Therefore, labels can only be applied to articles prior to sorting and stacking the articles.

Yet another previously known technique for applying labels to articles uses a delivery line or conveyor that transports individual produce articles within cups. A line of such cups carries articles for delivery past individual stations. Each station contains a solenoid that causes the cup to tip and eject such carried produce article when a specific characteristic of the article has been detected. One characteristic comprises article size. For example, a camera and imaging computer/software can be used to optically detect and estimate the image size for apples supported in individual cups. Other characteristics comprise color, shape and grade. Several stations can be dedicated for separating variously sized articles, or apples, a solenoid at each station being triggered to tip a cup based upon the detected size of an article passing thereby. Such article is dropped via tipping of the conveying cup, with such article being dropped to a chute where similarly sized articles are directed to a conveyor having trays where the articles are loaded thereon. However, labels are applied to the apples prior to dropping the sorted apples which can lead to loosening or dislodgement of labels from the apples. Furthermore, labelling of such articles while within cups is limited to the speed with which labels can be practically applied to the articles upstream of the sorting location. Presently, such label application speeds are limited by the speed with which present label applicators can operate. Hence, such produce article sizer machines have operating speeds that are limited to the speed with which labels can be applied to the cup supported articles.

One problem caused by labelling articles prior to sorting and stacking such articles into trays results from the specific process used to sort and stack articles. For the case where apples, or produce, are being sorted and stacked via a sorting machine, the apples are delivered down a conveyor line and/or a chute where labels are applied to individual apples. A sizer then sorts the labelled apples and delivers them onto a large number of conveyors, each dedicated to a specific apple size. In one case, a sizer receives an input stream of apples on single delivery chute and outputs 32 different-sized apples to 32 separate conveyors. Accordingly, the use of a labelling machine as taught in Briggs, et al. (U.S. Pat. No. 4,194,941) greatly limits the speed with which a sizer can operate since labelling machines such as that taught in Briggs generally can only run at a maximum of 500–600 labels per minute. At greater speeds, the labels are not adhered sufficiently to the apples so as to be able to withstand contact pressures and rubbing that occur within a sizer. Additionally, there is a physical limit to the speed with which labels can be applied according to the apparatus of Briggs as well as other prior art devices. Furthermore, the labelling of produce upstream of a sorting/sizing station results in the labelling of spoiled or bad produce that will end up being separated from desirable produce by the sorter/sizer. Hence, additional labels are used, which leads to waste. Therefore, there exists a need for an apparatus capable of applying labels to apples downstream of a sizer, at the drop, wherein the articles are already positioned within rows in a tray, and where spoiled or bad articles have already been separate out.

Utilization of prior art devices such as Briggs, et al. (U.S. Pat. No. 4,194,941) will not work well with many existing high-speed packing houses wherein sorting and stacking lines are contained therein. The articles are labelled during a delivery process prior to sorting and stacking, which often leads to labels being damaged or inadvertently removed during subsequent sorting or stacking. Removed labels present a problem because the articles can no longer be identified and the labels, which come off during transport of the articles, can reattach themselves to components of the processing machine, which can gum up or restrict operation of the machine. Therefore, there is a need to apply labels downstream of a delivering and sorting operation, or sizer, such that the labels are less susceptible of being inadvertently removed during transport of the articles. Furthermore, there exists a need to apply labels downstream of a sizer such that the operating speed of a sizer can be increased.

Yet another previously known technique for labelling articles is disclosed in U.S. Pat. No. 5,387,302 to Bernard, et al. According to such apparatus and method, labels are automatically applied to individual produce articles such as fruit or vegetables. Such articles are first sorted into trays having parallel rows or indentations sized to receive articles being labelled. The articles are disposed for storage and delivery into trays in single-file lines, and the trays and stored articles are delivered via a continuously moving conveyor, downstream of a sizer or sorting machine. The rows are disposed during delivery perpendicular to the advance direction of the conveyor.

According to the apparatus taught in Bernard, et al. (U.S. Pat. No. 5,387,302), at least one labelling head is moved over a row of indentations with composite rectilinear translation motion. Such motion results from a combination of longitudinal advance motion corresponding to the motion of the conveyor in combination with a transfer motion perpendicular to the conveyor such that a label is placed successively on each article in a row. Such operation is renewed for each of the rows of a tray being labelled. However, such labelling cannot be implemented downstream of the drop, where articles are loaded into trays for later stacking and loading into crates or boxes, due to the number of articles and the speed with which the trays are conveyed during processing. Furthermore, such a method and apparatus is highly complicated, takes up a considerable amount of space along a processing line since the machine is relatively large and cumbersome, and requires considerably more components, maintenance, complexity, and cost to implement. Even furthermore, such apparatus has a labelling head that is too wide to simultaneously label adjacent rows of tray supported articles. Likewise, such apparatus is expensive, complicated and slow at applying labels to articles, and still does not enable printing of desired information onto labels.

Therefore, there exists an additional need to provide for improved automated tray-labelling of articles that are being delivered during a sorting and packing operation. More particularly, there exists a need for a machine capable of accurately printing customizable/reconfigurable information onto labels and applying such labels to tray-supported articles prior to being loaded into storage crates/boxes. Furthermore, there exists a need to apply such labels to articles in a manner that is quick and effective, that does not limit the speed of a sizer machine, and wherein the labels are less susceptible of being removed during transport, sorting and packing.

There further exists a need for an automated labelling device that is reconfigurable and adjustable such that desired label information can be selectively applied to individual labels in an accurate manner, and such information can be adjusted depending on the articles being labelled.

There exists yet a further need for improvements in controlling and delivering label information to such labels, for detecting the positioning of individual labels on a carrier during a labelling operation, for detecting the placement of a label onto an article such that a new label can be delivered for presentment to a subsequent article, and for enabling an operator and/or user to selectively reconfigure the operating characteristics, label information and performance of such a labelling machine in the field in a quick and simple manner.

Objects, features and advantages of this invention are to provide such an automated labelling machine suitable for use with tray-labelling downstream of the drop, or sorting station, of an article sizer where articles have been loaded into trays, and to provide for quick, easy, and high-capacity presentment of selectively configured and/or customizable printed information onto a label that is applied to sorted and tray-supported articles.

SUMMARY OF THE INVENTION

An improved labelling machine includes a control system having a user input device that enables an operator to selectively configure, customize, and/or position information that is printed onto a label during a labelling operation. Information is printed onto labels, then applied onto an article downstream of a sorting operation.

According to one aspect of the invention, a labelling machine is operable for applying carrier-supported labels for delivery to produce articles arranged in rows in a tray. The labelling machine includes at least one label transfer mechanism operative to apply labels from a carrier onto produce articles. The labelling machine also includes memory operative to store print information. A printer of the labelling machine is positioned upstream of the label transfer mechanism and is operative to print user-configurable print information. Control circuitry of the labelling machine is electrically coupled to the printer and the memory, and is operative to configure the printer to print user-configurable print information. A user interface of the labelling machine is signal-coupled to the control circuitry and memory, and is operable by a user to select the user-configurable print information to be printed by the printer.

According to another aspect of the invention, a labelling machine includes a plurality of label transfer mechanisms configured adjacent to one another. Each label transfer mechanism is operative to apply labels to produce articles stored within rows of trays. A printer is associated with each label transfer mechanism, and is operative to print information onto the labels prior to applying the labels to produce articles. Control circuitry of the labelling machine is coupled to the printers and is operative to initiate printing of information onto labels via each printer. A user interface of the labelling machine is signal-coupled with the control circuitry. The user interface is operable to select specific print information for printing onto the labels prior to applying the labels to individual produce articles.

According to yet another aspect of the invention, a method is provided for printing information onto labels. The method includes the steps of: detecting the position of a label relative to a printer; printing a sample label with print information; determining placement of the print information on the label; and adjusting the positioning of print information that is to be printed onto labels based upon the determined placement of the print information when placement is determined to be undesirable.

BRIEF DESCRIPTION OF THE DRAWINGS

Preferred embodiments of the invention are described below with reference to the following accompanying drawings.

FIG. 44 is a layout illustrating the assembly of FIGS. 45 and 46;

FIG. 47 is a schematic block diagram of motor drive circuitry provided with each individual print head assembly of each label transfer mechanism on the automated labelling machine depicted in FIGS. 1–3 and 5;

FIG. 54 is a general state diagram depicting a "DOWN LOAD OPERATION" operating program implementation, and illustrating the various operating states realized by the automated labelling machine control system when performing a print image download operation;

DETAILED DESCRIPTION OF THE PREFERRED EMBODIMENTS

Figure 1:
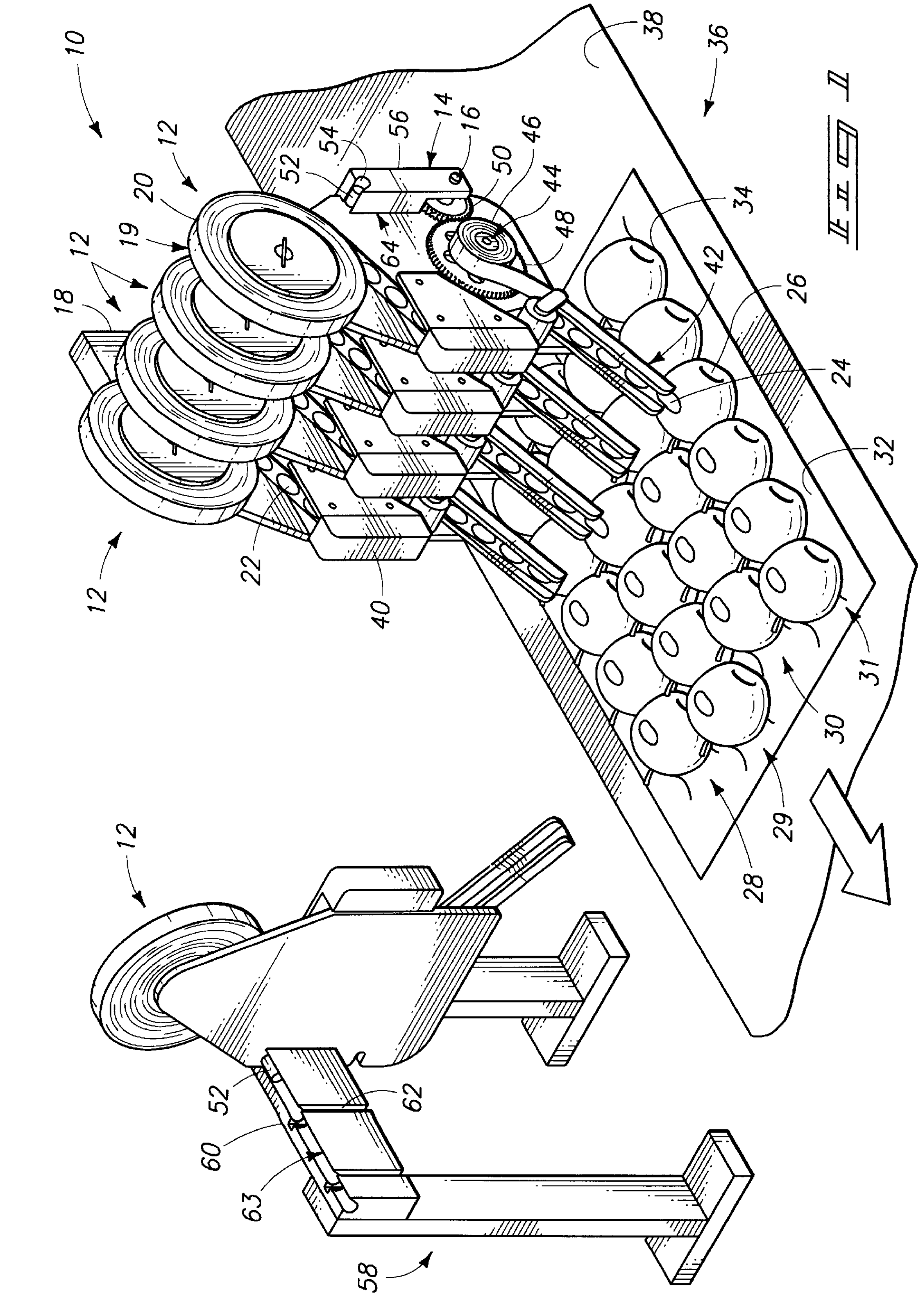
FIG. 1 is a perspective view of a preferred embodiment of an automated labelling machine having a control system and method for accurately and reconfigurably printing desired label information onto labels, illustrated in connection with a delivery conveyor of a sizer located downstream of a drop where sorted articles are sized and loaded into trays.

This disclosure of the invention is submitted in furtherance of the constitutional purposes of the U.S. Patent Laws "to promote the progress of science and useful arts" (Article 1, Section 8).

A preferred embodiment automated labelling machine and label print information control system in accordance with the invention is first described with reference to FIGS. 1–3 and 5. Additional implementation details are disclosed with reference to FIGS. 6–61. Such figures show various aspects and dimensional characteristics described further below with respect to an automated labelling machine having desirable printer control features. The automated labelling machine includes a control system and is designed in FIGS. 1–3 and 5 generally with reference numeral 10. Automated labelling machine 10 comprises a plurality of label transfer mechanisms 12 which are individually removably received and supported by a support frame 14. Support frame 14 carries individual mechanisms 12 in side-by-side relation above a conveyor 36 in locations where they are each operative to apply individual labels 24 to rows of articles 26 being delivered by conveyor 36 as shown in FIG. 1.

According to the implementation depicted in FIG. 1, conveyor 36 comprises a sizer conveyor located downstream of a fruit-sorting, or sizer, machine immediately following a location where sorted fruit is loaded onto trays at a specific "drop". The fruit is sorted and loaded onto trays depending on identified characteristics such as size, grade, or color, for delivery to a stacking and packaging station. According to such one implementation, articles 24 comprise fruit (e.g., apples) which are sorted and stowed for transport in trays 32 carried along conveyor 36 and beneath mechanisms 12. Details of one related art automated labelling machine are disclosed in Applicant's co-pending patent application, "Automated Labeller", by inventor William R. Rietheimer, U.S. patent application Ser. No. 08/953,252, filed Oct. 17, 1997, and now abandoned. Such patent application Ser. No. 08/953,252 is herein incorporated by reference.

It is understood that a typical sorting machine, or sizer, can have a large number of drop locations, each feeding several sizer conveyors such as conveyor 36. Each of such sizer conveyors 36 are configured to have a dedicated automated labelling machine 10. By providing an automated labelling machine 10, including a plurality of label transfer mechanisms 12, for each of a number of conveyors 36, downstream of a sizer, the sizer can run at a higher operating speed than with prior art labelling machines. Such prior art labelling machines limit operating speed of a sizer since articles are serially labelled as they move down a single delivery chute, before being sized, sorted and delivered to trays. Accordingly, a significantly higher operating speed is realized, with labels being serially applied such that the actual travel speed of articles relative to the labelling machine is significantly reduced as a result of the serial application of labels to a plurality of rows of articles 26.

As shown in FIG. 1, articles 26 are depicted in the form of produce such as apples. However, articles 26 can take on other forms such as vegetables, legumes, or other articles, including fasteners, machine parts, and components being manufactured, sorted, packaged, recycled and/or delivered. As shown in FIG. 1, automated labelling machine 10 includes a main controller board 140 (see FIG. 5) that forms a control system having control circuitry. Main controller board 140 (of FIG. 5), contained within user interface 18, is shown implemented on one dedicated labelling machine 10 comprising a single frame 14 and a repair/setup frame 58. However, it is understood that automated labelling machine 10 can optionally be formed from a plurality of frames 14, each functioning as a separate automated labelling machine that is individually coupled with a common, or central, main controller board 140 (see FIG. 5) of a common user interface 18. For such optional configuration, each frame has a smaller dedicated printed circuit (PC) board and circuitry, including diodes, for notifying an operator as to which mechanisms are printing. For purposes of simplification, automated labelling machine 10 is illustrated with a single frame 14 having a plurality of label transfer mechanisms 12 carried thereon. Use of a plurality of frames 14, each supporting a plurality of label transfer mechanisms 12, enables one user interface 18 to be centrally located within a packing house, and requires only one common main controller board 140 (see FIG. 5).

Figure 2:
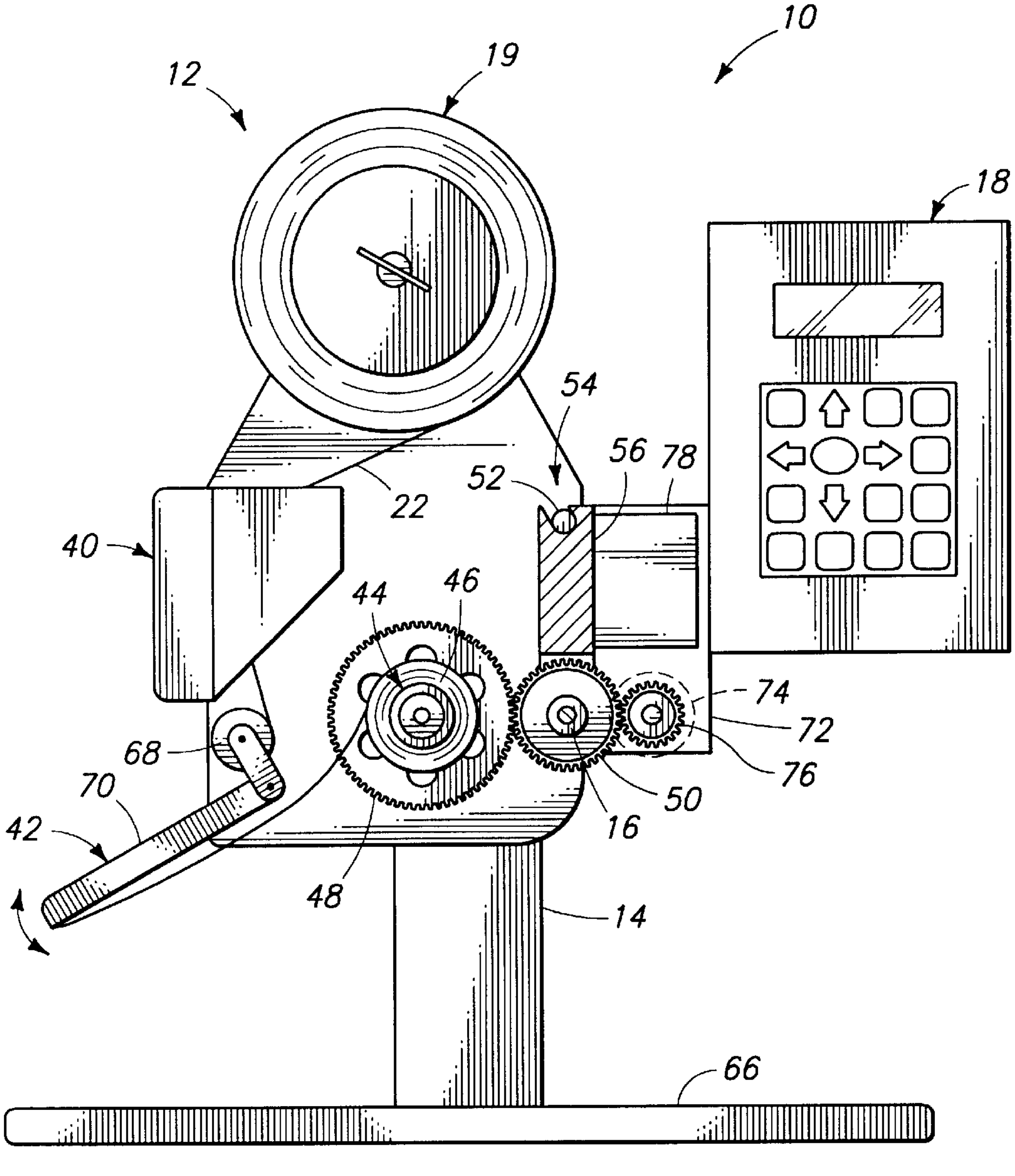
FIG. 2 is a side elevational view of the automated labelling machine depicted in FIG. 1.

According to the construction depicted in FIGS. 1 and 2, a plurality of individual label transfer mechanisms, or label applicators, 12 are each removably supported in support frame 14 in adjacent, side-by-side relation. Each individual label transfer mechanism 12 is operative to apply labels to a dedicated row 28–31 of articles 26 situated on tray 32. Individual articles 26 are stored within individual recesses 34 of tray 32.

For example, one of label transfer mechanisms 12 is configured to apply labels 24 to each of articles 26 contained within row 28. Another of label transfer mechanisms 12 is configured to apply labels 24 to each of articles 26 contained within row 29. Similar label transfer mechanisms 12 are supported for dedicated application of labels 24 to each of articles 26 in each of rows 30 and 31, respectively.

As shown in FIG. 1, individual label transfer mechanisms 12 are removably supported by a cross-arm 56 of frame 14. Each label transfer mechanism 12 contains a pivot pin 52 configured to support mechanism 12 on cross-arm 56. Cross-arm 56 contains a plurality of vertical slots 64 sized to receive a mating rear-most edge on label transfer mechanism 12. Label transfer mechanism 12 is loaded onto arm 56 by registering pin 52 within a complementary cylindrical slot, or groove, 54 formed along a top edge of arm 56. Accordingly, label transfer mechanism 12 is pivotally supported along pin 52 by cross-arm 56 such that a proximate edge of label transfer mechanism 12 is urged within slot 64 due to gravity. In this manner, label transfer mechanism 12 is pivotally carried by arm 56.

Pin 52 and arm 56 are configured such that label transfer mechanism 12 pivotally engages a take-up gear 48 in interlocking rotatable engagement with a drive gear 50 on cross-arm 56. Drive gear 50 is secured for rotation on drive shaft 16.

Drive shaft 16 is journalled for rotation beneath cross-arm 56, and contains a plurality of drive gears 50, each dedicated for driving a take-up reel 44, via take-up gear 48, on one of label transfer mechanisms 12. As shown in FIG. 2, a single drive motor 74 is used to rotatably drive a common drive shaft 16, drive gears 50, take-up gears 48, and take-up reels 44.

Optionally, drive shaft 16 can be constructed with a single spline gear with slots or adjustable support brackets provided on cross-arm 56 that enable lateral adjustable positioning between the label transfer mechanisms. Such adjustable positioning enables reconfiguring of machine 12 to label articles within trays that contain rows having a different spacing. Likewise, additional mechanisms 12 can be added for the case where additional rows are to be provided in a new size/shape of tray. Such spline gear is configured to engaged the associated take-up gear 48 on each mechanism 12, regardless of the lateral positioning of such mechanism relative to frame cross-arm 56.

As shown in FIGS. 1 and 2, a user interface 18 is provided on automated labelling machine 10 to enable a user to access the printer control system of labelling machine 10. User interface 18 contains a keyboard (or keypad) and a display that enable a user to selectively configure the operating characteristics for each automated labelling machine 10, and associated label transfer mechanisms 12, that are coupled with the main controller board 140 (see FIG. 5). Optionally, each automated labelling machine 10 can be provided as a stand-alone unit, incorporating a dedicated main controller board. Further optionally, a single automated labelling machine 10 can be provided with a single label transfer mechanism 12. Even further optionally, a processor from a sizer, or sorting machine, can be used to relay labelling information directly to such main controller board so as to selectively configure each automated labelling machine 10 with desired print information and position/diagnostics of such information. Such information received from the sizer can be used to actuate individual solenoids to tip support cups and "drop" articles based upon identified characteristics such as size, color, or shape. Accordingly, communication between a sizer and machine 10 will enhance processing and sorting efficiency and speed. Alternatively, such operations can be carried out as separate processes.

As shown in FIG. 1, each label transfer mechanism 12 comprises a label canister 19, which is carried by a main plate or body, a print head assembly 40, and a peel plate assembly 42. A label reel 20 is removably supported within label canister 19. Label reel 20 is received within label canister 19 and contains a supply of individual adhesive-backed labels 24 spaced sequentially along a carrier web, or carrier, 22.

In operation, carrier 22 is advanced through print head assembly 40, around a rotatable roller 68 and over peel plate assembly 42, and back onto a take-up reel 44 where scrap carrier 22 is stored. Carrier 22 is folded over a leading edge of peel plate assembly 42 so as to cause labels 24 to be removed or peeled off carrier 22 by a lip edge of peel plate assembly 42, after which such carrier 22 is doubled back under assembly 42 and rotatably stored onto take-up reel 44.

According to one construction depicted in FIG. 1, take-up reel 44 comprises a central cylindrical hub that is frictionably carried via a fastener for rotation against take-up gear 48 such that tension on carrier 22 causes frictionable slippage between take-up reel 44 and take-up gear 48, with take-up gear 48 rotatably advancing take-up reel 44 sufficiently so as to impart drive or travel tension along carrier 22.

A separate drive motor 92 (see FIG. 3) is provided within each print head assembly 40 of each label transfer mechanism 12 which further facilitates advancement of carrier 22 and labels 24. Further details of such motor are provided below with reference to FIG. 3.

As shown in FIG. 1, conveyor 36 comprises a sizer conveyor which includes an endless conveyor belt 38 that is supported for rotation by a plurality of rollers (not shown). At least one of the rollers is driven by a drive motor of a sizer machine so as to movably drive conveyor belt 38. In this manner, a plurality of trays 32 are carried for movement by belt 38 and are delivered to pass directly beneath labelling machine 10. Prior to labelling articles 26 within individual trays 32, articles 26 have been pre-sorted and loaded within indentations, or recesses, 34 of tray 32 in a previous, upstream article processing operation.

In operation, a sizer or sorting machine receives articles 26 from a supply belt (not shown) which are to be sorted, and the articles are transferred to a singulator section where they are presented in one of several single rows where they are sorted by identifiable characteristics such as size, color, grade, etc. The articles, sorted by a characteristic such as size, then enter individual rows (supported in cups) comprising transfer sections (belts) which transfer the articles for delivery into each of rows 28–31 on each tray 32 (for each conveyor 36). Typically, the transfer section is a row of size-sorted articles that are dropped into individual rows of a tray. Trays 32 are then transported on conveyor 36 downstream of the article drop location (where articles 26 are loaded into trays 32) for labelling, followed by stacking and loading of trays 32 into crates.

According to one article sorting and loading operation, articles 26 are arranged such that a smooth and presentable surface of article 26 is placed in close proximity for contact with each of label transfer mechanisms 12. According to one such implementation, articles 26 comprise apples. Hence, labels 24 are better able to be adhered directly thereon. For example, for the case where articles 26 comprise apples, the stems are preferably oriented to extend in a generally lateral, or horizontal, plane such that a smooth apple surface is presented upwardly for receiving an adhesive-backed label 24.

Each of label transfer mechanisms 12 depicted in FIG. 1 includes label canister 19 which contains a transparent removable cover such that individual label reels 20 can be easily replenished/replaced. Canister 19 is configured to receive a label reel 20 containing a supply of labels 24 by simply loading label reel 20 into canister 19 and securing the transparent cover with a rotatable quick release fastener. Print head assembly 40 is carried on a main plate of each label transfer mechanism 12, and is operative to print configurable/customizable information onto each label 24 as they are delivered through print head assembly 40. Carrier 22 and labels 24 are guided onto peel plate assembly 42 where individual labels 24 are sequentially removed from carrier 22 and delivered onto successive individual articles 26. Labels 24 dislodge from assembly 42 and carrier 22 as individual articles 26 move into contact with assembly 42. Adhesive backing on labels 24 causes lodging onto articles 26. A smooth silicon surface on carrier 22 facilitates dislodgement of labels 24 from carrier 22.

Also shown in FIG. 1, a repair/setup frame 58 is provided in close association with automated labelling machine 10. Repair/setup frame 58 includes a cross-arm 60 carrying a plurality of individual slots 62 (similar to slots 64 on frame 14) and a cylindrical groove 63 (similar to groove 54 on frame 14). Accordingly, individual label transfer mechanisms 12 can be supported for storage, repair, and/or setup and reconfiguration.

According to one implementation, additional extra label transfer mechanisms 12 are stored on frame 58 where they are available to an operator who might need to remove one label transfer mechanism 12 from machine 10 due to a detected problem caused during operation. One such problem is generated when an individual label reel 20 is empty. Another problem can be caused if a carrier 22 on a label reel 20 separates or tears. An operator can merely remove one such label transfer mechanism 12 from machine 10 and quickly install a loaded (with a new label reel) substitute label transfer mechanism 12 from frame 58, then quickly continue operation of machine 10. A computer within main controller board 140 reconfigures the newly loaded label transfer mechanism 12 with label information already programmed into the other mechanisms 12. In this manner, frame 58 can be used to support the removed label transfer mechanism 12 such that repair, maintenance, and/or reloading of a new label reel 20 can be performed thereon.

Yet a further use for frame 58 is provided when the removed label transfer mechanism 12 is plugged into main controller board 140 (see FIG. 5) such that programming/reprogramming of the automated labelling machine control system can be implemented on control circuitry and memory contained within print head assembly 40 and within main controller board 140 of user interface 18. Additionally, diagnostics can be performed on individual label transfer mechanism 12 when supported on frame 58.

As shown in FIG. 2, frame 14 includes a support base 66 over which a conveyor belt 38 (see FIG. 3) is moved to carry trays 32. A gap can be provided between conveyor belt 38 (of FIG. 3) and support base 66 (of FIG. 2). Optionally, a plurality of rollers (not shown) can be provided to support conveyor belt 38 over support base 66, over which conveyor belt 38 is carried for movement.

In FIG. 2, label transfer mechanism 12 can be readily seen loaded onto frame 14, wherein pin 52 is received within slot 54, and take-up gear 48 pivotally engages with drive gear 50. Drive shaft 16 and drive gears 50 are driven for rotation by motor 74, via a single drive gear 76 that engages with one of drive gears 50 closest to motor 74.

Figure 32:
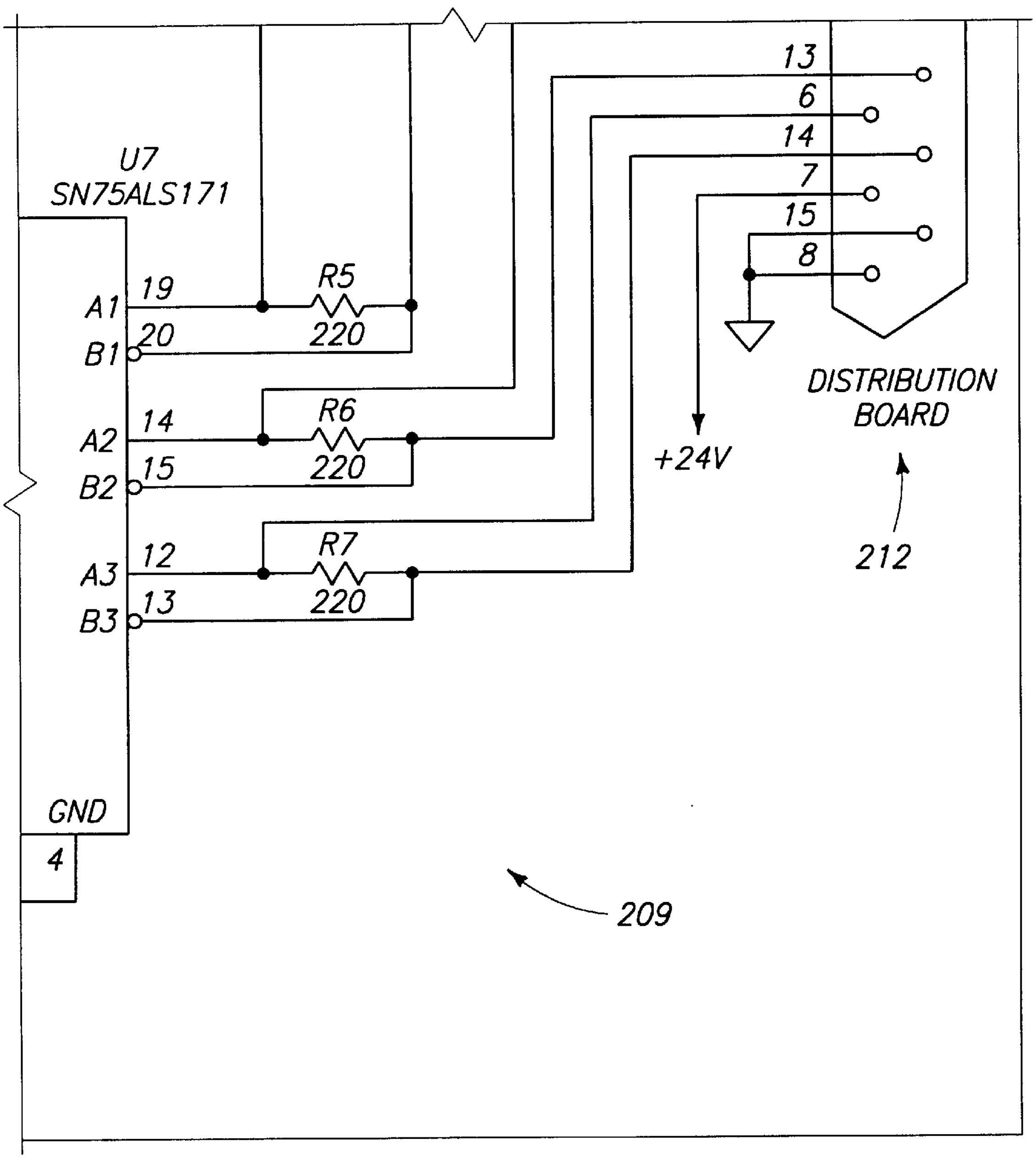

As shown in FIG. 2, motor 74 is supported by a motor-mounting plate 72 that depends from frame 14. Additionally, a power transformer 78 is supported by cross-arm 56 for supplying power to print head assembly 40. According to one implementation, motor 74 comprises a 24-volt DC electric motor, Model No. 415A288-3, manufactured by Globe Motors, Labinal Components and Systems, Inc., of Dayton, Ohio. Such motor 74 is operated at a constant operating speed, and receives 24-volt power from distribution board 212 (see FIG. 32). Motor 74 is driven and geared to impart a rotatable operating speed to take-up reel 44 that is sufficient to constantly maintain travel tension on carrier 22. When label transfer mechanism 12 is not moving carrier 22, slippage occurs between take-up reel 44 and take-up gear 48.

As shown in FIG. 2, a carrier web 22 enters print head assembly 40 where individual labels are printed with customizable and/or reconfigurable information. Carrier 22 exits print head assembly 40 and wraps around rotatable guide roller 68. Guide roller 68 guides carrier 22 onto a peel plate 70 of peel plate assembly 42. Carrier 22 is folded sharply over a leading, terminating edge of peel plate 70 so as to cause labels to peel away from carrier 22 there along. Carrier 22 is then doubled back along a bottom edge of peel plate 70 and is collected as a roll of scrap 46, which is wound onto take-up reel 44. Accordingly, motor 74 drives shaft 16 via gear 76 and one of gears 50, with individual gears 50 engaging individual take-up gears 48 such that take-up reel 44 is driven in rotation sufficiently to cause tension on carrier 22 which further facilitates transfer of carrier 22 and labels for presentment to individual articles along peel plate 70.

Figure 3:
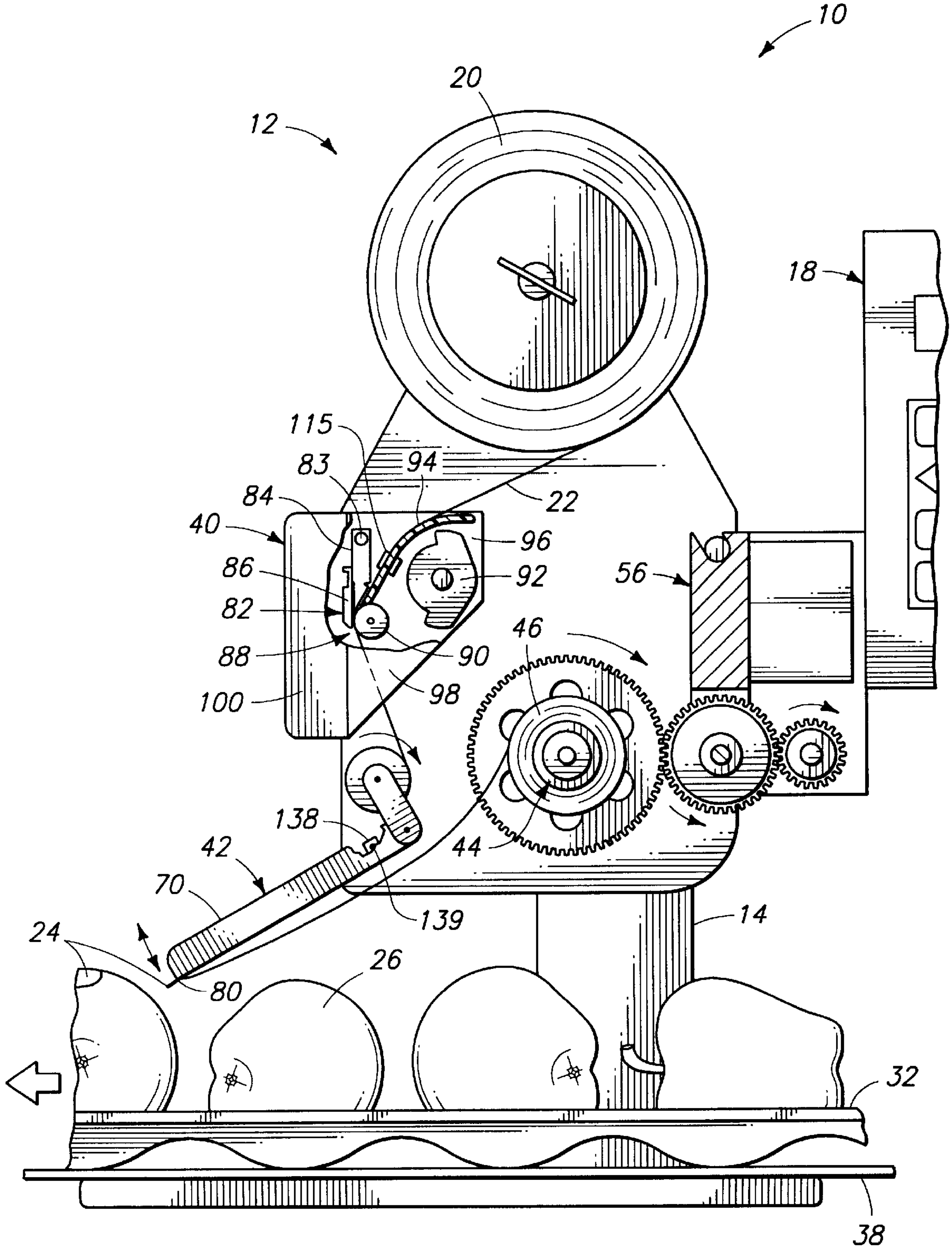
FIG. 3 is a side elevational view corresponding to the view of FIG. 2, illustrating a print head assembly in partial breakaway view and further illustrating printing of information onto labels and applying such printed labels to articles of fruit that are supported within parallel rows of a moving tray carried along a conveyor.

FIG. 3 illustrates the print and apply label features of Applicant's invention. Individual label transfer mechanisms 12 are able to print specific print information onto labels 24 comprising combinations of apple variety and size (via a PLU#). One exemplary label 102 (of FIG. 4), similar to label 24, is depicted with reference to FIG. 4 and is described below in further detail. According to prior art techniques, where apple variety and specific PLU numbers (#'s) cannot be selectively printed onto labels, it is necessary to inventory as many as 60 different print reels, each having labels that are pre-printed with a specific combination of apple variety and PLU number (PLU#). Such prior art techniques are often configured to only sort and label two different sizes of articles, small and large. If more than two sizes are sorted and labelled, 120 or even 240 different print reels might be needed.

Each time a different combination of apple variety and PLU# is being sorted and printed by a machine, the label reel has to be changed by inserting an appropriate label reel having the desired pre-printed labels that are retrieved from a stored inventory of reels. Hence, it may be necessary with prior art techniques to change label reels 5 or 6 times a day. Furthermore, each time a new label reel is loaded, carrier and labels are wasted during loading and unloading.

FIG. 3 illustrates the ability to print and apply such label information pursuant to Applicant's invention. Accordingly, it is possible to eliminate such a large inventory of dedicated label reels having specific pre-printed labels. Hence, even greater amounts of specific information can be imparted to a label without requiring an increase in the number of label reels that need to be inventoried and stored for use in an article-sorting and labelling operation.

Figure 4:
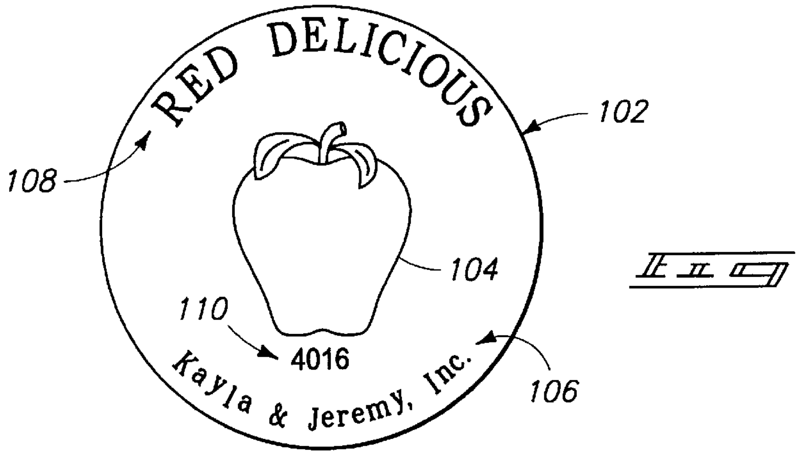
FIG. 4 is an enlarged plan view of an apple label comprising a media having pre-printed information affixed by a label manufacturer upon which additional printed information is applied at a packing house prior to affixing the label onto an article.

As illustrated in FIG. 3, label reel 20 contains labels 24 that are pre-printed with specific graphical information 104 and textual information 106 (see FIG. 4). Additional print information 108 and 110 needed for specific operations is applied to label 102 by print head assembly 40, as shown in partial breakaway view (see FIG. 4). Accordingly, common information that is needed for all labelling operations can be pre-printed, such as graphical information 104 and textual information 106. Additional print information that is needed for specific labelling operations can be customized, configured and/or adjusted by the control system of Applicant's invention such that additional label reels do not need to be inventoried. For purposes of illustration, exemplary apple label 102 of FIG. 4 is shown as a circular shaped label. In contrast, label 24 of FIGS. 1–3 is shown as an elliptical label. However, it is understood that labels 24 (of FIGS. 1–3) and label 102 (of FIG. 4) are essentially identical for purposes of this disclosure. Furthermore, it is understood that label 24 of FIGS. 1–3 contains the same pre-printed information 104, 106 and post-printed information 108, 110 as depicted on label 102 (of FIG. 4).

As shown in FIG. 3, a batch of labels 24 can be retrieved from label reel 20 and printed with specific desired information for sorted articles by print head assembly 40. Such printing occurs just before a label 24 is applied to an article 26 via peel plate assembly 42. Labels are then advanced for delivery to articles 26 by applying travel tension to carrier 22 via take-up reel 44 and by motor-driven rotatable resilient print (or feed) roller 90. Preferably, take-up reel 44 is designed to rotate such that a greater travel distance is imparted to carrier 22 than is imparted by roller 90 such that take-up reel 44 frictionably slips relative to associated take-up gear 48 (see FIG. 2).

Print head assembly 40 of FIG. 3 is shown in partial breakaway view so as to illustrate the travel path taken by carrier 22 through print head assembly 40. Carrier 22 is unwound from label reel 20 via the application of travel tension to carrier 22. Carrier 22 is drawn over guide member 94 by such travel tension. Preferably, guide member 94 contains a recessed slot that is sized in width nearly identically to the width of carrier 22 such that the lateral positioning of carrier 22 is precisely controlled. Hence, carrier 22 is prevented from wandering laterally of the travel direction extending along guide member 94 such that the lateral positioning of labels 24 is accurately rolled with respect to printer, or print head, 88.

As shown in FIG. 3, guide member 94, when viewed in cross-section relative to the view depicted in FIG. 3, contains a recessed slot (not shown) shaped as a dovetail. More particularly, such slot is narrower along a top surface of guide member 94 and is wider at the bottom of such slot. Accordingly, the dimension of such slot is sized at its bottommost location such that the slot is identical in width to the width of carrier 22. Accordingly, carrier 22 is guided within such slot accurately which prevents any lateral movement or pulling (via the dovetail shape). Such configuration precisely presents labels 24 such that little or no lateral variation is presented between labels 24 and print head 88.

Guide member 94 is supported along each edge within an associated groove formed in each of inner sidewall 96 and outer sidewall 98, respectively. According to one implementation, guide member 94 is formed from a relatively low-friction material such as Teflon™, and sidewalls 96 and 98 are formed from a relatively inexpensive plastic material such as Delrin™. Details of one similar multi-piece construction wherein a guide member and support members (sidewalls) are utilized to construct a labelled delivery apparatus are disclosed in Applicant's co-pending patent application, "Label Applicator Mechanism and Hand-Held Labeller", by inventor William R. Rietheimer, U.S. patent application Ser. No. 091070,941, filed Apr. 30, 1998. This Patent Application Ser. No. 09/070,941 is herein incorporated by reference. However, such groove is not disclosed.

More particularly, individual labels 24 can be retrieved from label reel 20 and printed with adjustable, customizable, and/or reconfigurable specific information by print head assembly 40 before being applied to an article 26 via peel plate assembly 42. Print head assembly 40 is operative to selectively print desired graphical/textual information or any printed matter containing information and/or decorative features such as bar coding on each of labels 24 as they pass therethrough. Carrier 22, which releasably supports labels 24, is unwound from reel 20 by travel tension applied to carrier 22 via take-up reel 44 and feed roller 90. Print roller 90 is driven for rotation by a drive motor 92 via a plurality of inter-meshing gears (not shown) contained in a recess formed along an inner face of sidewall 96 adjacent the base plate or body of mechanism 12. Accordingly, motor 92 is operative to drive roller 90 in rotation such that carrier 22 and associated labels 24 are drawn through print head assembly 40 where they are imprinted, then delivered to peel plate assembly 42. Likewise, additional travel tension is applied by take-up reel 44 to carrier 22 which further assists delivery of labels 24 to articles 26 via peel plate 70.

As shown in FIG. 3, print head assembly 40 also includes a print head arm assembly 82. Print head arm assembly 82 is pivotally supported by a pivot pin 83 to facilitate separation between print head arm assembly 82 and print roller 90 so as to enable cleaning. Print head arm assembly 82 includes a print head base arm 84 and a print head outer arm 86. Print head base arm 84 and print head outer arm 86 are each formed from a piece of aluminum. Print head base arm 84 is sized with sufficient mass so as to form a heat sink suitable for drawing heat from a thermal print head 88 of outer arm 86 that is generated during printing while pressed against print roller 90. Carrier 22 and labels 24 are drawn between thermal print head 88 and roller 90 via relation of roller 90 which is accurately imparted via motor 92 and a feedback control loop using an optical sensor 115 and processing circuitry (not shown) contained within print head assembly 40.

Print head outer arm 86 is securely fastened to print head base arm 84 by a plurality of threaded fasteners (not shown). A thermal print head 88 is formed on print head outer arm 86 at a location where print head outer arm 86 engages with print roller 90. A spring is provided within housing 100 at a location such that a spring force is generated which acts to press assembly 82 against roller 90. Pivotal movement of housing 100 releases such spring force during maintenance and repair, as discussed below. Accordingly, labels 24 are drawn via carrier 22 at a location between print roller 90 and thermal print head 88 such that print head 88 accurately prints desired information onto individual labels 24.

One suitable construction for a thermal print head 88 and a print head outer arm 86 is a thermal print head taken from a CL Series print mechanism having ribbon cable number 2326629-A, and sold by Axiohm of Montrouge Cedex, France, and available in North America at 950 Danbury Road, Ithaca, N.Y. 14850.

Thermal print head 88 comprises a linear heater mechanism in the form of heatable dots configured in a linear array of 200 dots per inch. Positioning of a label against thermal print head 88 enables printing of material, or information, onto such label via application of heat to each individual dot in an array that defines the desired textual/graphical/encoded pattern. Such labels are formed from thermally printable material. Labels 24 are accurately indexed via a label detector, or optical sensor 115, for carefully positioning such labels against thermal print head 88 in order to deliver printed information onto label 24 accordingly. Hence, print roller 90 is driven responsive to the detected position of labels 24 by way of such optical sensor 115.

It is understood that various other constructions can be utilized for print head assembly 40. For example, print head assembly 40 can be formed from an ink jet printer, a dot matrix printer, a laser printer, a daisy-wheel printer, or any machine capable of producing images/graphics/detectable information on paper or film. Furthermore, it is understood that labels include tags, stickers, markers, or any other user- or machine-detectable devices that enable the bearer of an article to determine its characteristics by reviewing the information printed onto such vehicle.

It is further understood that thermal print head 88 contains an integrated circuit (IC) such as a programmable logic controller (PLC) having an erasable EPROM operative to contain print commands that define print information for delivering textual/graphical materials to labels 24. Additionally, or alternatively, a separate printed circuit board containing dedicated memory control chips can be utilized for delivering such print control commands to thermal print head 88 and feed roller 90. Print control commands and delivery commands for driving roller 90 are delivered via a flexible printer cable and a connector configured in the form of a serial connection. Such flex cable comprises a communication line for delivering print control commands to thermal print head 88. Optionally, dip switches can be provided in association with memory and a controller for selectively configuring one of a plurality of print control commands.

As shown in FIG. 3, print head assembly 40 includes a cover assembly 100 that is pivotally carried along a topmost edge of assembly 40 between sidewalls 96 and 98. A printer printed circuit (PC) board 113 (see FIG. 5) is provided within cover assembly 100 and includes all of the electronics associated with print head assembly 40. According to one implementation, a ribbon cable is provided by thermal print head 88, exiting print head outer arm 86 where it connects with such printer printed circuit (PC) board housed within cover assembly 100.

Cover assembly 100 further includes a releasable latch (not shown) located along a bottommost edge for securing cover assembly 100 alongside the edges of sidewalls 96 and 98 via a dowel pin. Such latch releasably engages the dowel pin to secure such cover therealong. Accordingly, an operator can open cover assembly 100 at a bottom edge, pivotally raising such cover assembly 100 in relation to sidewalls 96 and 98. Such opening of cover assembly 100 draws tension on the ribbon cable, pivoting print head arm assembly 82 away from roller assembly 90, about pivot pin 83. Such construction enables an operator to feed carrier 22 and labels 24 between thermal print head 88 and resilient print roller 90.

According to one construction, resilient print roller 90 is formed from a Neoprene™ material. Such pivotable access therebetween further enables an operator to perform rethreading of carrier 22, or maintenance and cleaning, particularly when labels 24 become inadvertently dislodged from carrier 22 within print head assembly 40, or when carrier 22 is torn. When cover assembly 100 is closed, a spring (not shown) on assembly 100 forces thermal print head 88 against carrier 22, labels 24, and print roller 90.

FIG. 4 illustrates one exemplary apple label 102 containing pre-printed information 104 and 106, as well as printed information 108 and 110, which is printed just before delivery of a label 102 to an article. Such information 108 and 110 is configurable and modifiable by way of implementation of aspects of Applicant's invention to configure user-specified, or selected, print information for printing onto labels. More particularly, apple label 102, for purposes of this disclosure, is substantially identical to label 24 as depicted in FIGS. 1–3 and is supported on a carrier reel via a carrier.

As shown in FIG. 4, apple label 102 is pre-printed with graphical information 104 and textual information 106 by a label manufacturer who supplies such labels 102 in a serially spaced-apart configuration on a carrier of a label reel. Accordingly, an apple packing house having Applicant's automated labelling machine can warehouse and stock a single type of apple label for use with many different types of apples because specific information relating to the type of apple being packaged and the specific size are contained within printed textual information 108 comprising a printed article, or apple type, and printed information 110 comprising a PLU number (PLU#). Accordingly, an infinite number of configurations for print information can be provided onto such labels.

FIG. 4 illustrates apple label 110 wherein pre-printed graphical information 104 comprises a graphical representation of an apple. Pre-printed textual information 106 comprises the pre-printed name of an apple packing house.

In contrast, printed information 108 and 110 comprise customizable, tailorable, and selectively configurable print information that is printed onto a label during a conveying and packing operation, downstream of a sorting operation within a packing house. According to one aspect, such comprises the novel features of Applicant's invention. Accordingly, print information 108 (or past tense, printed information) comprises textual information describing the article type being labelled and packaged, in this case "Red Delicious" apples. Likewise, printed information 110 comprises a specific PLU number (PLU#) indicative of a particular size and/or type of apple that has been sorted by a sorting machine, or sizer, upstream of the labelling operation. In this case, printed information 110 comprises a PLU number "4016". Stores use such PLU numbers to track articles. The ability to print more PLU numbers will enable stores to improve the tracking of products. For example, stores can track apples having several different sizes, not just "small" and "large" sizes.

It is understood that the configurable information printed by Applicant's automated labelling machine and control system; namely, print information 108 and 110, can be tailored to include the printing of textual information, graphical information, data, bar codes or any other printed matter. For example, it is possible to also configurably print information 104 and 106 such that a label supplier can supply labels 102 to a packing house that has no pre-printed information contained thereon. Accordingly, all information to be placed on the labels is printed "on the fly" as a tray 32 of apples 26 is being moved on a conveyor 36 past a label transfer mechanism 12 of Applicant's automated labelling machine 10 (of FIG. 1).

Examples of selectively configurable print information for apple label 102 of FIG. 1 include printing any of a number of apple types for print information 108. For example, print information 108 could be selectively configured for applying labels to packaged apples comprising "Red Delicious", "Fuji", "McIntosh", "Cortland" or "Golden Delicious". Similarly, print information 110 can be printed so as to indicate the size of apples which have been sorted onto trays contained within such conveyor by a sizer operating upstream of Applicant's label transfer mechanism. For example, print information 110 might include any one of PLU numbers (PLU#'s) "4016", "4026", "4106", "4135", "14016", etc. Such optional print configurations can be stored in memory where they can be selectively enabled by an operator or by setup personnel, or automatically, when implementing Applicant's invention pursuant to the hardware implementation depicted in FIGS. 5–49 and software implemented by the state diagrams depicted in FIGS. 50–59.

Figure 5:
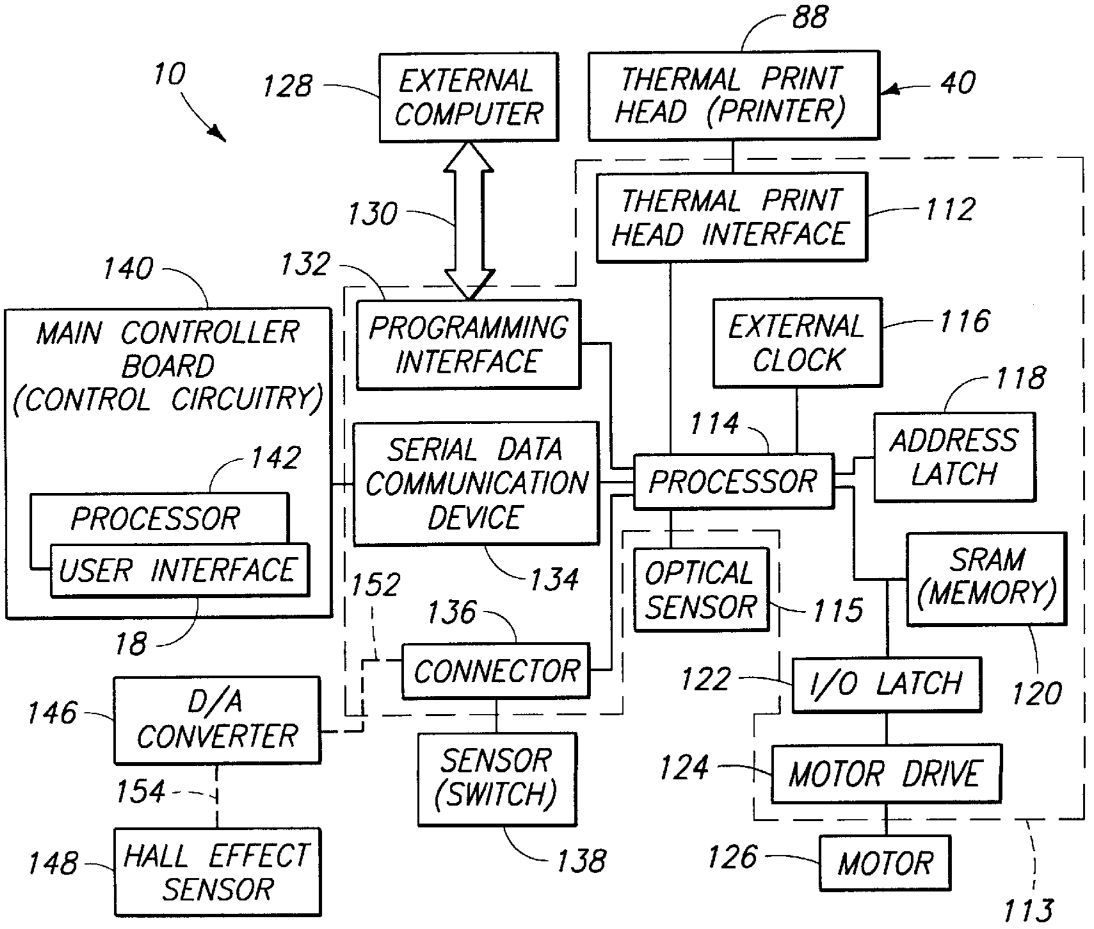
FIG. 5 is a schematic block diagram of an automated labelling machine having a controllable apparatus and a method for configuring, customizing, locating, and applying images to labels for a plurality of side-by-side label application mechanisms, and for applying such labels to tray-supported articles.

FIG. 5 illustrates in schematic block diagram form automated labelling machine 10 according to a preferred embodiment of this invention, as illustrated by the apparatus depicted in FIGS. 1–3 and 6. Machine 10 is configured with a single, common main controller board 140 and a plurality of printer PC boards 113 that couple with associated components. Although only a single printer PC board 113 is illustrated as being coupled with main controller board 140, it is understood that a plurality of such printer PC boards 113 can be coupled to a single, common main controller board 140.

Main controller board 140 is housed within user interface 18 as illustrated in FIGS. 1–3 and 6. Likewise, printer PC board 113 is housed within cover assembly 100 (of FIG. 3) on each label transfer mechanism 12.

For example, automated labelling machine 10 includes a single user interface 18 which contains main controller board 140, and five different printer PC boards 113, one located in each label transfer mechanism 12. Although four label transfer mechanisms 12 are being utilized to label apples 26, as shown in FIG. 1, an extra backup label transfer mechanism 12 can also be coupled with main controller board 140 (via user interface 18) while being stored on repair/setup frame 58.

Furthermore, it is possible to provide main controller board 140 such that a single user interface 18 is provided on one automated labelling machine 10 such that several automated labelling machines 10 are controlled from a single user interface 18 provided on one of the automated labelling machines 10 (of FIG. 1). In this manner, the main controller board 140 of FIG. 5 can be used to control several different automated labelling machines, each dedicated to a single conveyor.

Additionally, as depicted in FIG. 5, an external computer 128 is provided in signal-coupled relation via a communication link 130 with printed PC board 113. More particularly, an external computer, such as a main packing house computer, or a network computer, can be signal-coupled and decoupled via a programming interface 132 with a processor 114 of printer PC board 113. According to one implementation, external computer 128 can be signal-coupled via a serial bidirectional interface so as to transfer data and/or power. For example, if a new type of apple is to be run on a number of different conveyors, it is possible to selectively reconfigure each automated labelling machine and each label transfer mechanism to print information 108 describing a new, previously undefined apple type. Such updating of printing capabilities can be imparted by external computer 128 from a central location.

Additionally, or optionally, an operator is able to update printer characteristics such as the content of print information, positioning of print information on a label, and quality of print information via main controller board 140 through use of a user interface 18. User interface 18 couples with a processor 142 on main controller board 140 such that a user is able to determine characteristics that have been selected for print information 108 and 110 on label 102 (see FIG. 4).

Printer PC board 113 contains a central processor 114. In one implementation, processor 114 comprises a microcontroller. Additionally, PC board 113 includes memory, such as SRAM memory 120, an address latch 118, an input/output (I/O) latch 122, a motor drive 124 (such as motor drive circuitry), and an external clock 116. Motor drive 124 is operatively coupled with a motor 126 that accurately drives print roller 90 in rotation (see FIG. 3) to deliver labels. Furthermore, PC board 113 includes a thermal print head interface 112 configurable for operatively coupling with thermal print head (printer) 88.

Printer PC board 113 further includes programming interface 132 which signal-couples the communication link 130 with external computer 128. Similarly, processor 114 of PC board 113 couples via a serial data communication device 134 with main controller board 140. Preferably, serial data communication device 134 is removably coupled with main controller board 140 via a removable signal connector. Additionally, PC board 113 includes a connector 136 configured for coupling with a sensor 138.

Connector 136 couples with sensor 138 (in one embodiment, a Hall-effect sensor with a threshold detector; in another, a contact switch) such that an input is provided when peel plate upward movement is detected. According to one implementation, such input comprises an on/off input corresponding to raising and lowering of such peel plate. According to another implementation, such input comprises a digital on/off signal that is derived from an analog Hall-effect sensor signal 148 that has been converted by D/A converter 146 (of FIG. 5). The differential time between peaks or valleys in such signal can be monitored. Such time information can be stored in a look-up table, with the speed of a drive motor being speeded up or delayed based upon experiential information, or patterns, that are determined to be found within such stored information. For example, a delay might be detected following the labelling of each group of six apples, indicative of the spacing between adjacent apply trays (where six apples are supported in each row of a tray). Accordingly, such experiential information can be used to optimize performance and timing of label application and printing.

According to one implementation, processor 114 is signal-coupled via connector 136 with a sensor 138 comprising an on/off switch. One such sensor can be implemented by a Hall-effect sensor wherein a threshold voltage is characterized and monitored by processor 114, contained in memory, to detect "on" and "off" conditions. Optionally, processor 114 is signal-coupled via connector 136 to optional signal line 152 with a digital-to-analog (D/A) converter 146 and a Hall-effect sensor 148 through signal line 154. According to such optional implementation, Hall-effect sensor 148 generates an analog output signal similar to a sinusoidal signal indicative of pivotal movement of peel plate 70 (see FIG. 3) as contact is made with individual apples 26. D/A converter 146 is utilized to convert the analog signal into a digital signal that can be processed by processor 114. Accordingly, such information can be used to judge the relative height of individual apples, and to judge or predict the expected timing between application of labels to adjacent apples. Also, such information provides a feedback signal for the control system.

In this manner, variations in apple placement, shape and profile can be monitored by the machine control system based on a feedback signal so as to optimize the feeding of labels 24 from peel plate 70 (of FIG. 3) such that optimum placement and delivery of labels is imparted to articles. Hence, improvements can be made to the delivery of labels to tray-supported articles by enhancing the timing of label advancement to correspond with the expected position of a subsequent article to be labelled.

It is envisioned that any of a number of signal processing techniques can be utilized to monitor and characterize variations in elevational positioning (as well as adjacent spacing between articles) of articles that contact and displace peel plate 70.

As shown in FIG. 3, peel plate 70 is pivotally carried by a main plate (or base) of label transfer mechanism 12. A tray 32 of articles 26 is moved beneath label transfer mechanism 12 such that contact occurs with peel plate 70 along lip edge 80. Such contact causes pivotal raising of peel plate 70 and application of a label 24 to an article 26. Such contact is also detected as peel plate movement via sensor 138 and magnet 139 (of FIG. 3). Sufficient timing is required to feed a subsequent label for delivery to the next article, following delivery of a label 24 to a previous article. Hall-effect sensor 148 can be substituted for sensor 138 such that pivotal movement of peel plate 70 is detected.

As shown in FIG. 3, sensor 138 is implemented as a switch via a Hall-effect sensor that is carried at a stationary location in the base plate of label transfer mechanism 12. A marker 139 of magnetic material is embedded in an adjacent side of peel plate 70, next to the stationary base plate, with sensor 138 (or Hall-effect sensor 148) embedded flush within such base plate. Movement of such peel plate 70 and marker 139 generates a detectable analog signal via such sensor (or switch) which is detectable by processor 114 via a threshold detector that turns such analog signal into a digital "on"/"off" signal. Accordingly, the pivotal movement of peel plate 70 can be monitored so as to detect when contact (and label application) occurs with articles 26.

Information relating to the relative amount of movement of peel plate 70 (highest and lowest positions) that is imparted by contact with articles 26, as well as the timing of such movement induced with contact by articles 26, can be utilized to predict when a next label needs to be advanced for delivery. Additionally, such detection enables a determination of when a new tray 32 is being fed beneath label transfer mechanism 12 (see FIG. 3). The positioning of a new tray can be spaced apart from a preceding tray such that the distance between apples is greater. Optionally, such trays can be nested in adjoining contact such that the distance between adjacent (on adjacent trays) apples still varies, based upon the rows, positioning and sizing of such trays. If the number of apples in individual rows of a tray is known, modifications can be made when controllably delivering labels 24 via peel plate 70 by modifying the speed of operation of motors 92 (of FIG. 3) and motor 74 (see FIG. 2) so as to correspond to the desired delivery speed which enhances label delivery to articles 26, no matter which tray such articles are positioned within.

Also shown in FIG. 5, printer PC board 113 signal-couples via processor 114 with an optical sensor 115. Such optical sensor 115 is positioned within print head assembly 40 to detect a center position for each label 24 positioned along carrier 22. Such optical sensor 115 comprises an optical emitter and a detector positioned on opposing sides of carrier 22. Carrier 22 is translucent, or semi-transparent, with labels 24 imparting additional opacity thereto. Accordingly, optical sensor 115 is positioned on either side of carrier 22 about a hole in guide member 94 (of FIG. 3) such that individual labels 24 interrupt the detectable passage of light therethrough. Accordingly, a beginning edge portion and a trailing edge portion of a label can be monitored, by calculating the mid-point which corresponds with a center line position extending transverse of the travel direction of such label. Carrier 22 is accurately guided along guide member 94, within a carefully sized elongate slot which prevents any lateral movement such that sensor 115 can detect a label center position along the carrier. Hence, the positioning of labels 24 on carrier 22 is accurately placed and determined such that optical sensor 115 is only required to monitor the positioning of labels 24 along the elongate direction of carrier 22. Detection of such center position on each label 24 is necessary in order to accurately place print information 108 and 110 (see FIG. 4) onto individual apple labels 24 (or label 102 of FIG. 4).

Printer (PC) board 113 contains flash memory that enables downloading of one image comprising print information for a label. Other images of print information are stored in memory of main controller board 140. Hence, the bulk of such information is stored on board 140 which reduces the amount of information that needs to be stored on board 113 at any given time.

Figure 6:
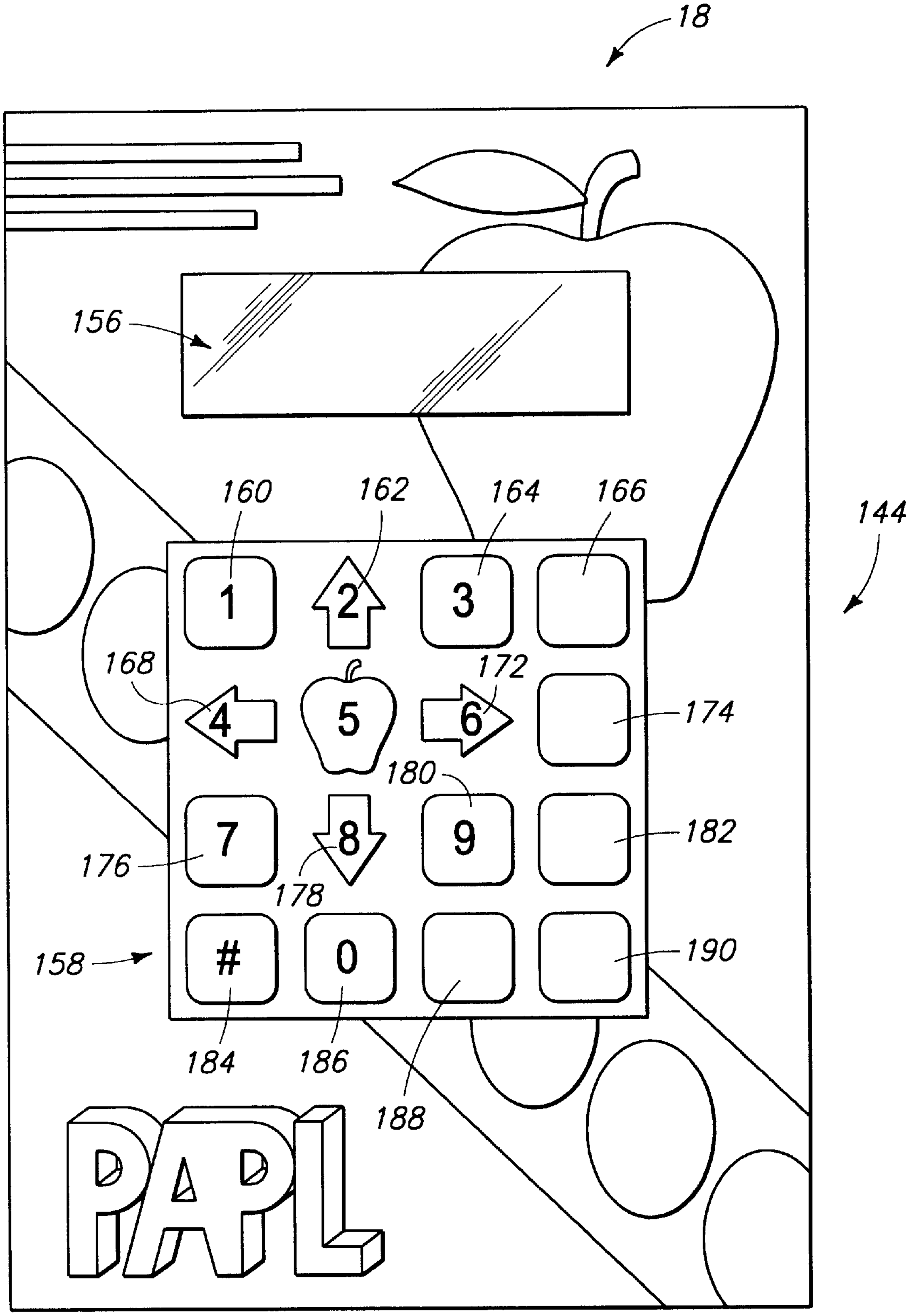
FIG. 6 is a graphical/tactile user interface for the automated labelling machine of FIGS. 1–3 and 5 illustrating one implementation having a display and a keypad or keyboard.

FIG. 6 illustrates another important aspect of Applicant's invention. It has been found by Applicant that utilization of optical sensor 115 (see FIGS. 3 and 5) enables relatively accurate placement of print information 108 and 110 (see FIG. 4) onto labels. However, it is often necessary that an operator be enabled with the ability to more accurately adjust the positioning of print information 108 and 110 such that a label 102 is imparted with a high degree of accuracy and a clean and neat appearance as shown in FIG. 4. In order to achieve such result, Applicant's invention enables the ability for an operator to finely adjust or tune such positioning by way of user interface 118 as depicted in FIG. 6. Hence, labels are imparted with a more precise, readable and neat appearance.

As shown in FIG. 6, user interface 18 includes a display screen 156 and a keyboard, or keypad, 158. Display screen 156, according to one implementation, comprises a liquid crystal display (LCD) signal-coupled via a 14-pin connector via keyboard display interface 208 (of FIG. 7) and 14-pin display connector 200 (see FIG. 23). Also shown in FIG. 23, a keyboard layout is depicted for a C&K 4B01H322PCFQ keyboard. Such layout corresponds to the keyboard depicted in FIG. 6.

More particularly, keyboard 158 is laid out as a 4×4 switch array. One such construction comprises a set of input keys configured in the form of a keypad that interfaces via a keyboard interface containing a serial interface, logic circuitry and a keyboard controller to enable a user to input information via user interface 18 with main controller board 140 and/or printer PC board 113.

According to one construction, keyboard 158 comprises a keypad containing input keys 160–190. Such input keys 160–190 comprise electromechanical input devices, each input key comprising a key switch configured from any of a number of presently understood designs. According to one construction, an input key, or key switch, uses an elastomer or molded boot consisting of two collapsible domes. However, it is understood that various keyboard arrangements are possible, with many variations being found in many presently available keyboard/keypad device applications. Techniques for detecting input via an input key may be through magnetic read relays, solid-state circuits, or more exotic devices such as Hall-effect sensors. However, such operation is only incidental to the operation of Applicant's invention, and is intended to include any of a number of present membrane technologies suitable for constructing keys on a keypad or keyboard.

As shown in FIG. 6, input keys 160–164, 168–172, and 176–180 are visibly marked with labels comprising individually assigned reference numerals 1–3, 4–6, and 7–9, respectively. More particularly, reference key 162 is also marked (or labelled) with an "up arrow". Similarly, reference key 168 is marked with a "left arrow". Reference key 172 is marked with a "right arrow". Furthermore, reference key 178 is marked with a "down arrow".

The arrows represented by reference keys 162, 168, 172 and 178 enable an operator to adjust to the centered positioning of print information 108 and 110 (of FIG. 4) such that the print information 108 and 110 can be incrementally adjusted by an operator during a setup mode by depressing an arrow to incrementally move the print information in the desired direction and print a sample label. Accordingly, such information 108 and 110 can be adjustably positioned relative to a label to achieve an optically pleasant, accurate, and balanced placement of print information 108, 110 on apple label 102 (of FIG. 4). Accordingly, activation of any one of input keys 162, 168, 172 or 178 imparts an incremental movement or adjustment of print information 108 and 110 relative to the detected position of apple label 102 (of FIG. 4). Furthermore, each time one of input keys 162, 168, 172 and 178 are pushed, a sample label is printed such that an operator can visually determine whether such adjustment has produced a desirable repositioning of the print information on the label.

For example, each incremental selection of input key 162 adjusts the positioning of print information 108 and 110 relative to the detected position of label 102 by moving it upward 0.1 mm relative to pre-printed information 104, 106. Therefore, an operator is able to adjust positioning of printed information on a label in a setup mode by a desired amount via incrementing the number of times such input key is selected, or touched.

As shown in FIG. 6, input key 170 is utilized to toggle through a menu so as to select the specific apple type represented by print information 108. Accordingly, a list of apple types is displayed on display 156, wherein a user toggles between such selections via input key 170 so as to outline a desired apple type for assignment to print information 108 (of FIG. 4).

Similarly, input key 166 is labelled with "NEXT IMAGE" (not shown) which enables a user to toggle between a number of different desired images. Likewise, input key 174 is labelled "SELECT PLU#". Input key 174 enables an operator to toggle through and select one of a number of pre-stored PLU numbers that are visually displayed on display 156.

Input key 182 enables an operator to monitor printer status via display 156. For example, the printer status of individual print head assemblies 40 on individual label transfer mechanisms 12 (see FIGS. 1–3 and 5) can be monitored via display 156 by an operator at user interface 118. Furthermore, diagnostics can be performed for each individual print head assembly 40.

Furthermore, input key 190 is labelled "PRINTER TEST". Input key 190 enables an operator to initiate a printer test for each print head assembly 40 on each label transfer mechanism 12 (of FIGS. 1–3 and 5). Details of such printer tests are described below with reference to state diagrams depicted in FIGS. 50–59. Such implementation causes a label 102 (of FIG. 4) to be printed with print information 108 and 110 so that an operator can visually determine the default placement of such information onto label 102. Accordingly, an operator can then selectively adjust such positioning via input keys 162, 168, 172 and 178, via the software implementation provided by implementation of the state diagrams depicted in FIGS. 50–59.

Additionally, keyboard 158 includes input key 184, which is labelled "#". Likewise, input key 186 is labelled "0". Finally, input key 188 is labelled "ENTER". Input key 188 enables the entry of information which has been input via any of the other input keys on keyboard 158, as displayed on display 156.

Pursuant to the apparatus described above with reference to FIGS. 1–6, individual labels 24 (and 102) can be retrieved from a label reel 20 and imprinted with specific desired information by print head assembly 40 just before being applied to an article via peel plate assembly 42. Print head assembly 40 is operative to selectively print desired graphical/textual information onto each of labels 24 (and 102) as they pass therethrough. Carrier 22, which releasably supports labels 24 (and 102), is unwound from reel 20 by motors 74 (of FIG. 2) and 92 (of FIG. 3). Take-up reel 44 assists in unwinding reel 20 by applying travel tension to carrier 22, downstream of peel plate assembly 42, as shown in FIG. 3. Carrier 22 and labels 24 (and 102) enter print head assembly 40 via an entrance aperture for printing onto labels 24 (and 102). Carrier 22 and labels 24 (and 102) exit print head assembly 40 through an exit aperture and are delivered to a peel plate assembly 42 for application to articles 26 via lip edge 80. Pursuant to one implementation, carrier 22 is advanced sufficiently such that individual labels are substantially peeled away from carrier 22, but with sufficient retention remaining to present such adhesive-backed label for engagement and delivery onto individual articles 26.

Figure 7:
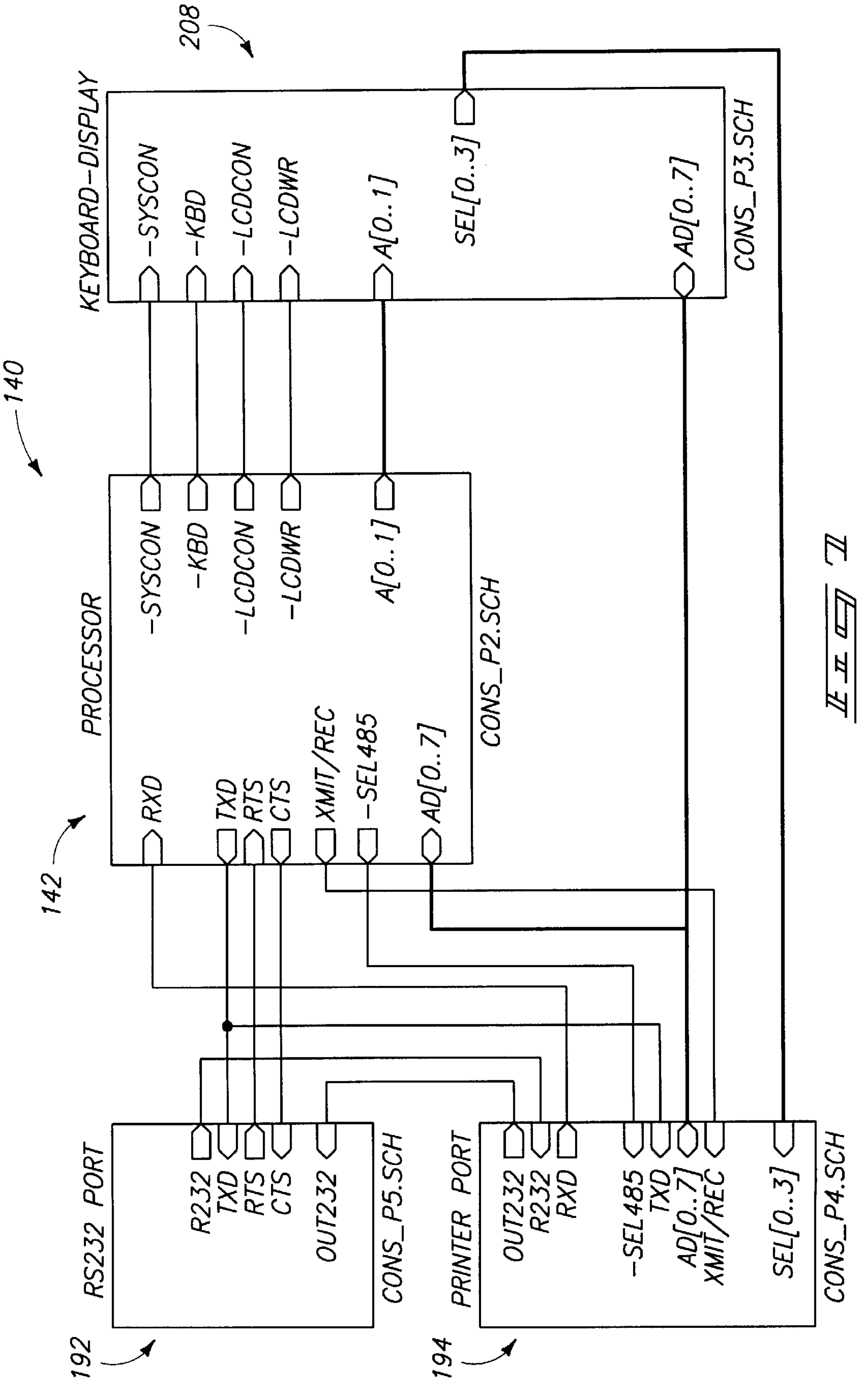
FIG. 7 is a schematic block diagram of a main controller board contained within the user interface depicted in FIG. 6 illustrating various interface ports.
Figure 8:
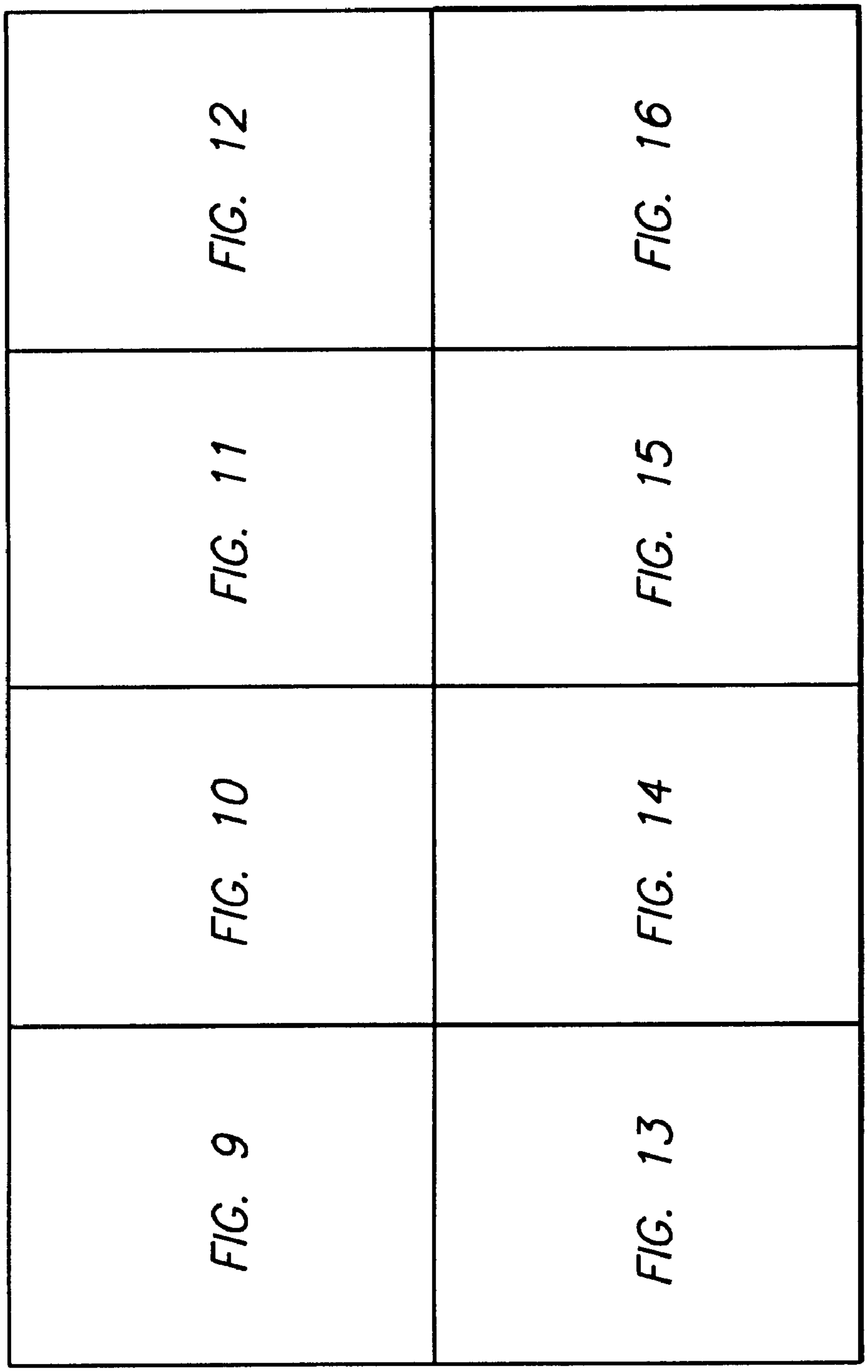
FIG. 8 is a layout illustrating the assembly of FIGS. 9–16.
Figure 9:
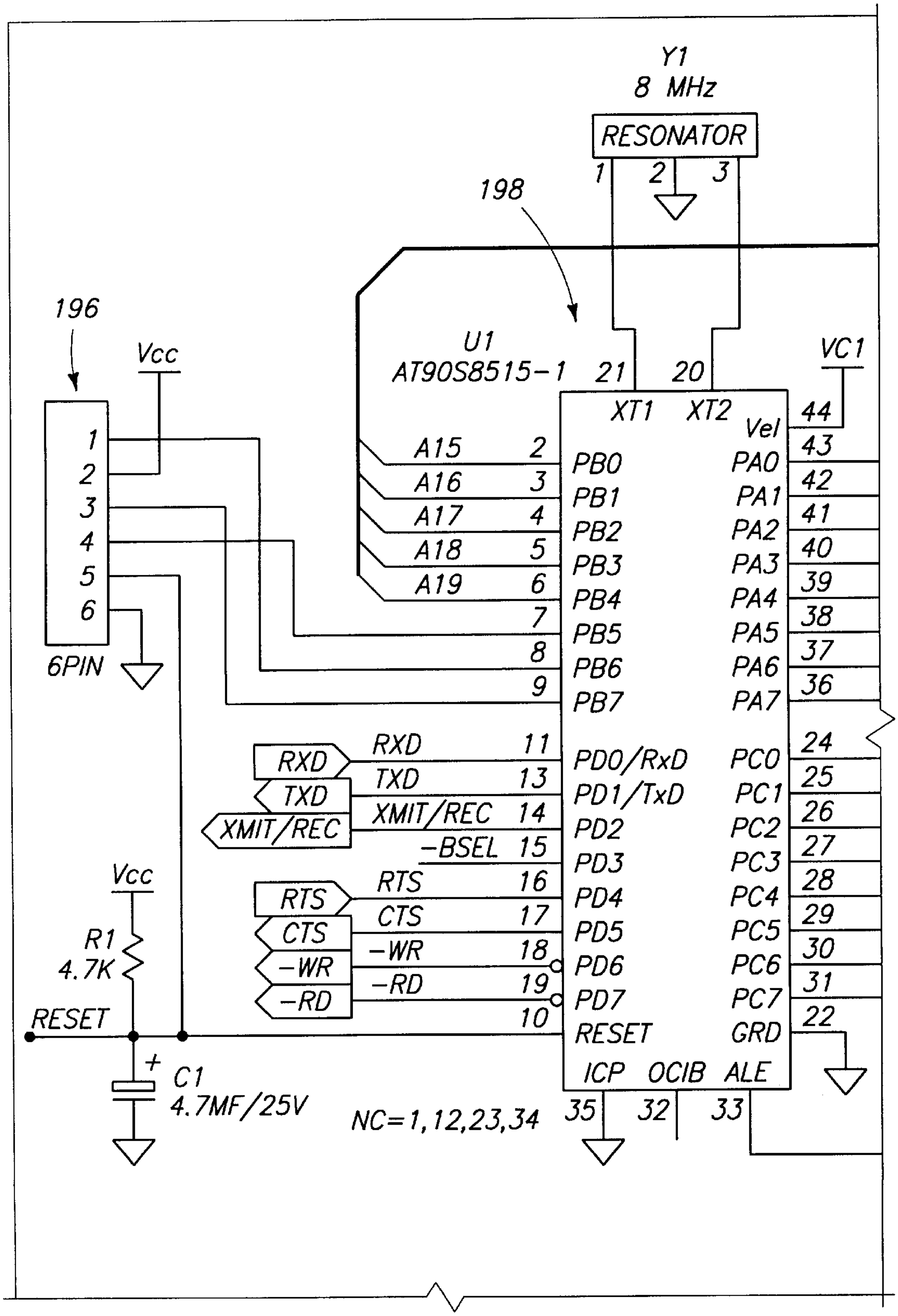
FIGS. 9–16 are first through eighth portions, respectively, of FIG. 8, illustrating processing circuitry and a processor of the main controller board depicted in FIG. 7.
Figure 10:
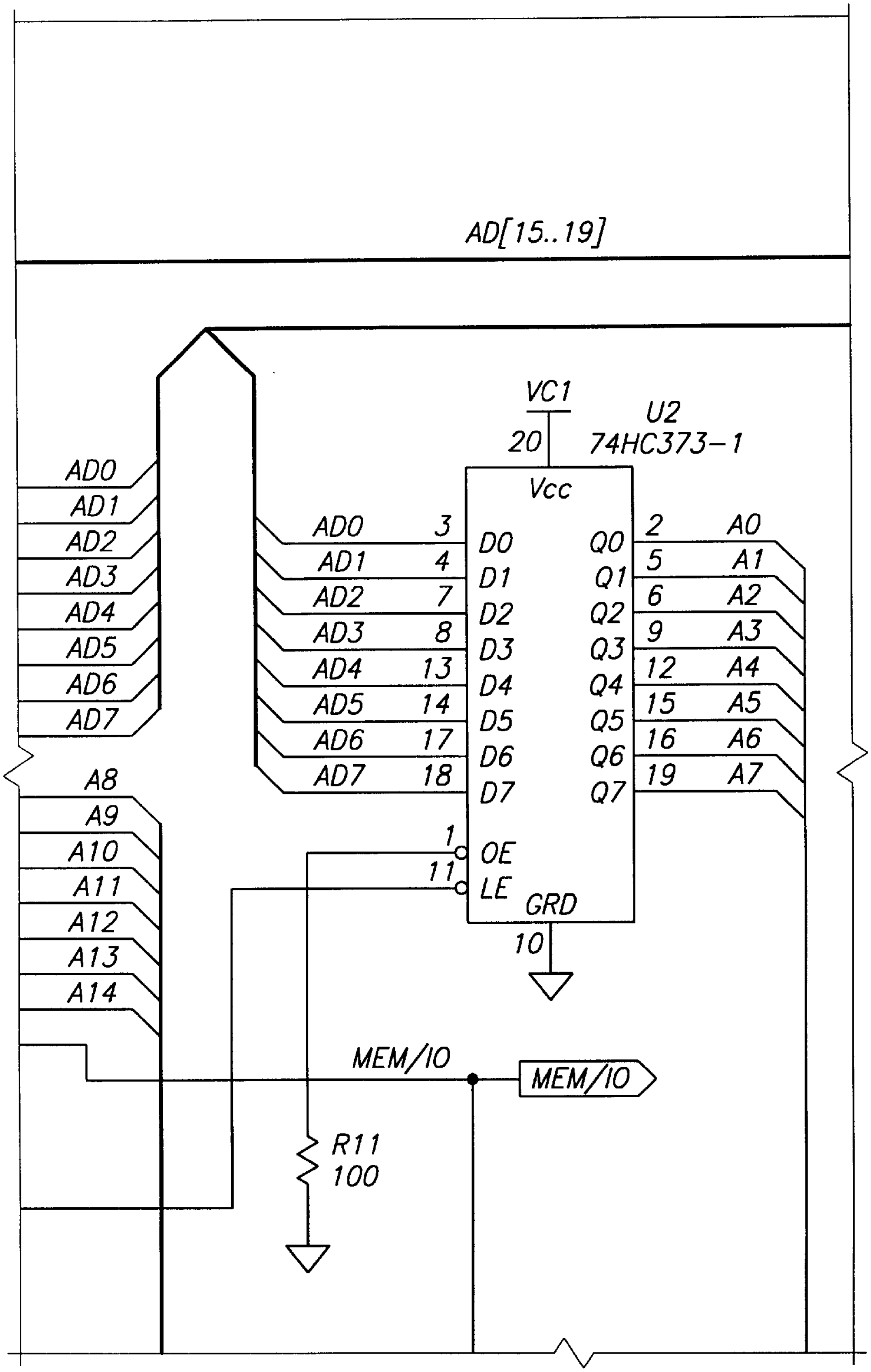
Figure 11:
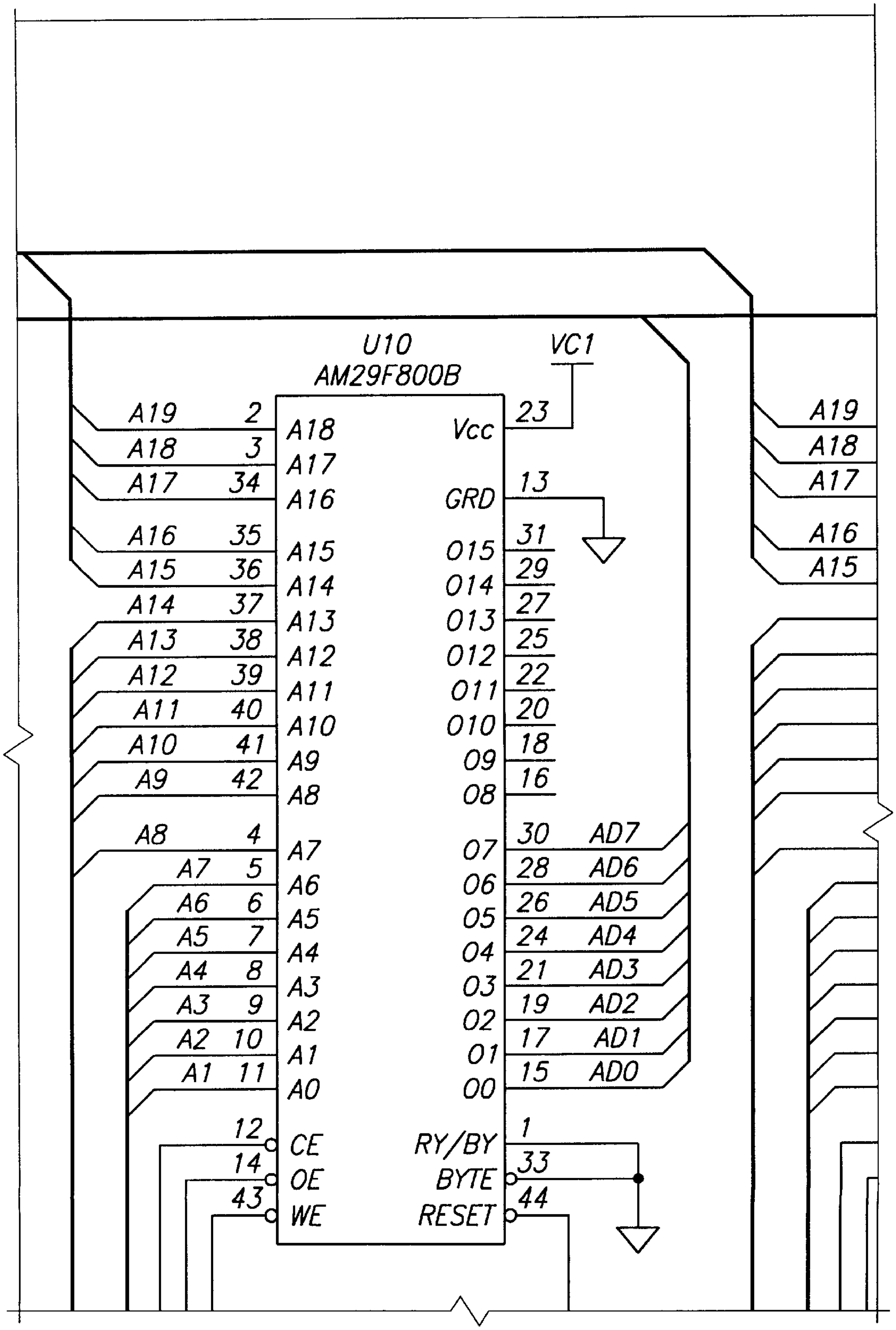
Figure 12:
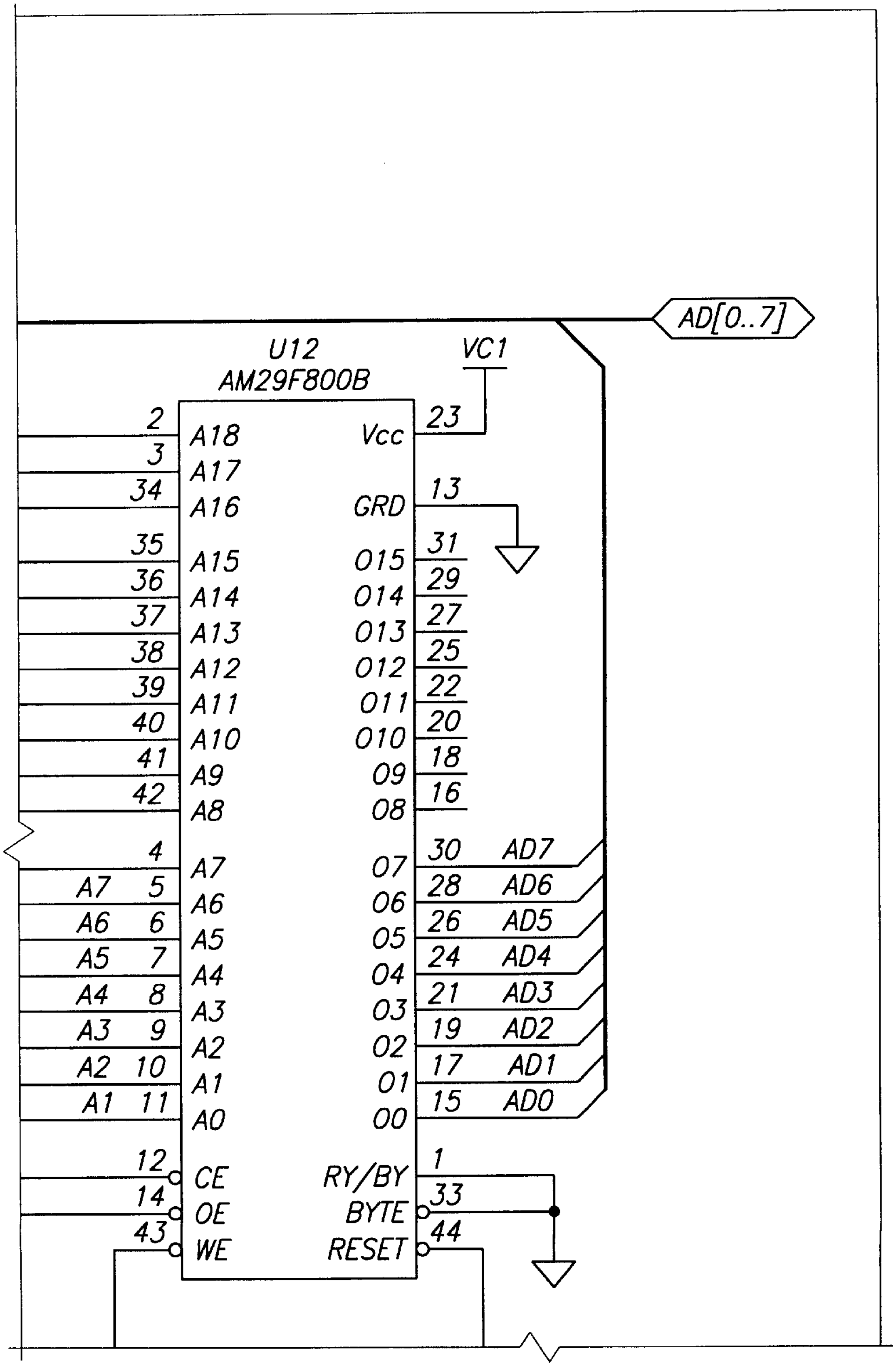
Figure 13:
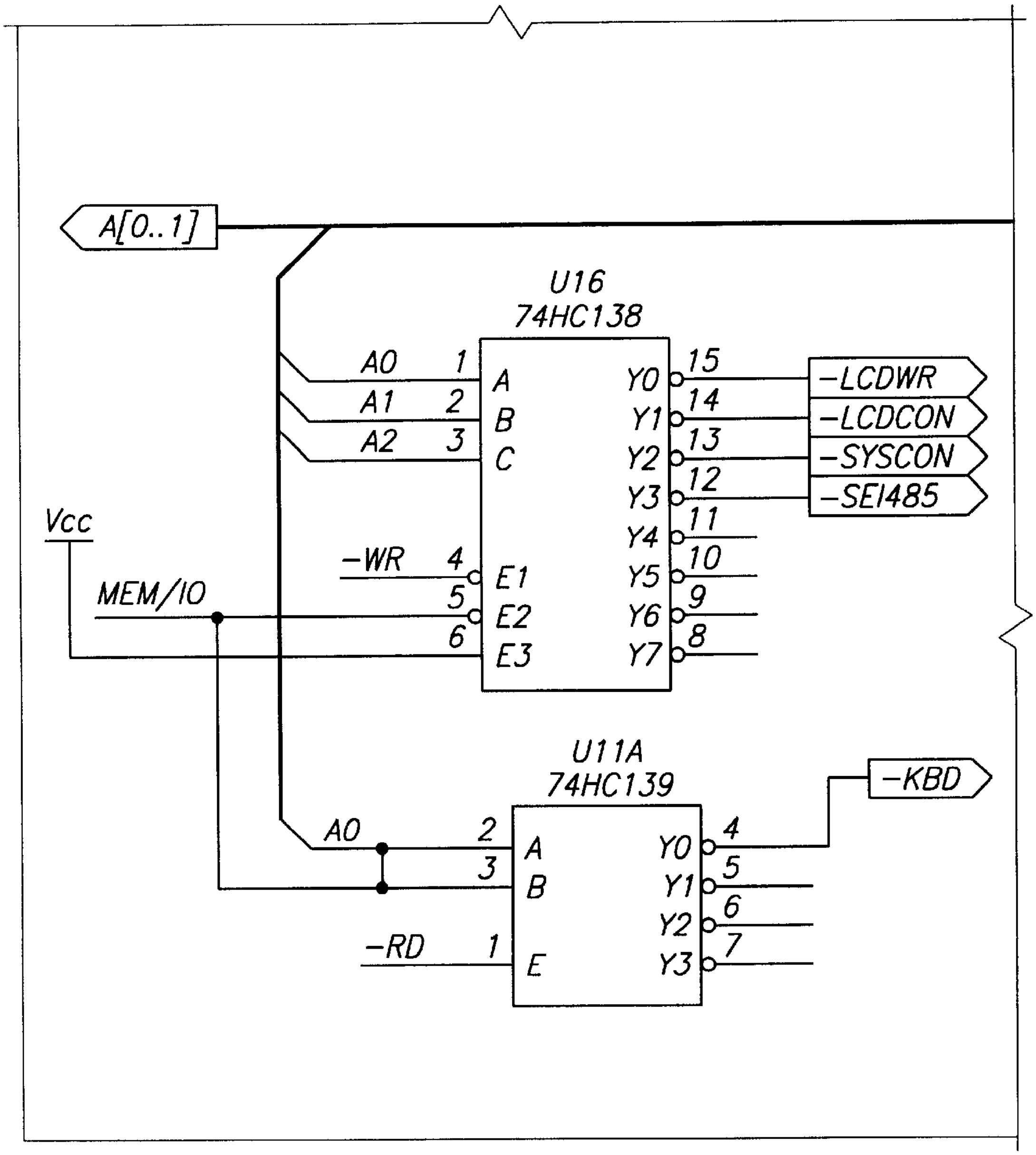
Figure 14:
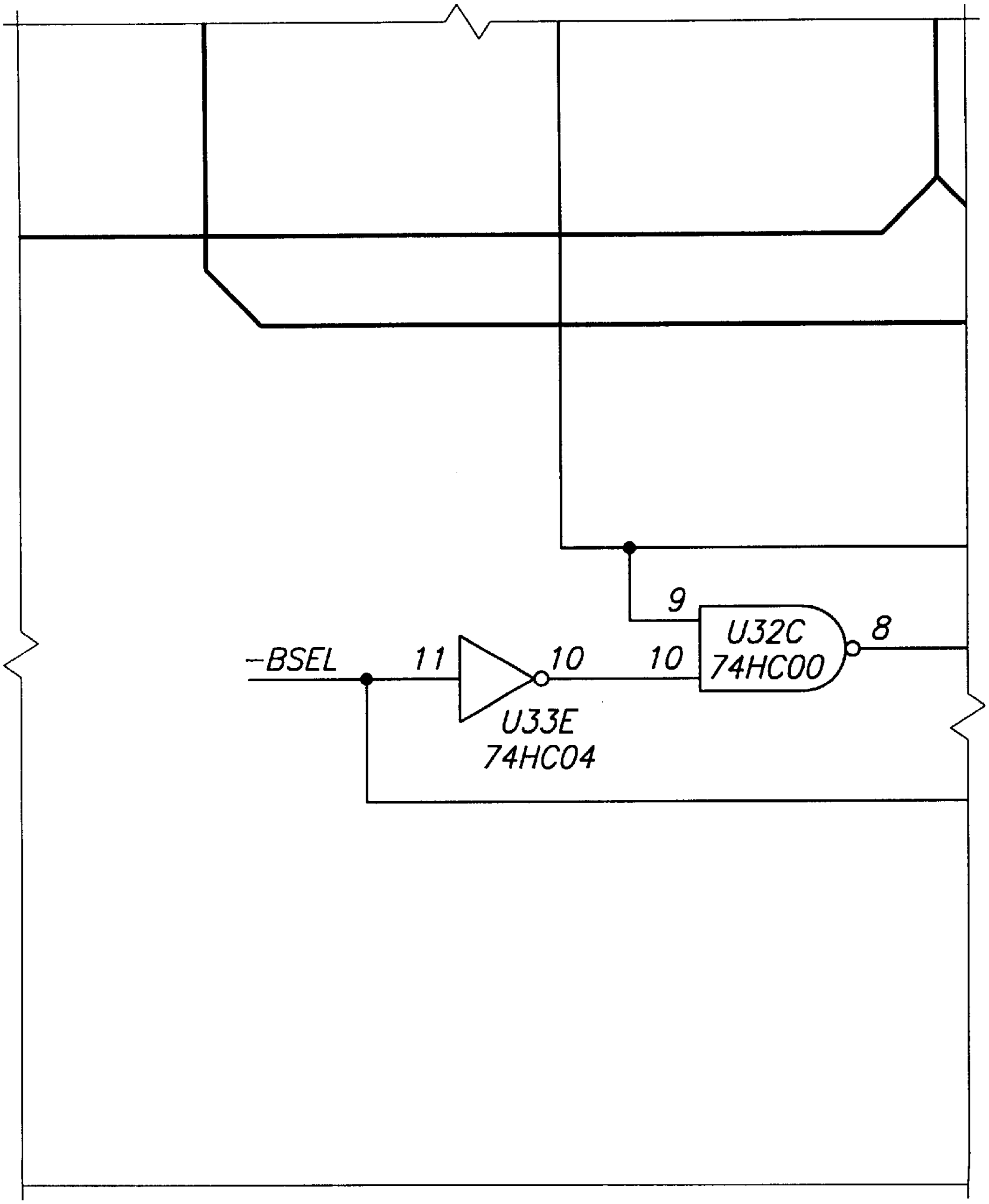
Figure 15:
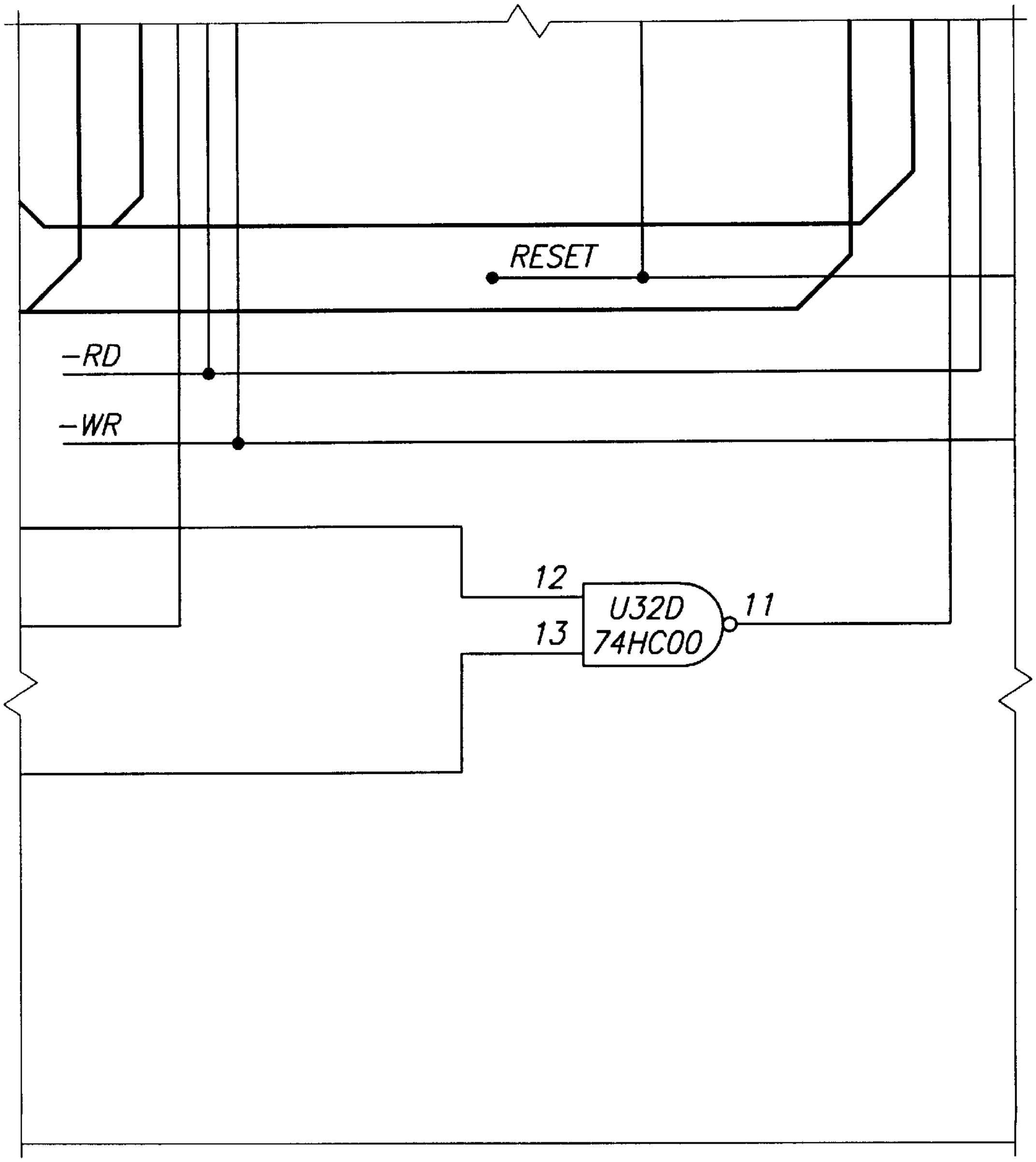
Figure 16:
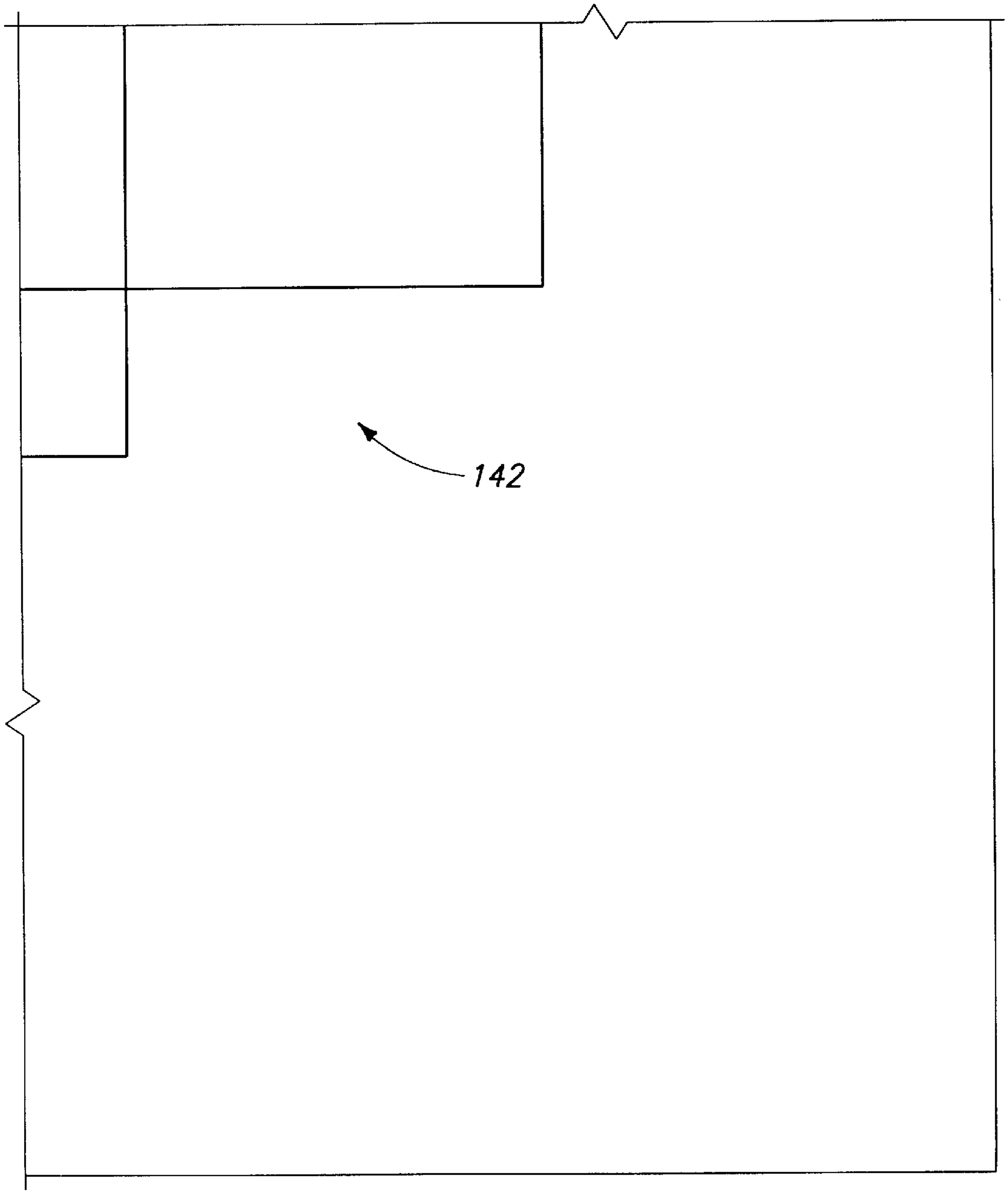
Figure 17:
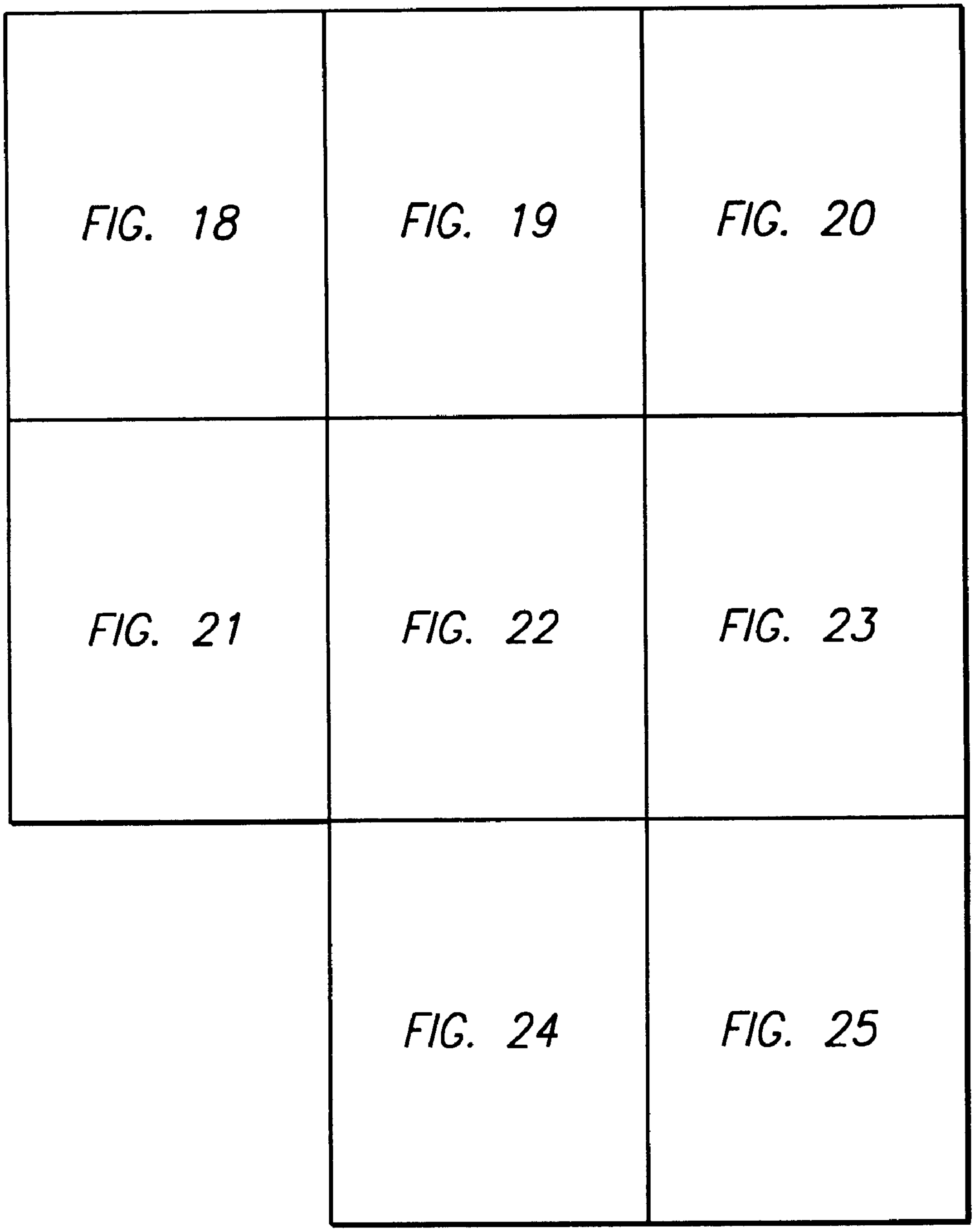
FIG. 17 is a layout illustrating the assembly of FIGS. 18–25.
Figure 18:
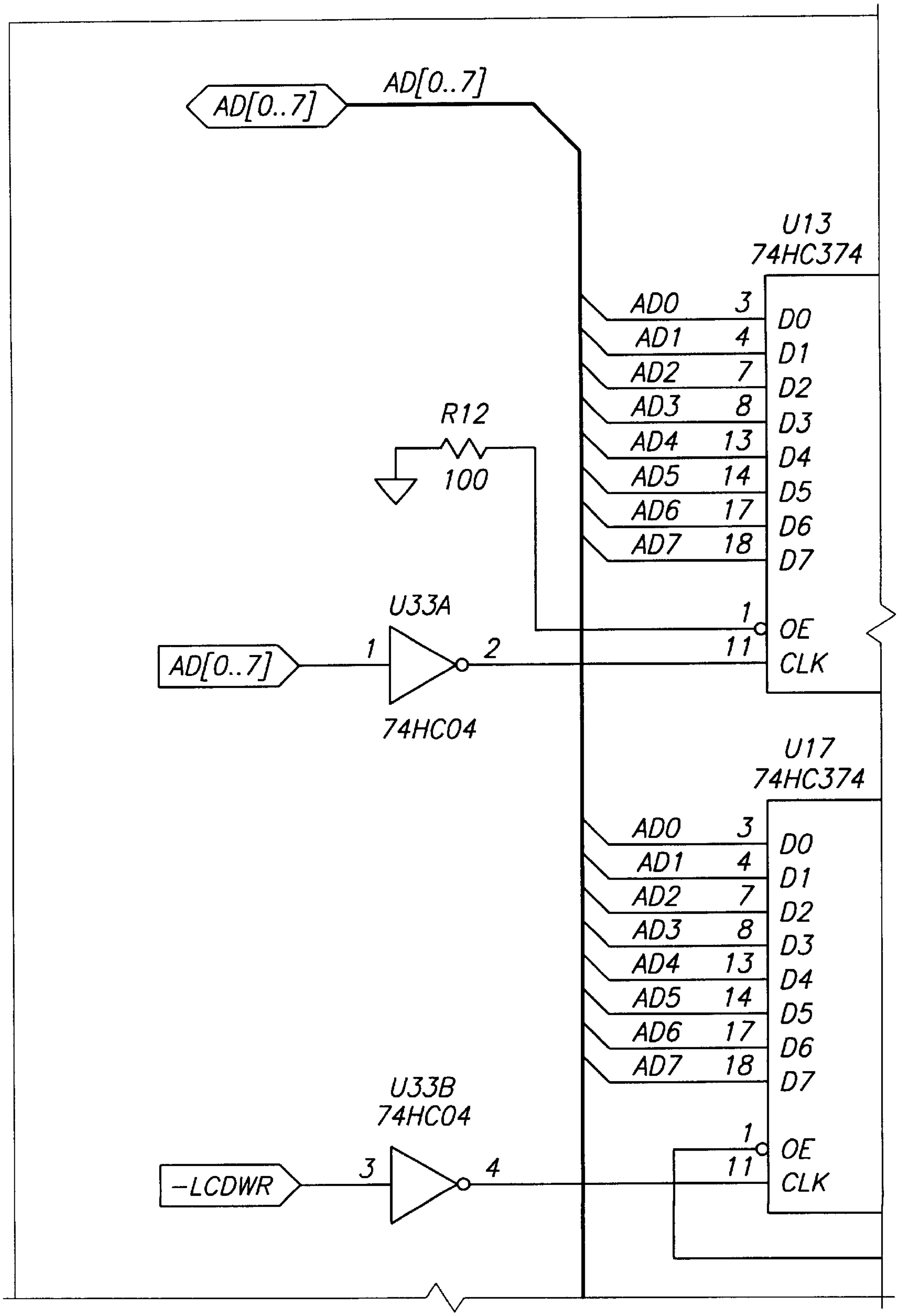
FIGS. 18–25 are first through eighth portions, respectively, of FIG. 17, illustrating the user interface, or keyboard-display keyboard, illustrated in FIG. 7.
Figure 19:
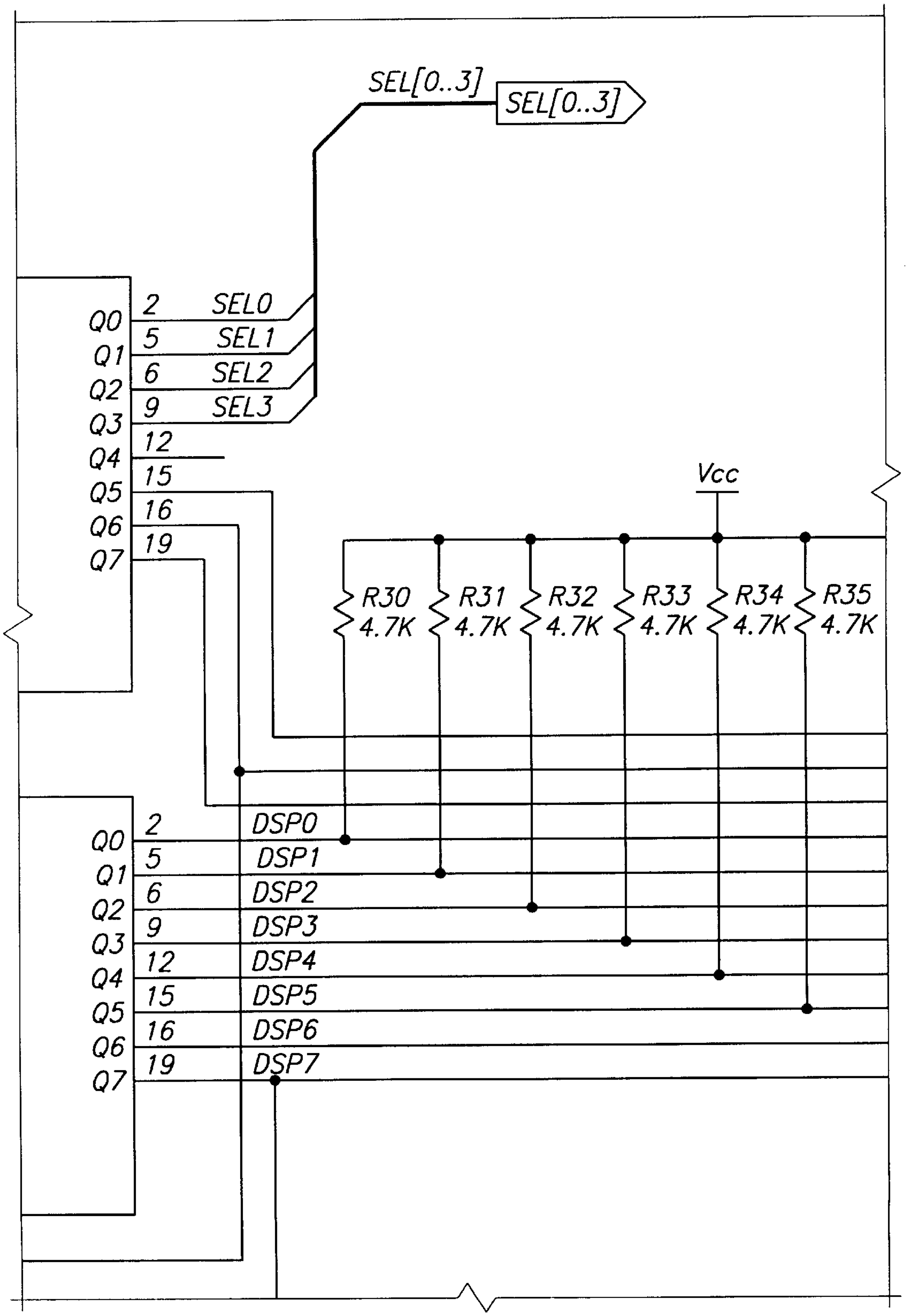
Figure 20:
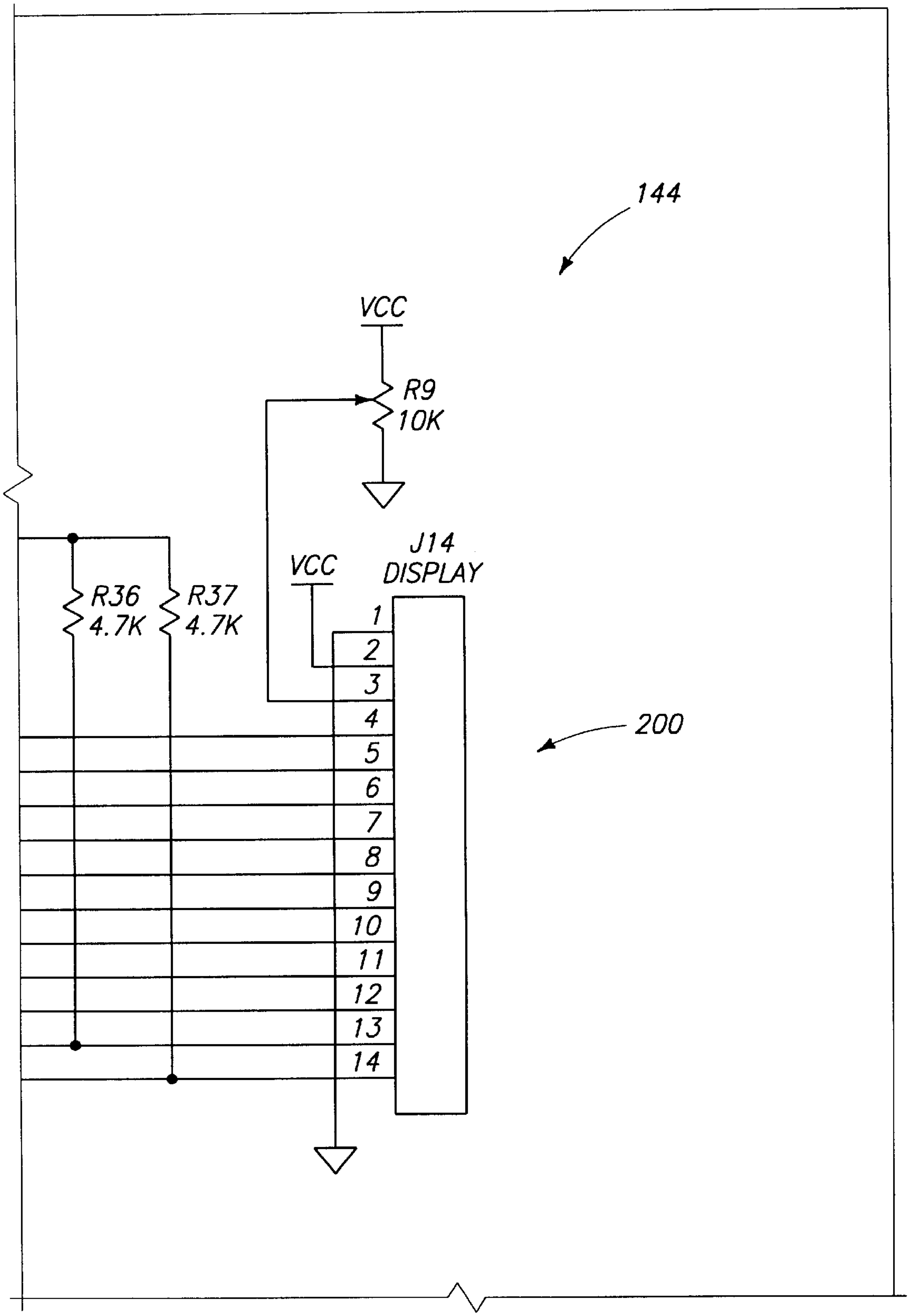
Figure 21:
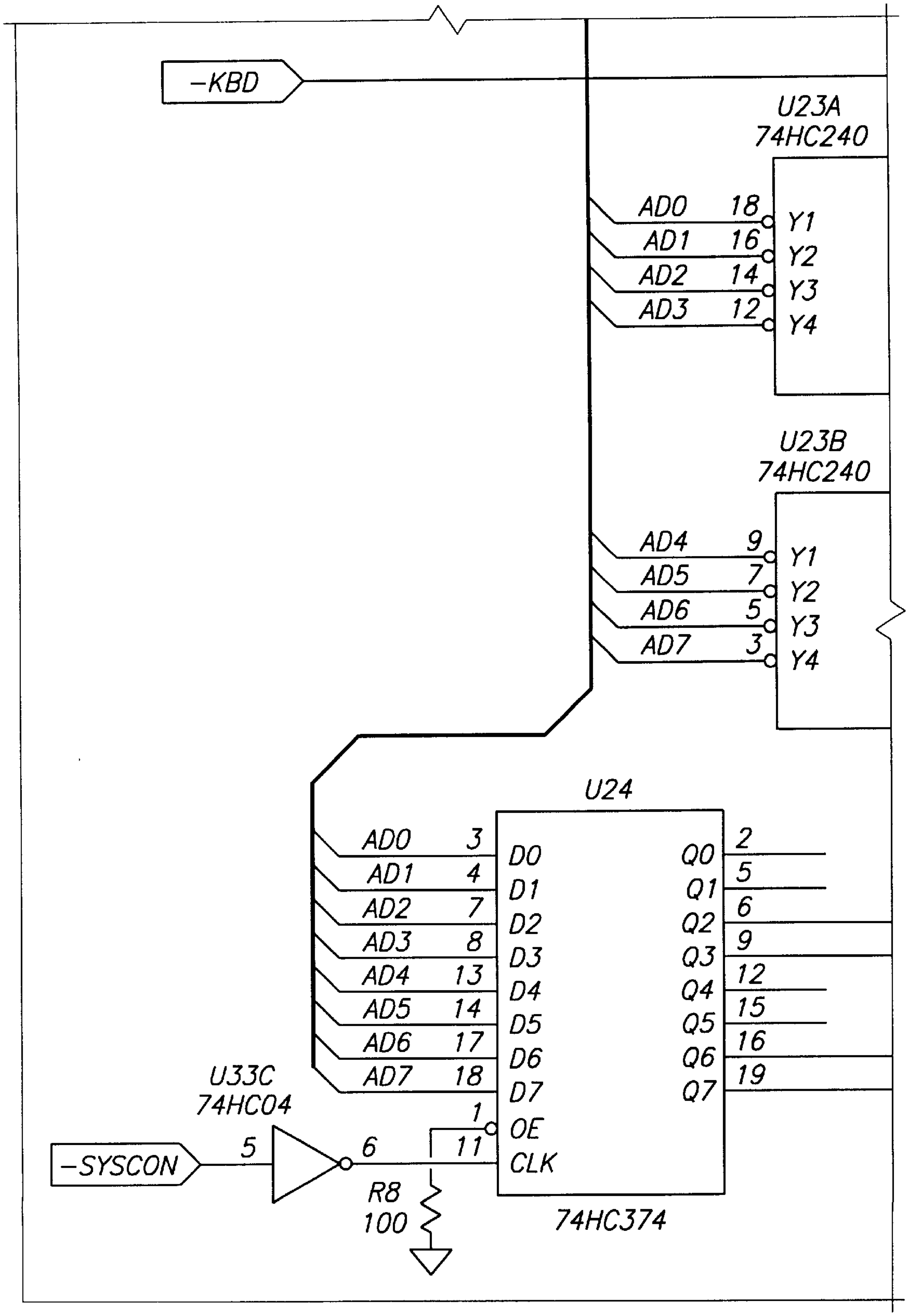
Figure 22:
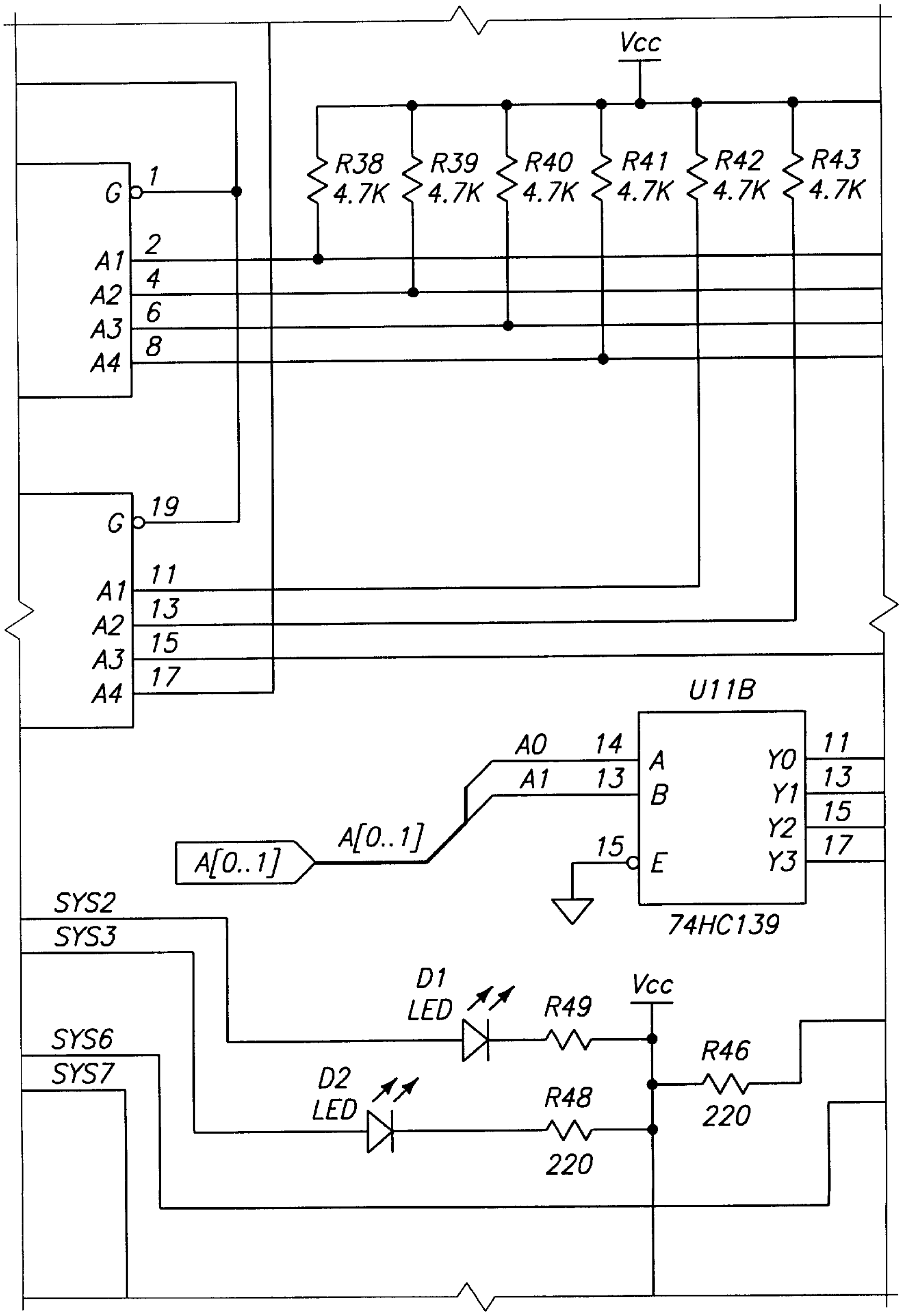
Figure 23:
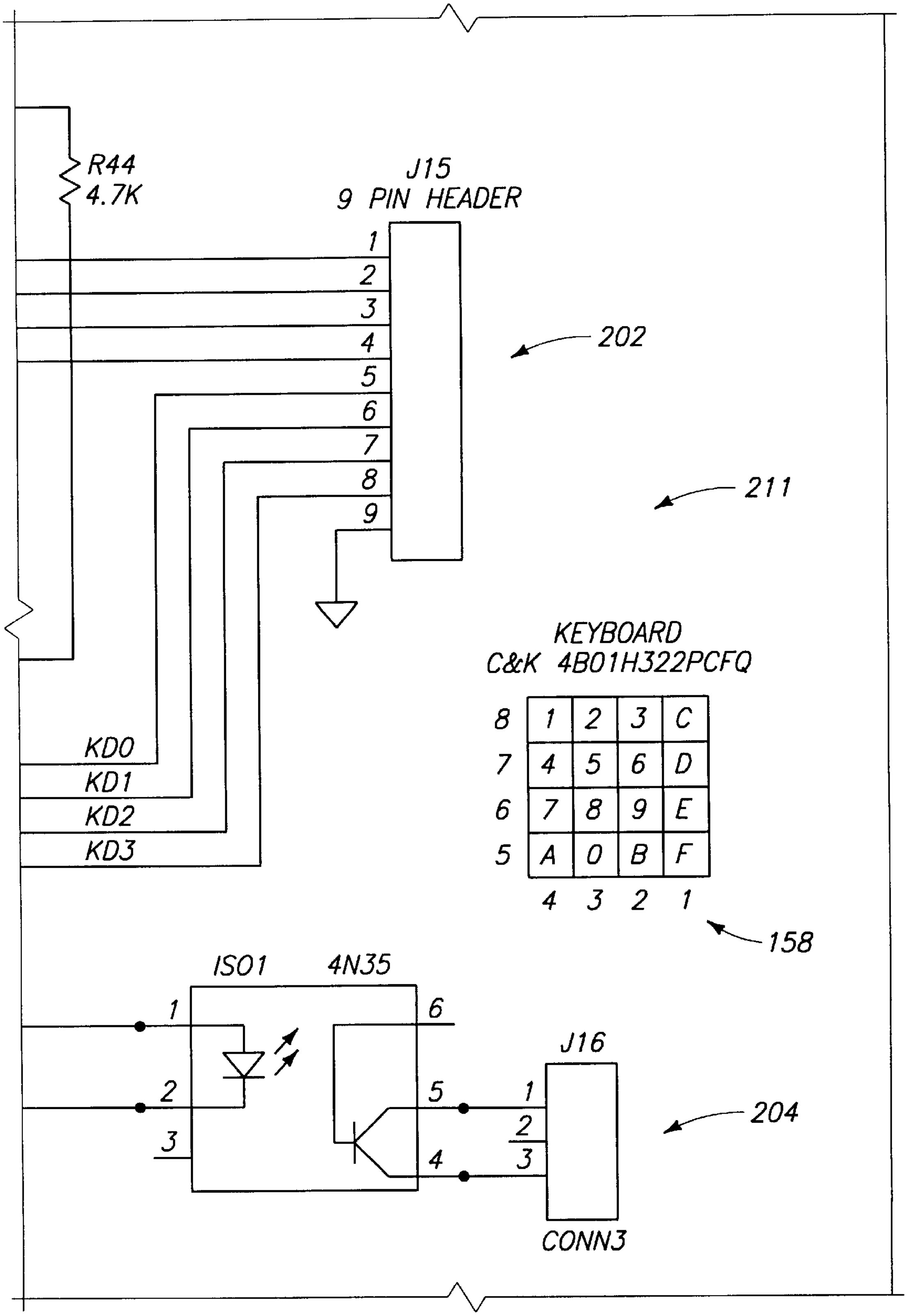
Figure 24:
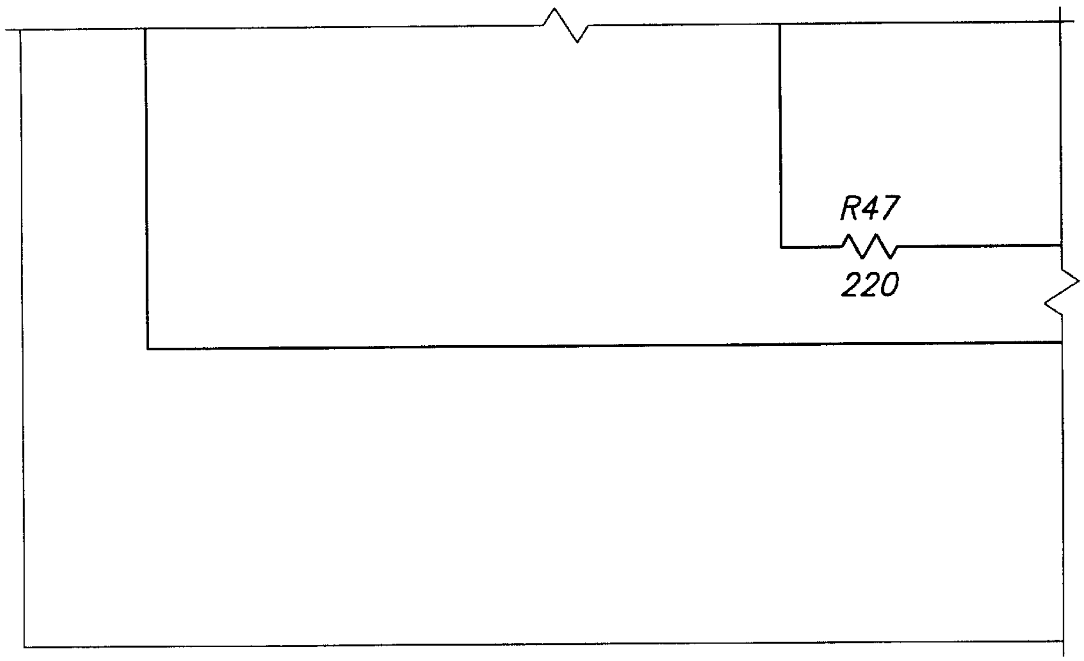
Figure 25:
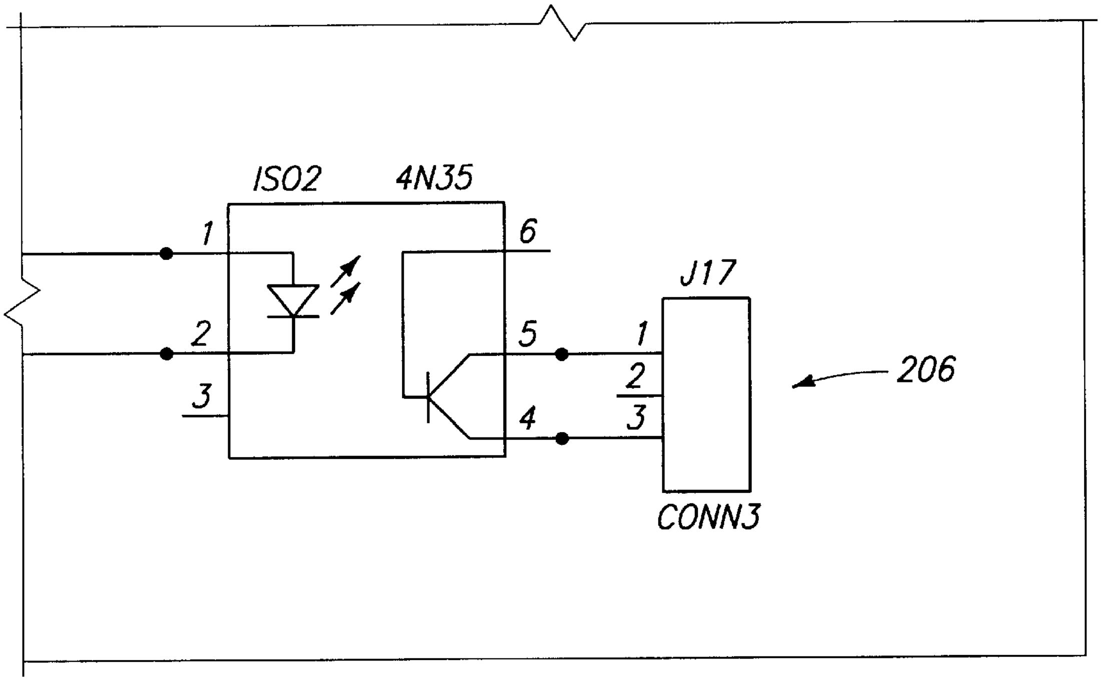
Figure 26:
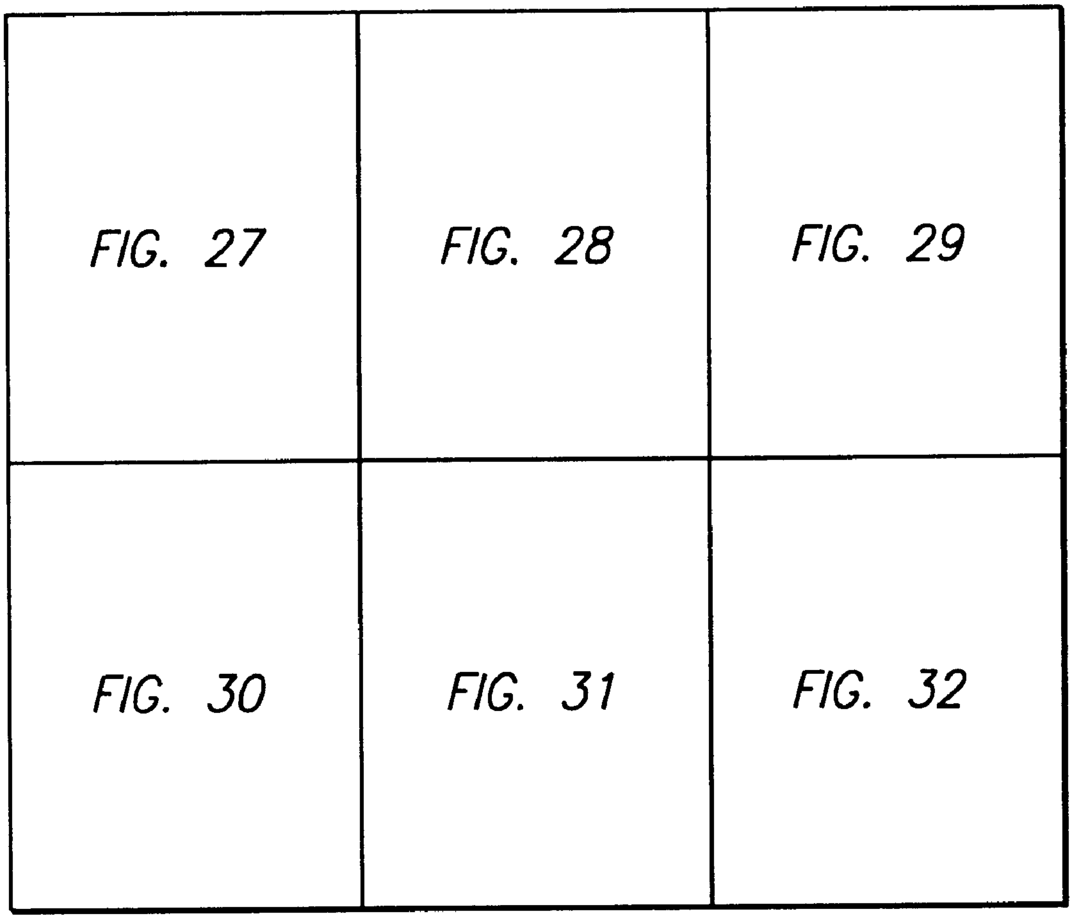
FIG. 26 is a layout illustrating the assembly of FIGS. 27–32.
Figure 27:
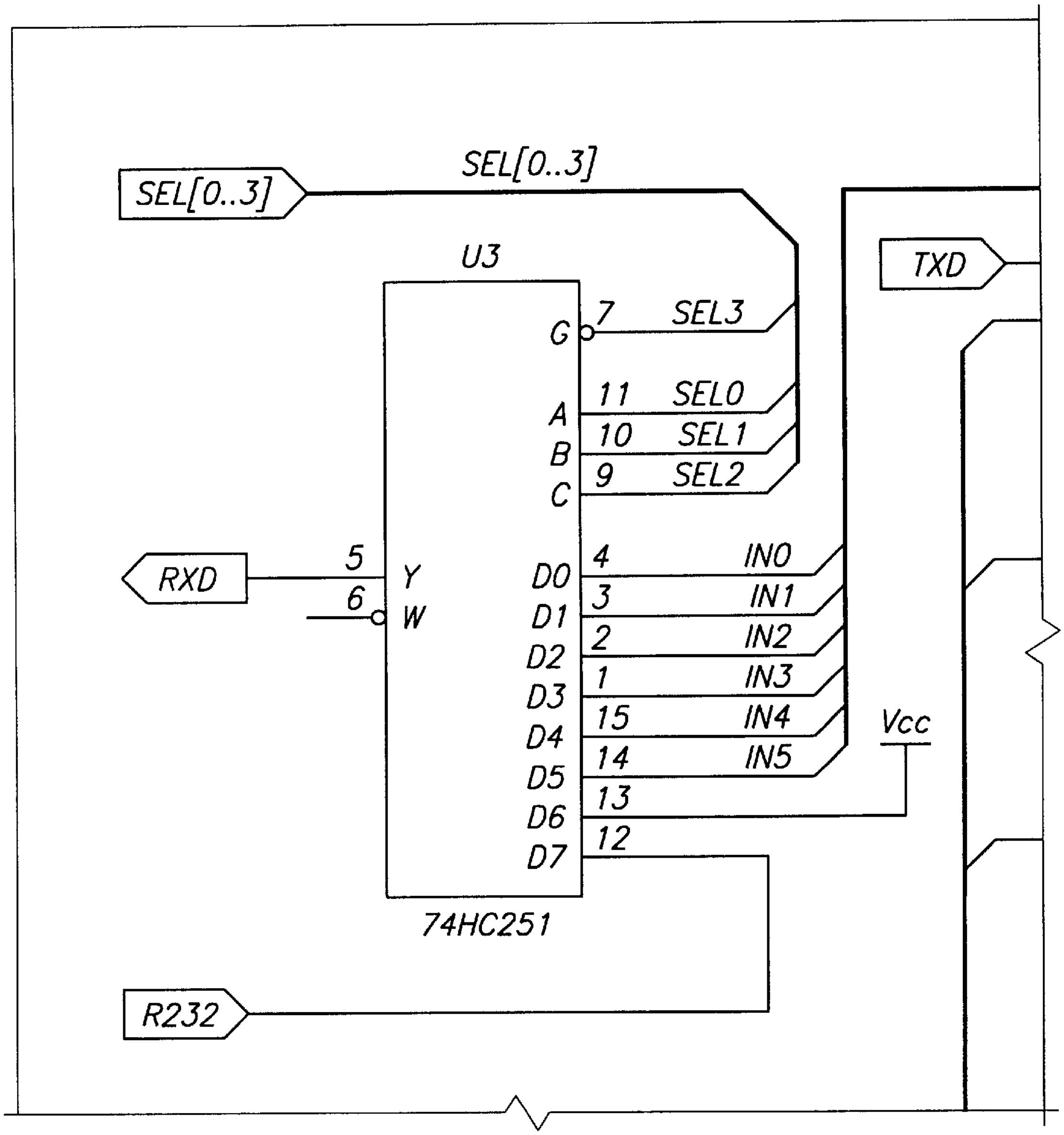
FIGS. 27–32 are first through sixth portions, respectively, of FIG. 26, illustrating printer interface circuitry that interfaces with the printer port depicted in FIG. 7.
Figure 28:
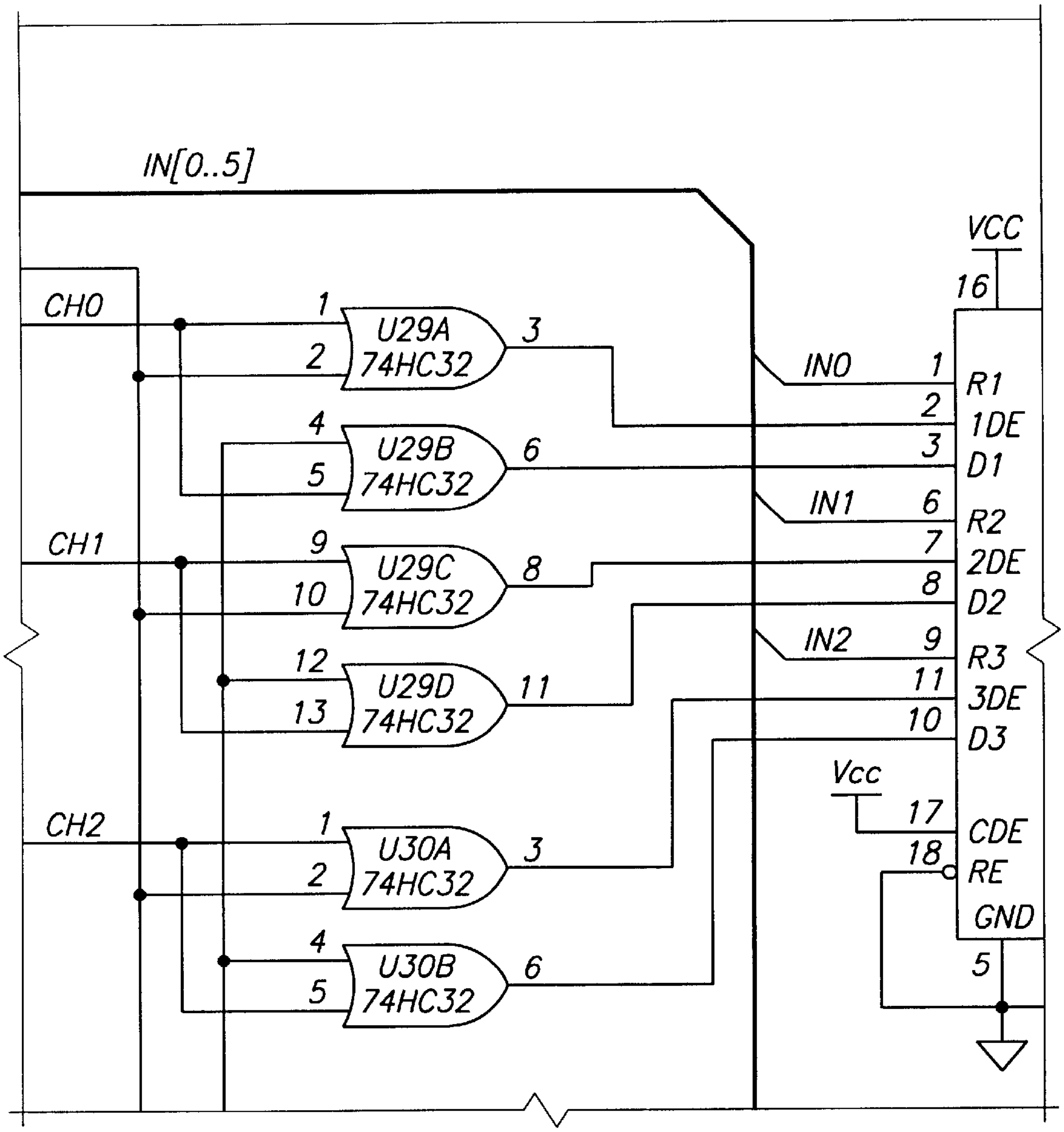
Figure 29:
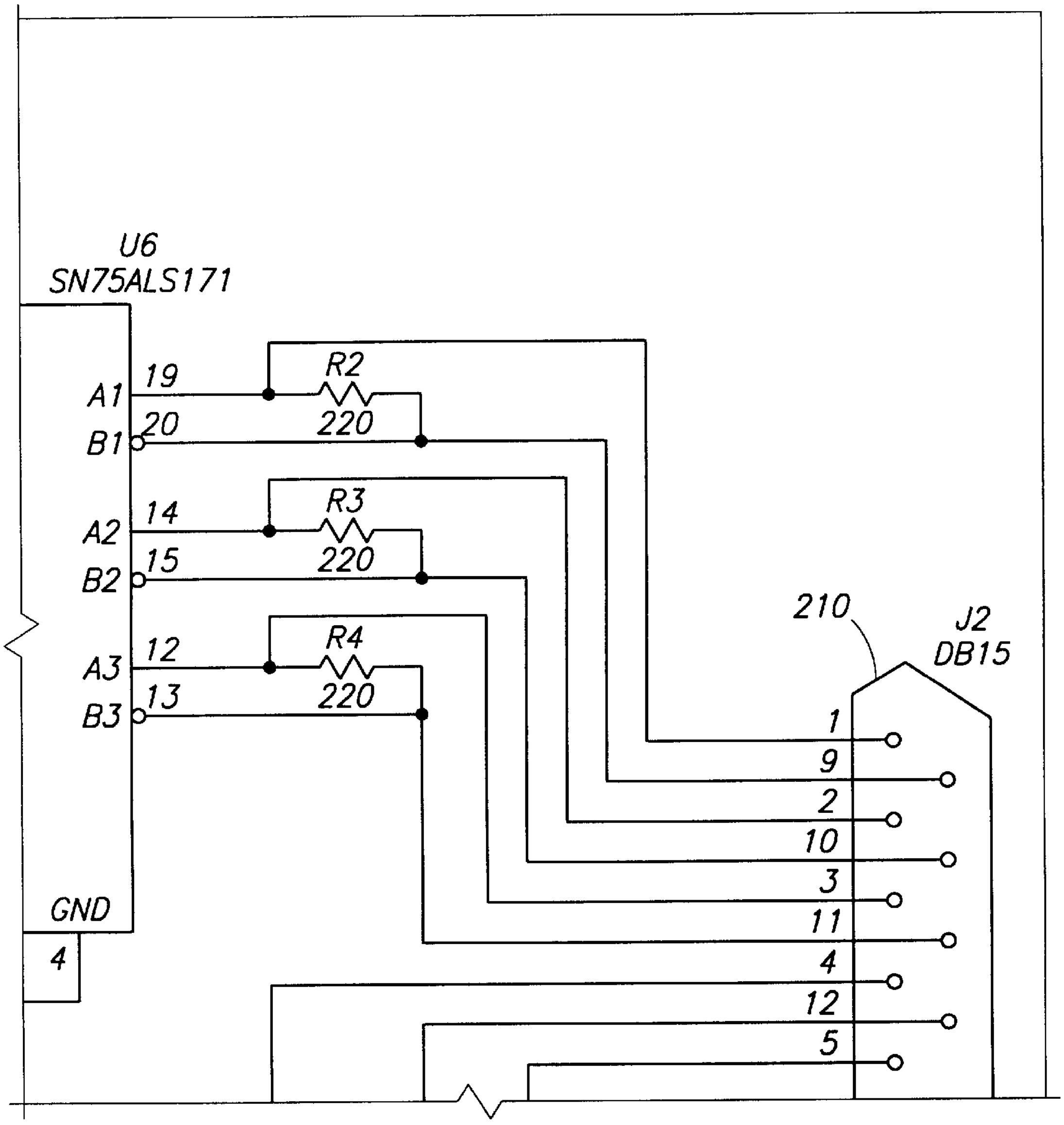
Figure 30:
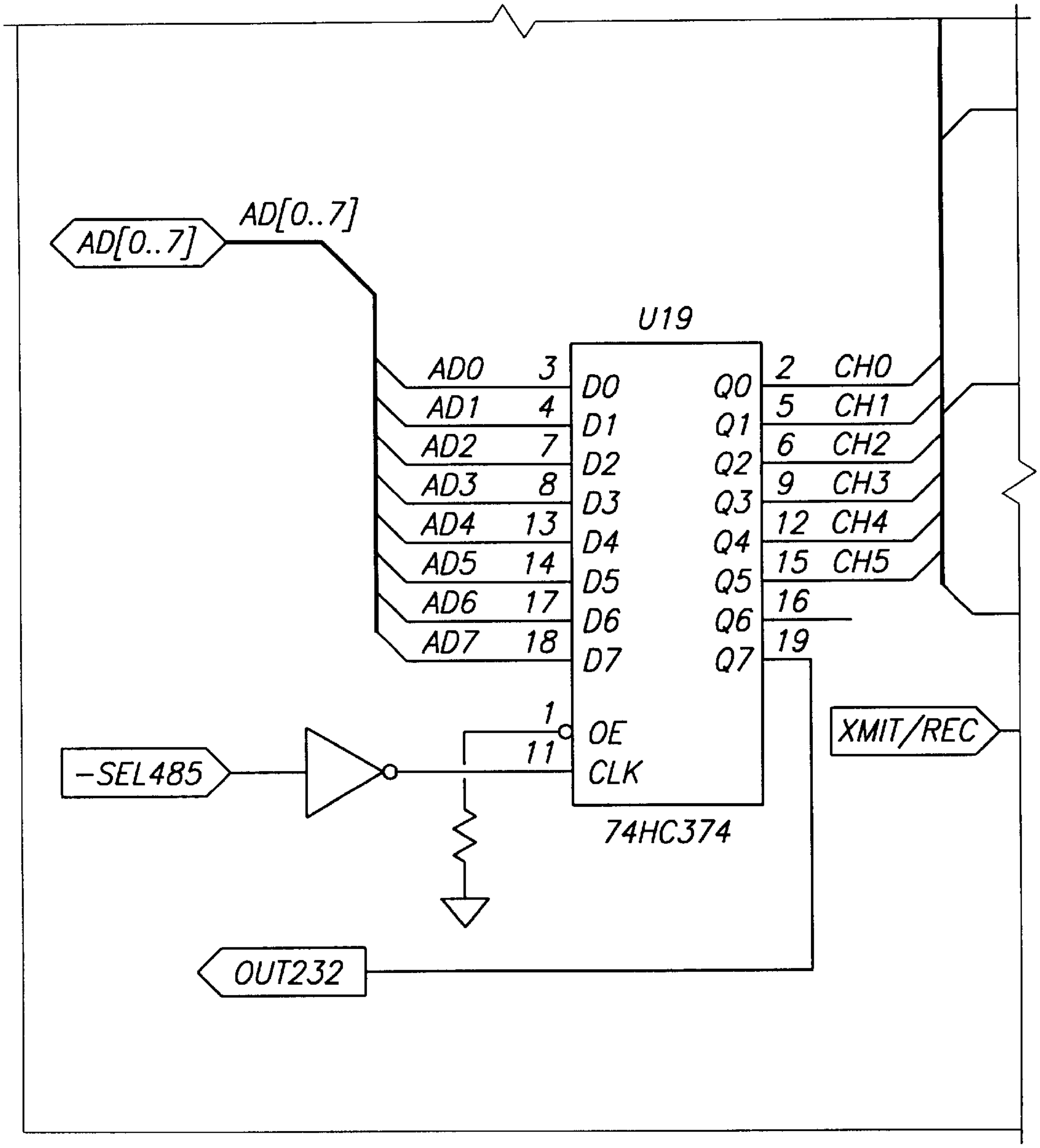
Figure 31:
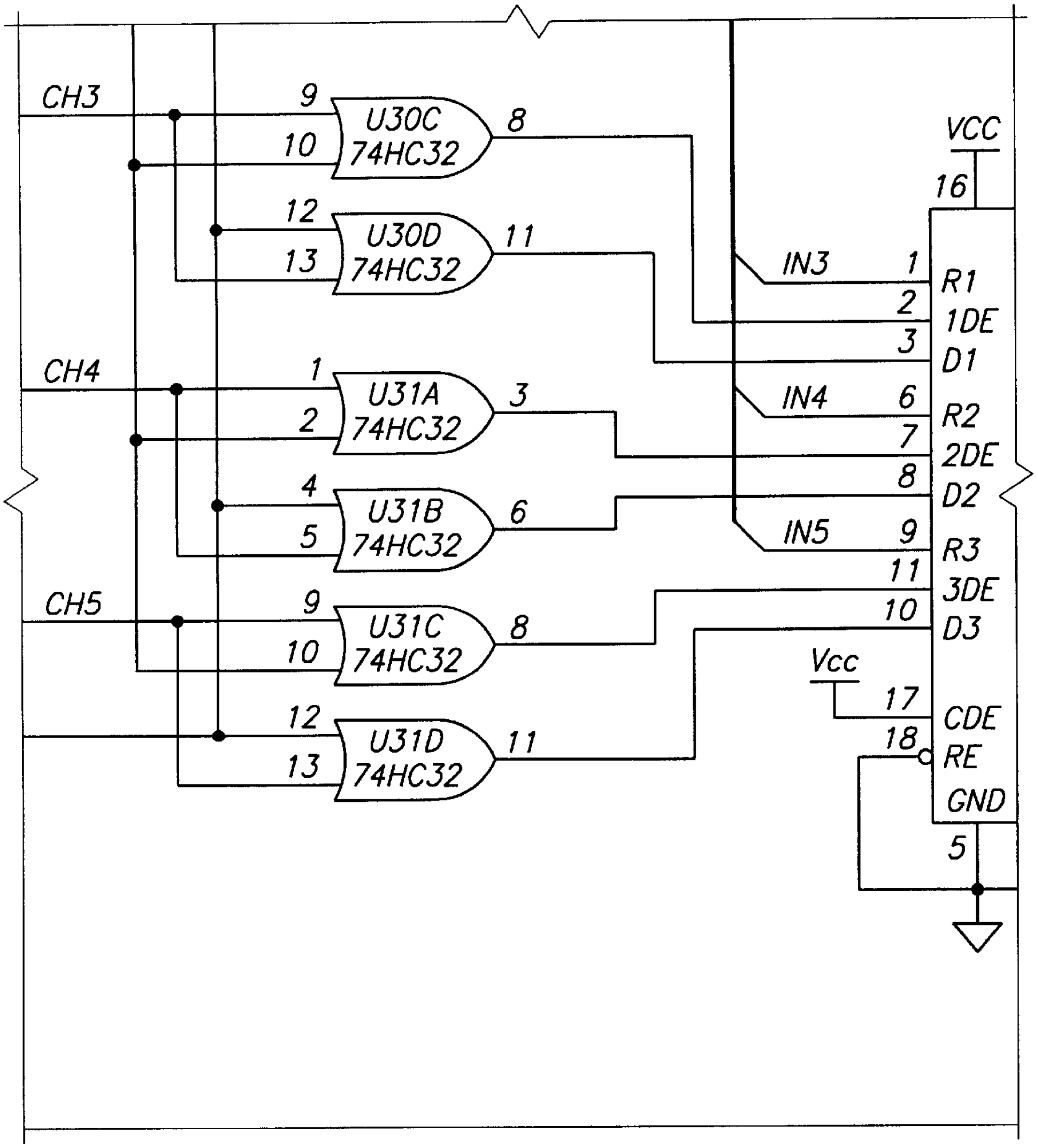

FIGS. 7–9 illustrate a circuit implementation for the schematic block diagram depicted in FIG. 5. Additionally, FIGS. 50–59 depict specific software/hardware implementations realized by the circuitry of FIGS. 7–49, schematic block diagram of FIG. 5, and the keyboard of FIG. 6. For purposes of understanding implementation of the software features and functionality detailed by state diagrams shown in FIGS. 50–59, the visible identifying mark that is provided on each of input keys 160–190 is referenced in the state diagrams shown in FIGS. 50–59.

FIG. 7 illustrates in block diagram form the interface layout for the main controller board 140 (of FIG. 5). More particularly, the interface layout for such main controller board includes processor 142, which is signal-coupled with an RS 232 port 192, a printer port 194, and a keyboard-display interface port 208. Each interface port provides connectivity with other components depicted in FIGS. 26–49. Processor 142 is described in greater detail below with reference to FIGS. 8–16. Keyboard-display interface port 208 is described below in greater detail with reference to FIGS. 17–25.

Pursuant to FIG. 7, RS 232 port 192 is provided to enable plug-in with a standard serial port. According to one implementation, such standard serial port comprises a connection that is provided with an external computer such as a network computer. FIG. 5 illustrates such external computer 128. It is understood that any of a number of computers, processors and/or controllers can be utilized to couple with RS 232 port 192 for transferring information and commands therebetween.

Pursuant to FIG. 7, printer port 194 provides for a two-wire bidirectional communication link with individual thermal print heads 88 for each print head assembly 40 (of FIG. 5). Printer port 194 operatively couples with a distribution board 212 via a distribution connector 210 according to the circuitry depicted in FIGS. 26–32. Such distribution board 212 enables the interconnection of up to six printers with a single main controller board 140 (of FIG. 5). It is understood that an additional number of printers 88 can be coupled to such main controller board 140 (of FIG. 5). Printer port 194 is configured to couple with an RS 485 port 234 such that communication is provided via a distribution board 212 which fans out to each of the dedicated printers associated with the main controller board.

Printer port 194 enables processor 142 to tell individual printers to print. Additionally, a diode, or LED, 248 (see FIG. 40) is provided on printer PC board 113 (of FIG. 5) such that printer functionality can be displayed to a user through an aperture (not shown) formed in cover assembly 100 (of FIG. 3).

FIGS. 8–16 illustrate in greater detail the circuitry of processor 142 (of FIG. 7). Processor 142 comprises processing circuitry, including an Atmel microprocessor 198. Microprocessor 198 comprises an Atmel model No. AT90S8515-1 microprocessor which has a programmable serial port that enables on-board programming via main controller board 140 (see FIG. 5). Processor 142 includes a serial port 196 that enables on-board programming which allows an operator to update the programming and functionality of the automated labelling machine. According to one implementation, serial port 196 comprises an SPY programming interface. Such microprocessor 198 comprises an eight-bit microprocessor having internal flash memory (ROM).

FIGS. 17–25 illustrate in greater detail one implementation for interface circuitry 211 that couples with keyboard-display interface port 208 (of FIG. 7). More particularly, keyboard-display interface circuitry 211 forms a portion of user interface 144, and includes a 14-pin display connector 200, a 9-pin header connector 202, and a pair of 3-pin connectors 204 and 206. Connectors 204 and 206 comprise connectors for coupling with an external alarm or a warning device. For example, if a problem is detected with one of the printers, a warning light can be activated at a location where a central operator will be notified that a problem has occurred. One such condition might arise when optical sensor 115 no longer detects the presence of labels, indicating that a specific label transfer mechanism on an automated labelling machine has run out of labels. Additionally, such information can be coupled with address information that identifies which label transfer mechanism, or printer, has run out of labels. Other detectable operating conditions for such printers can also be implemented such that a warning signal can be used to notify that operator. Connectors 204 and 206 can also be used to deliver a warning signal to any audible, visual, tactile or other device suitable for warning an operator. For example, the warning can be delivered to a control panel, or display screen, that notifies a system operator within a packaging house. Furthermore, such connectors 204 and 206 can be used to deliver diagnostic information to an external computer 128 (of FIG. 5).

Display connector 200 operatively couples with display screen 156 (of FIG. 6). Header connector 202 connects with keyboard 158 (of FIG. 6). Keyboard 158 is illustrated with numbers/characters representing the assigned or marked input keys. Such keyboard 158 is embodied as a C&K 4B01H332PCFQ keypad having the depicted configuration, as further illustrated and described above with reference to FIG. 6.

FIGS. 26–32 illustrate the printer interface circuitry 209 that couples with printer port 194 on main controller board 140 (of FIG. 7). More particularly, printer interface circuitry 209 signal-couples each print head assembly 40 from each label transfer mechanism 12 of an automated labelling machine 10 (see FIG. 5) by way of a distribution board 212. Printer interface circuitry 209 couples with such distribution board 212 via a distribution board connector 210.

Distribution board 212 comprises a Sub-D junction board containing a transformer and a PC board. Twenty-four volt (24-volt) power is output by such board 212 to main controller board 140 (of FIG. 5). Six DIN connectors are provided on board 212, each containing five wires leading out to each print head, including: Tx, Rx, common (0 volts), +24 volts, and ground. Distribution board 212 also includes a 24-volt output that is delivered to main controller board 140 (see FIG. 7). A start/stop button is provided on the main controller board which enables turning such circuitry on and off. A 15-pin Sub-D connector is also provided on distribution board 212, including 12 wires which connect from the main controller board, two of such wires going to each printer PC board (via a DIN), and via a junction board in the Sub-D connector. Accordingly, distribution board 212 couples each printer PC board with the main controller board, and supplies power to system circuitry, devices, and motors.

Figure 33:
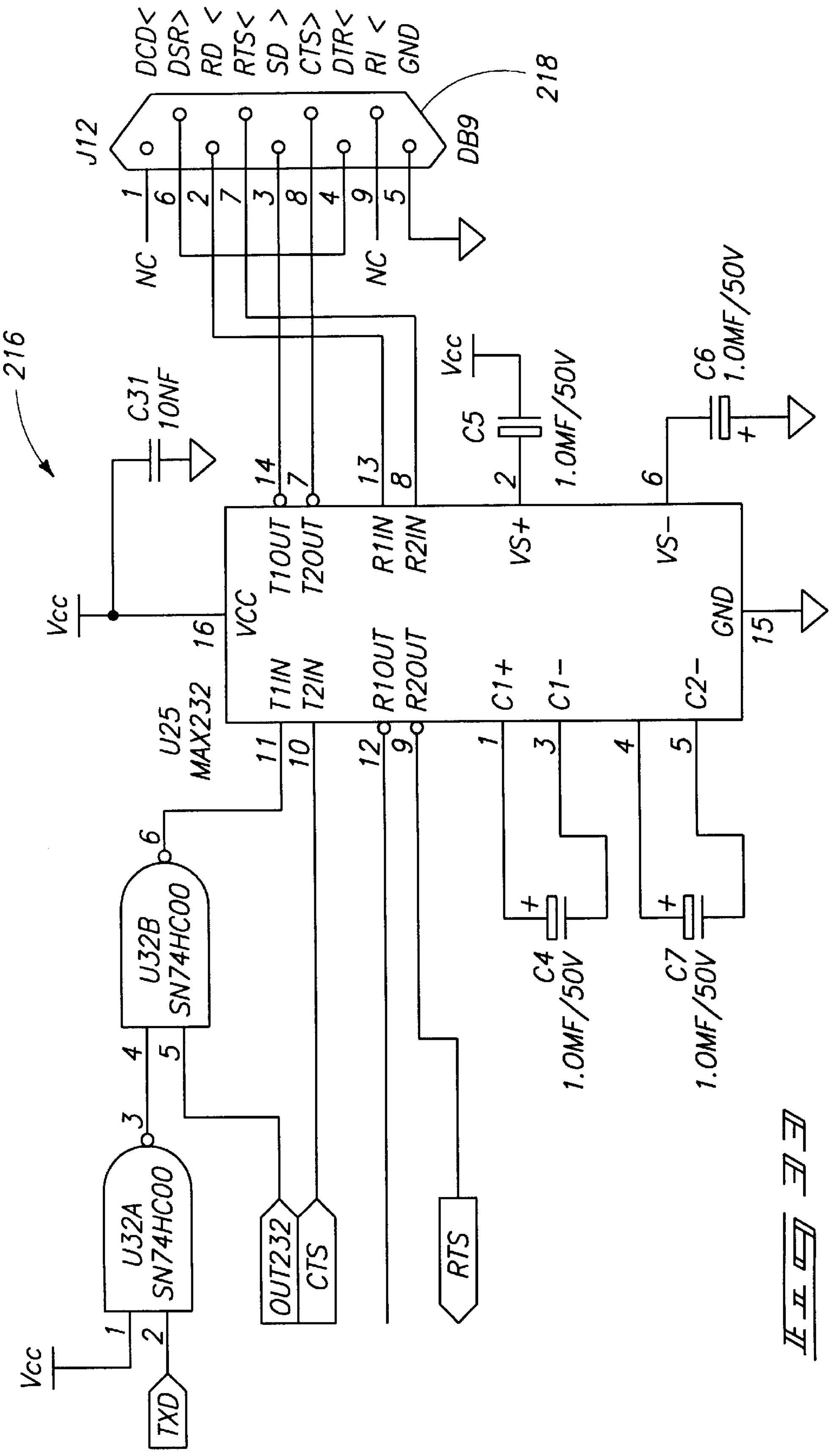
FIG. 33 is a schematic block diagram of an RS 232 interface that interfaces with the RS 232 port depicted in FIG. 7.

FIG. 33 illustrates RS 232 interface circuitry 216 which operatively couples to RS 232 port 192 (of FIG. 7). More particularly, RS 232 interface circuitry 216 terminates in a DB9 connector 218. Such connector 218 provides a connection for coupling a standard serial port to a network or external computer (such as external computer 128 of FIG. 5).

Figure 34:
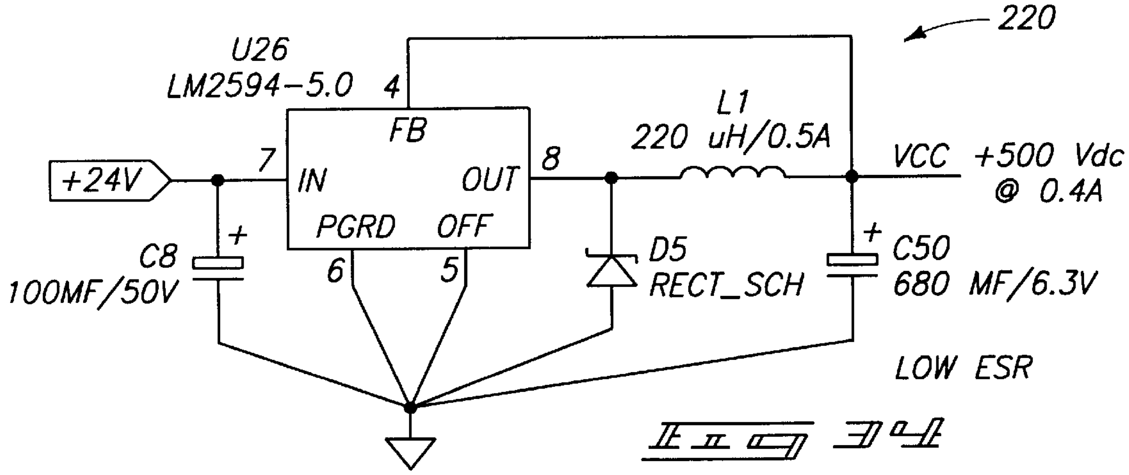
FIG. 34 is a schematic block diagram of a power supply regulator for the circuitry illustrated in FIGS. 7–37.

FIG. 34 illustrates a power supply regulator 220 that serves as a power supply for imparting a regulated voltage to processor 142 (of FIG. 7). Other regulated power supplies can also be used.

Figure 35:
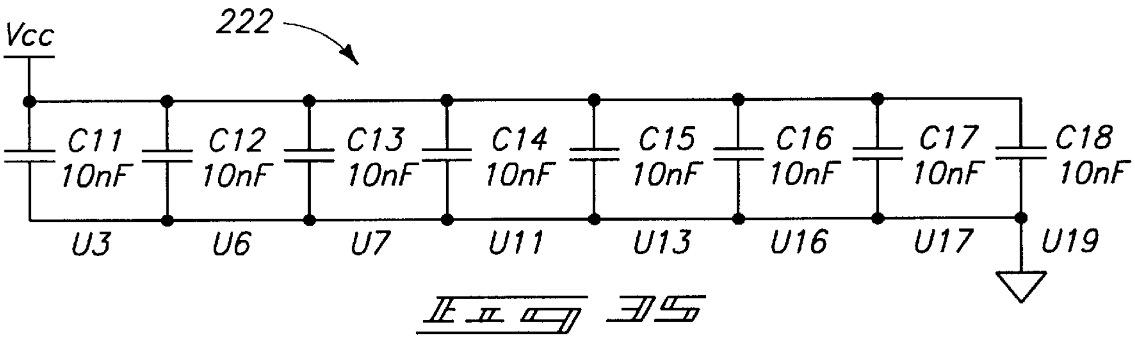
FIG. 35 is a schematic block diagram of signal conditioning circuitry for the circuitry depicted in FIGS. 7–37.
Figure 36:
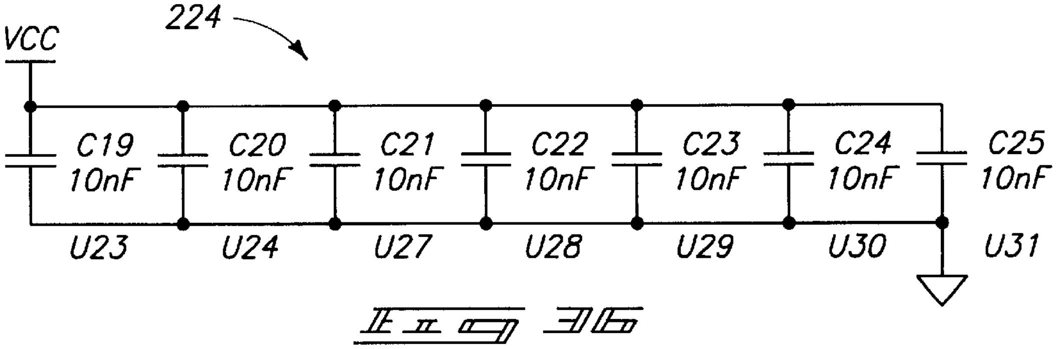
FIG. 36 is a schematic block diagram of signal conditioning circuitry for the circuitry depicted in FIGS. 7–37.
Figure 37:
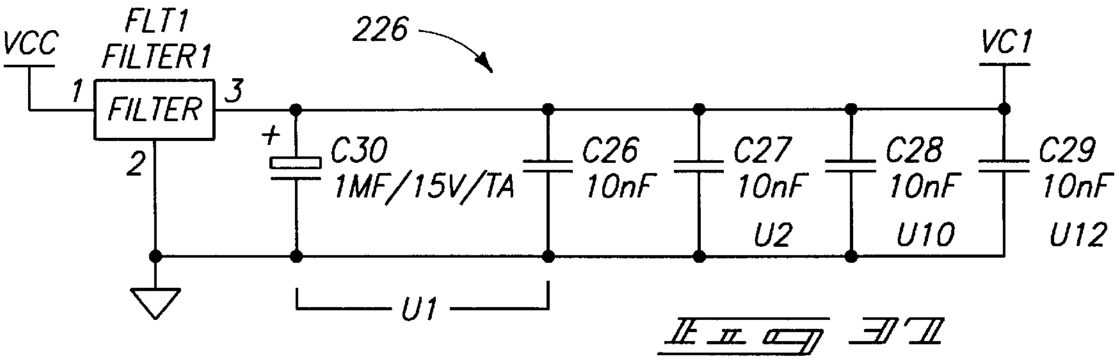
FIG. 37 is a schematic block diagram of signal conditioning circuitry for the circuitry depicted in FIGS. 7–37.
Figure 38:
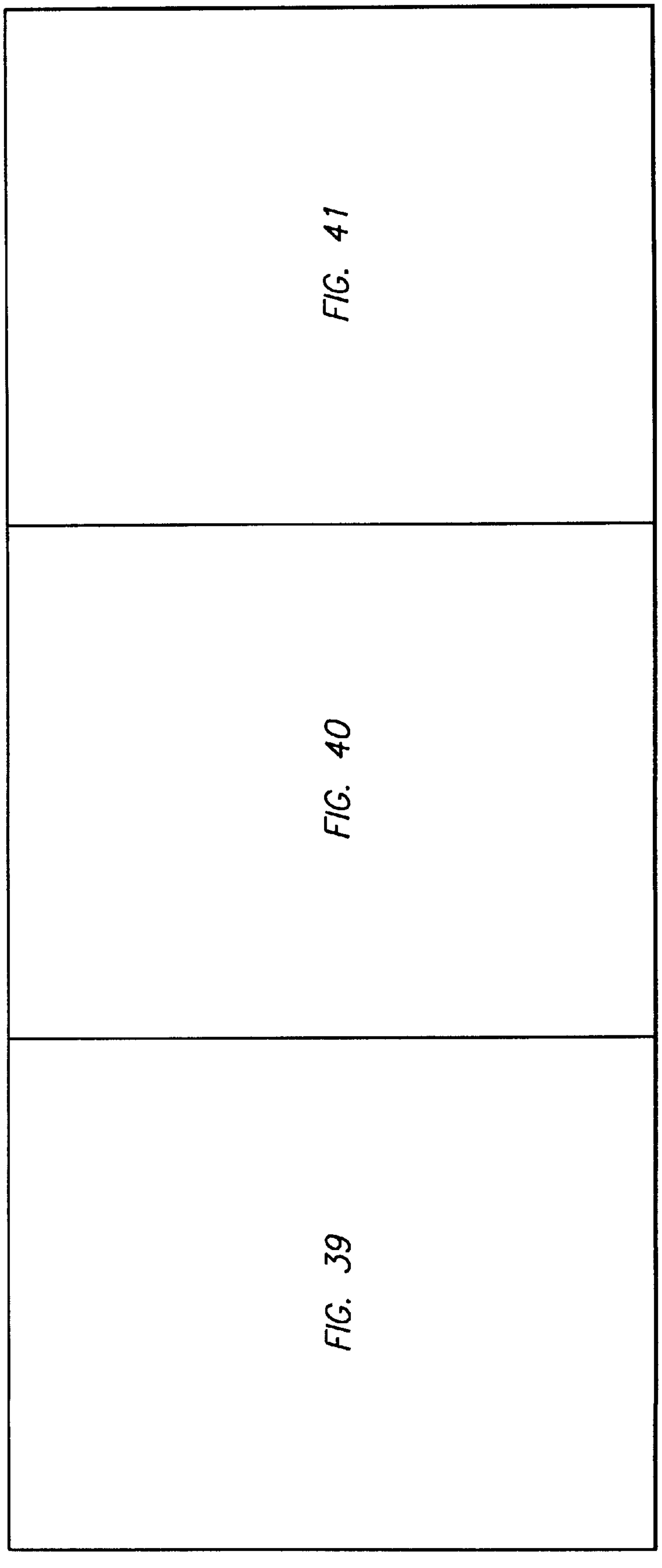
FIG. 38 is a layout illustrating the assembly of FIGS. 39–41.

FIGS. 35, 36 and 37 illustrate filtering circuitry utilized within the circuitry depicted in FIGS. 8–34. Such filtering circuitry comprises bypass capacitors configured to minimize noise. One set of circuitry is provided per each integrated circuit in such circuitry implementation. Filtering circuitry 226 includes a discrete filter element operative to further remove processor and clock noise from signals within such circuitry.

FIGS. 38–41 illustrate the electrical/electronic circuitry contained on printer PC board 113 (of FIG. 5), and more particularly the circuitry associated with processor 114 (of FIG. 5). Such circuitry includes an Atmel microprocessor 228, Ser. No. AT90S8515-1, resonating circuitry in the form of resonator 230, an SPY programming interface 232, and RS 485 data/power interface 234, switch connector 136 (which couples with sensor 138 of FIG. 5), and a contact switch 237 which enables a user to initiate feeding of the carrier and labels during a loading operation of the print head assembly (self-feeding carrier and labels) responsive to engagement of switch 237. Additionally, such circuitry comprises an address latch 238, an input/output (I/O) latch 240, memory (such as SRAM) 242, a motor drive 244, and a thermal print head (TPH) interface 112. Even furthermore, such circuitry includes a light-emitting diode (LED) 248 and spare circuitry 250 depicted in FIG. 42. Spare circuitry 250 is shown in FIG. 42 as unused circuitry present on the printer PC board 113 (of FIG. 5).

Figure 39:
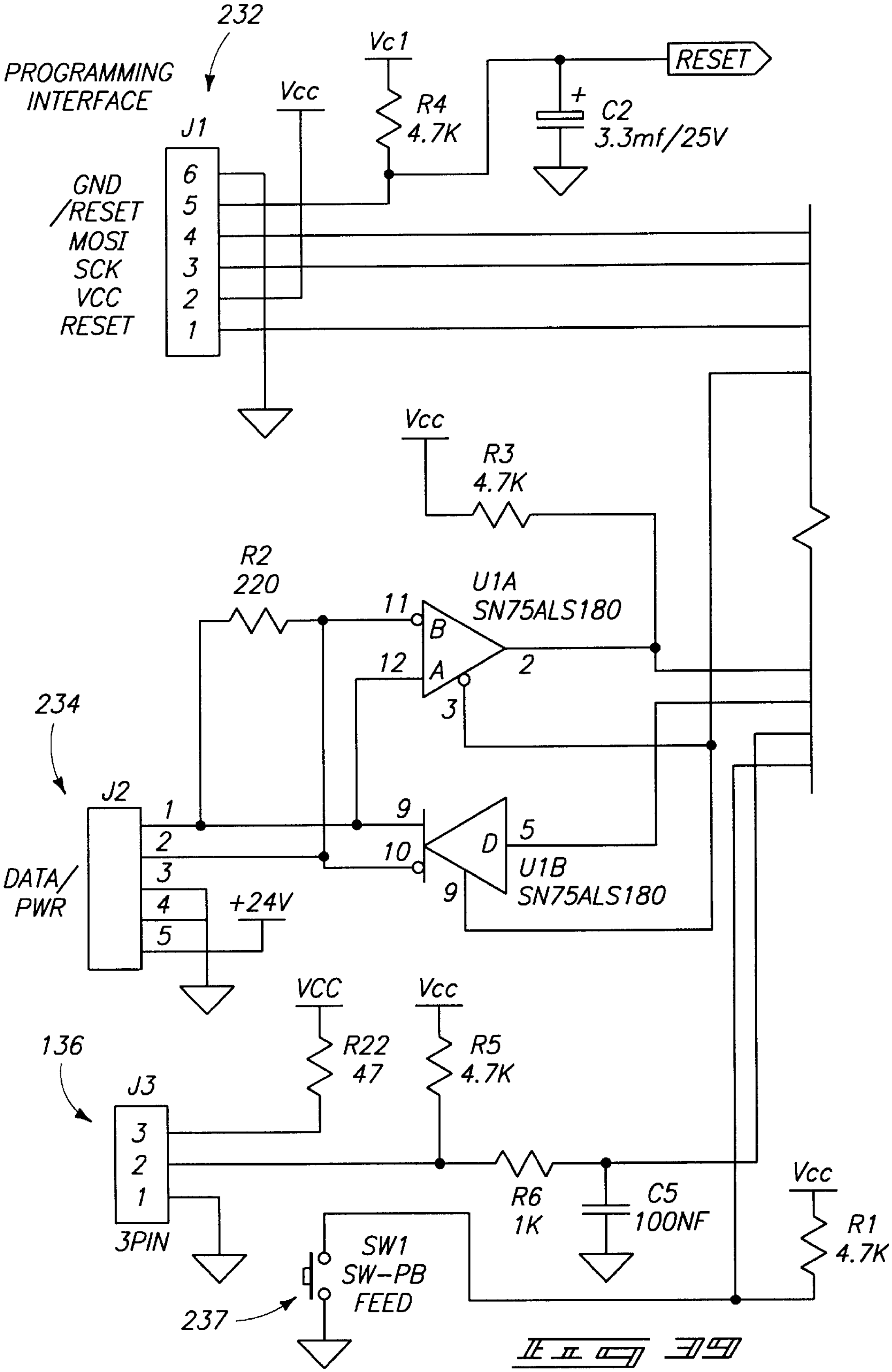
FIGS. 39–41 are first through third portions, respectively, of FIG. 38, illustrating processing circuitry and a processor of a print head assembly for one of the label applicator mechanisms of the automated labelling machine depicted in FIGS. 1–3 and 5.

As shown in FIG. 39, programming interface 232 comprises an SPY programming interface manufactured by Atmel. Such programming interface is dedicated to programming of microprocessor 228. For example, special device plug-ins can be added to microprocessor 228 in order to customize operability. For example, such microprocessor can be reconfigured with specific information such as a new variety of apple, or new PLU numbers, which are information necessary to be printed onto labels. Accordingly, a selection of printable information can be customized or tailored through interface 232.

As further shown in FIG. 39, data/power interface 234 comprises a data communications interface that couples with main controller board 140 (of FIG. 5) as depicted above with reference to FIGS. 5–37. Such interface forms a serial, bi-directional interface. In one implementation, such interface comprises an RS 485 interface.

Figure 40:
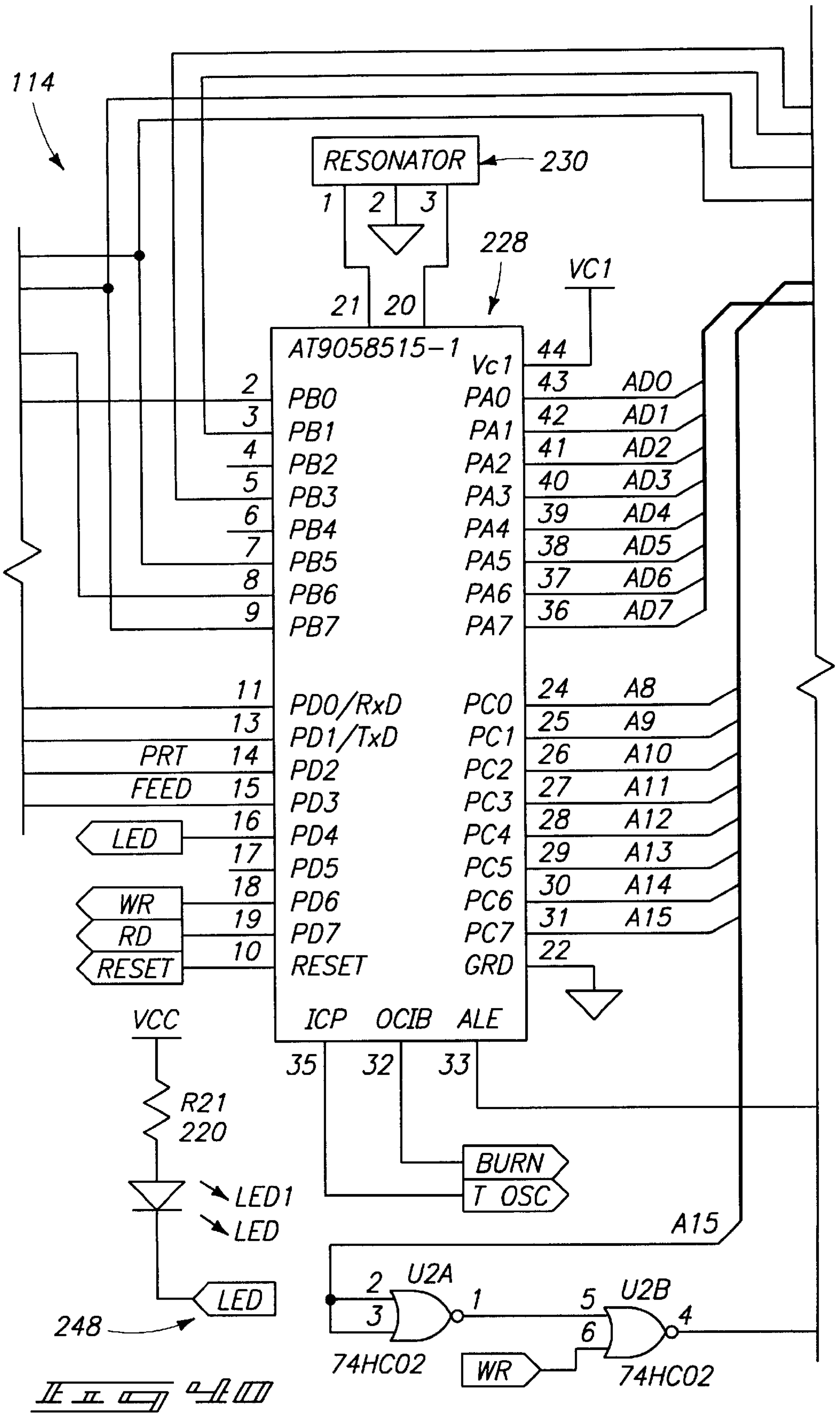

As shown in FIG. 40, resonator 230 comprises a ceramic low-cost crystal resonator which forms a clock for microprocessor 228. Also shown in FIG. 40, light-emitting diode (LED) 248 provides a warning light that indicates to an operator when a problem has been detected with print head assembly 40. More particularly, LED 248 is visible through cover assembly 100 (of FIG. 3) and is operative to visually notify an operator that a printing problem has been encountered. For example, one such event that triggers the lighting of LED 248 is responsive to detection by a sensor (e.g., optical sensor 115 of FIG. 5) of when a label reel is out of labels. Other such detection might occur when a carrier of such label reel is jammed or the print head assembly is jammed with dislodged labels. Such events can be detected via monitoring of motor operation, or via detection by optical sensor 115 (of FIG. 5).

Figure 41:
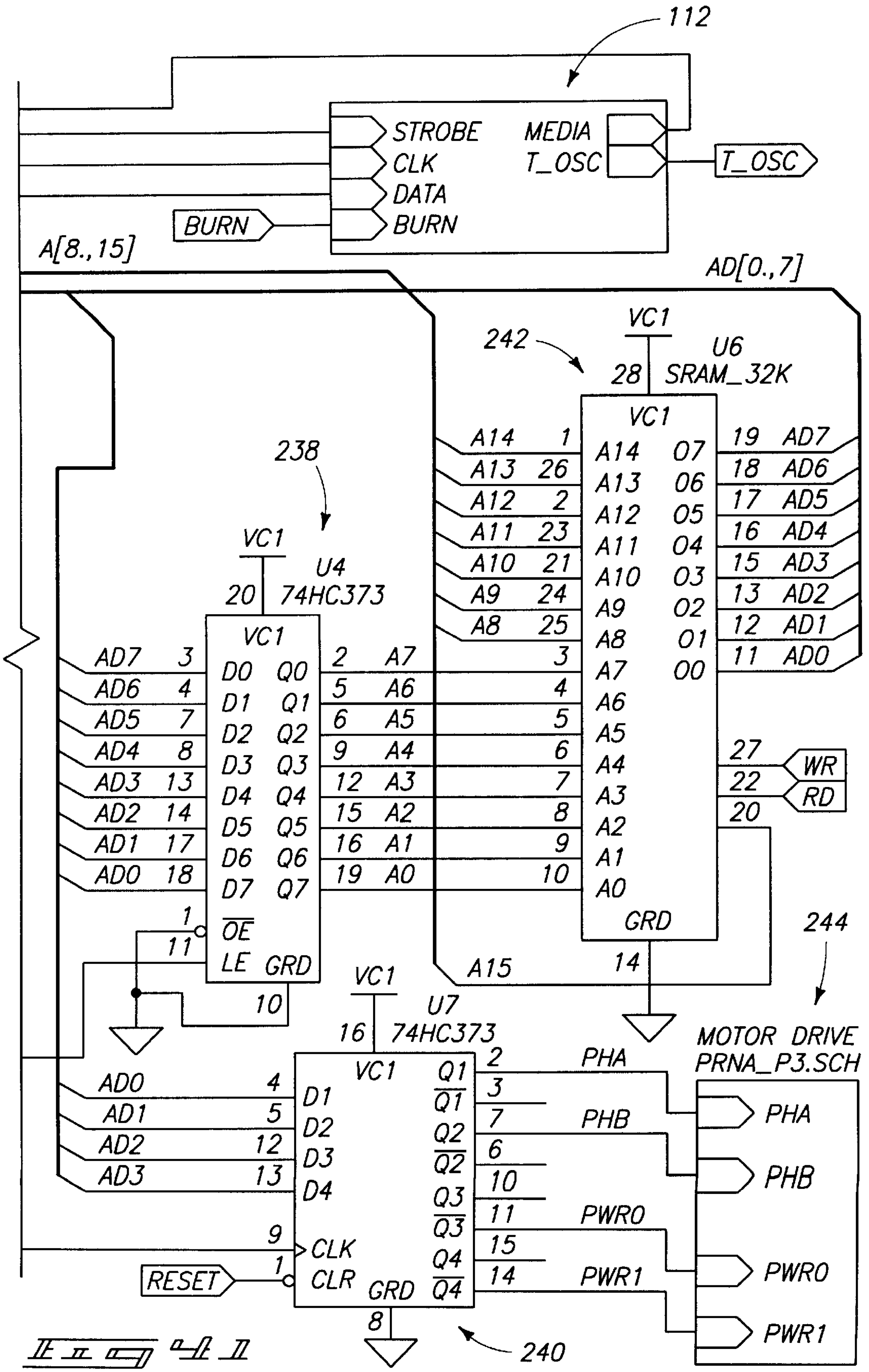
Figure 42:
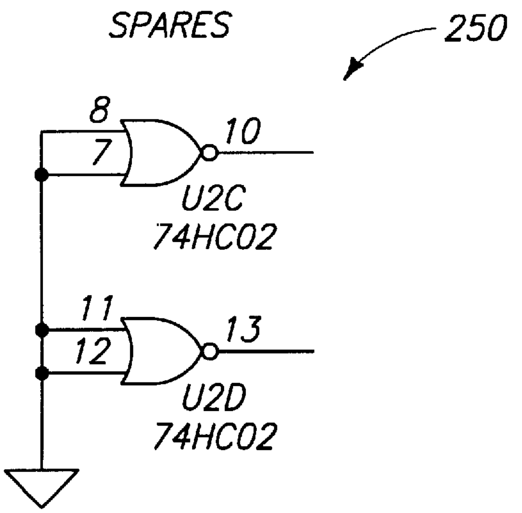
FIG. 42 is a schematic block diagram illustrating spare circuitry provided in the processing circuitry of FIGS. 39–41.

FIG. 41 illustrates TPH interface 112 which couples with the thermal print head 88 (of FIG. 5). FIG. 41 also depicts address latch 238, model No. 74HC373. Address latch 238 comprises a D-type latch containing D-inputs that are latched in when the clock goes high. Such address latch 238 de-multiplexes the bus, separating addresses from data on the bus.

Also shown in FIG. 41, memory 242 comprises static random access memory (SRAM). Furthermore, I/O latch 240 comprises an as input/output latch, and motor drive 244 comprises a UDN 2916 chip manufactured by Allegro Semiconductor.

FIG. 42 illustrates spare circuit components 250 provided within the circuitry of printer PC board 113 (of FIG. 5). Such circuitry is presently not utilized according to the preferred embodiment of Applicant's invention.

Figure 43:
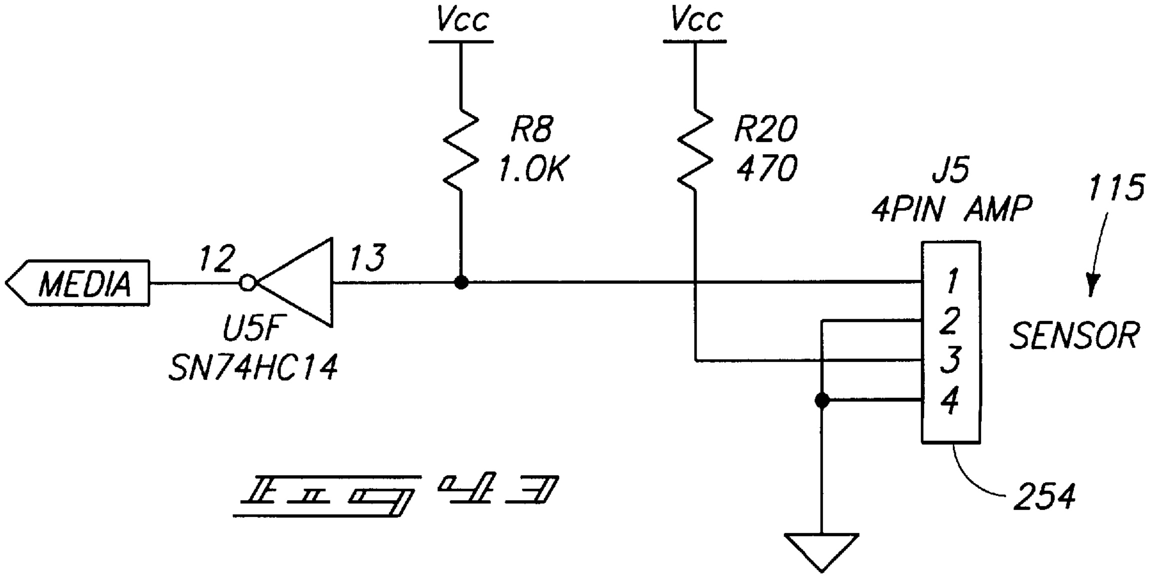
FIG. 43 is a schematic block diagram illustrating one circuitry implementation for coupling an optical sensor with the processor of FIGS. 39–41.

FIG. 43 illustrates one circuitry implementation for optical sensor 115. More particularly, a sensor connector 254 comprises a 4-pin AMP connector that removably couples with optical sensor 115 (of FIG. 5). Such optical sensor is constructed and arranged to detect the center positioning of labels in a travel direction on a carrier as they pass through print head assembly 40 (of FIGS. 1–3).

Figures 45, 46:
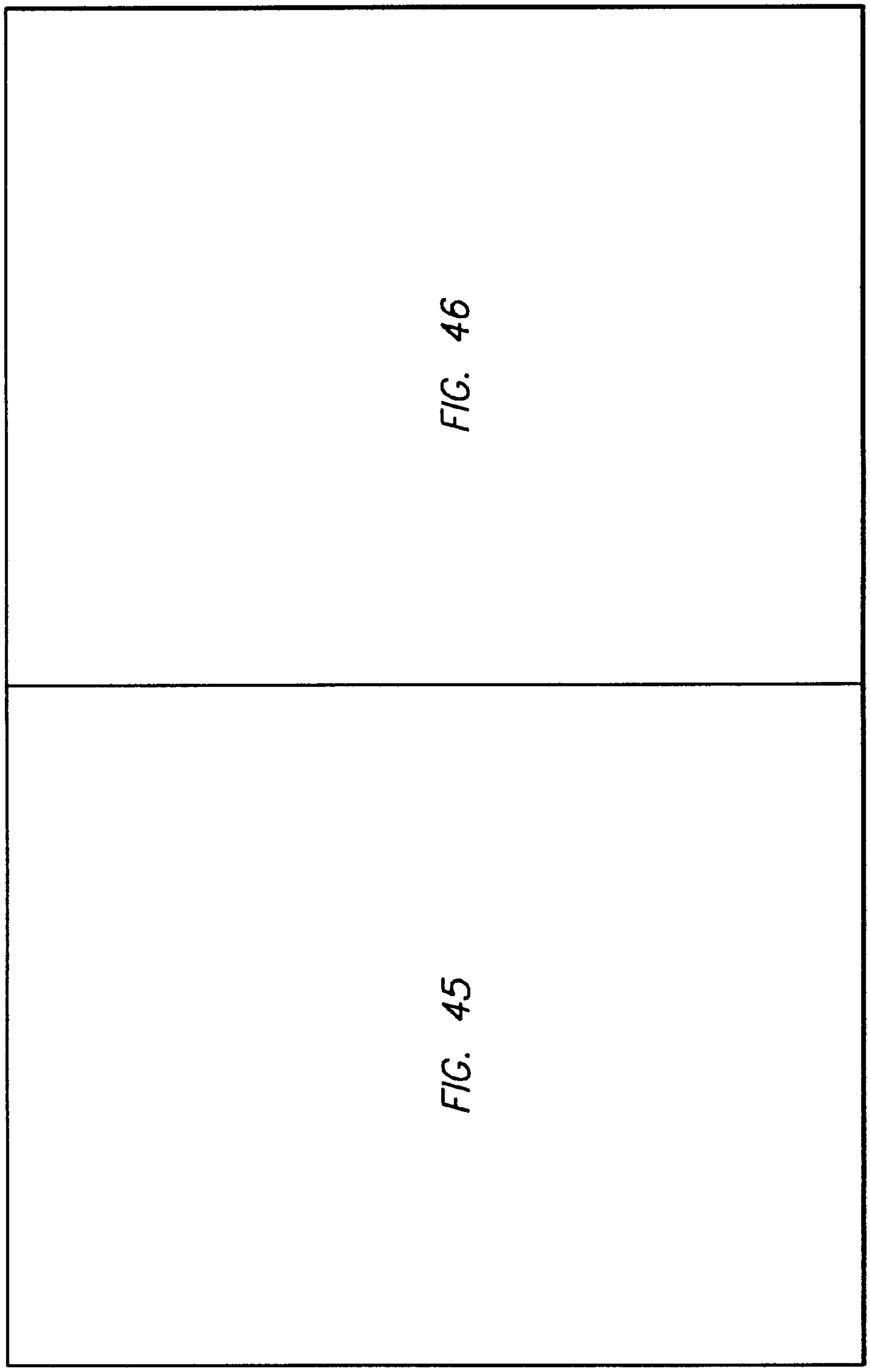
FIGS. 45 and 46 are first through second portions, respectively, of FIG. 44, illustrating interface circuitry and a thermal print head connector provided in association with the processor of FIGS. 39–41 and usable to connect a print head with the processing circuitry of FIGS. 39–41.
Figure 45:
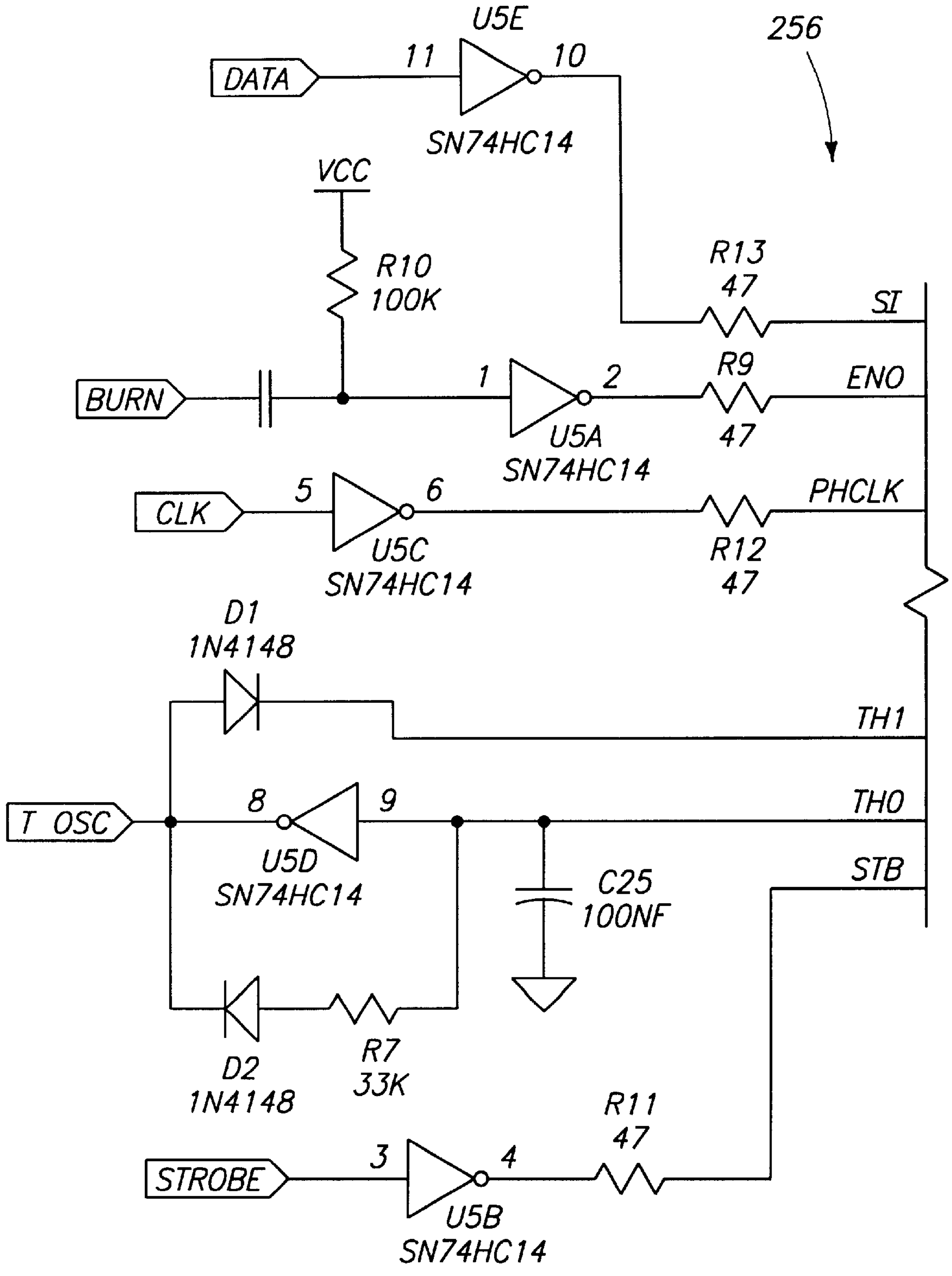
Figure 46:
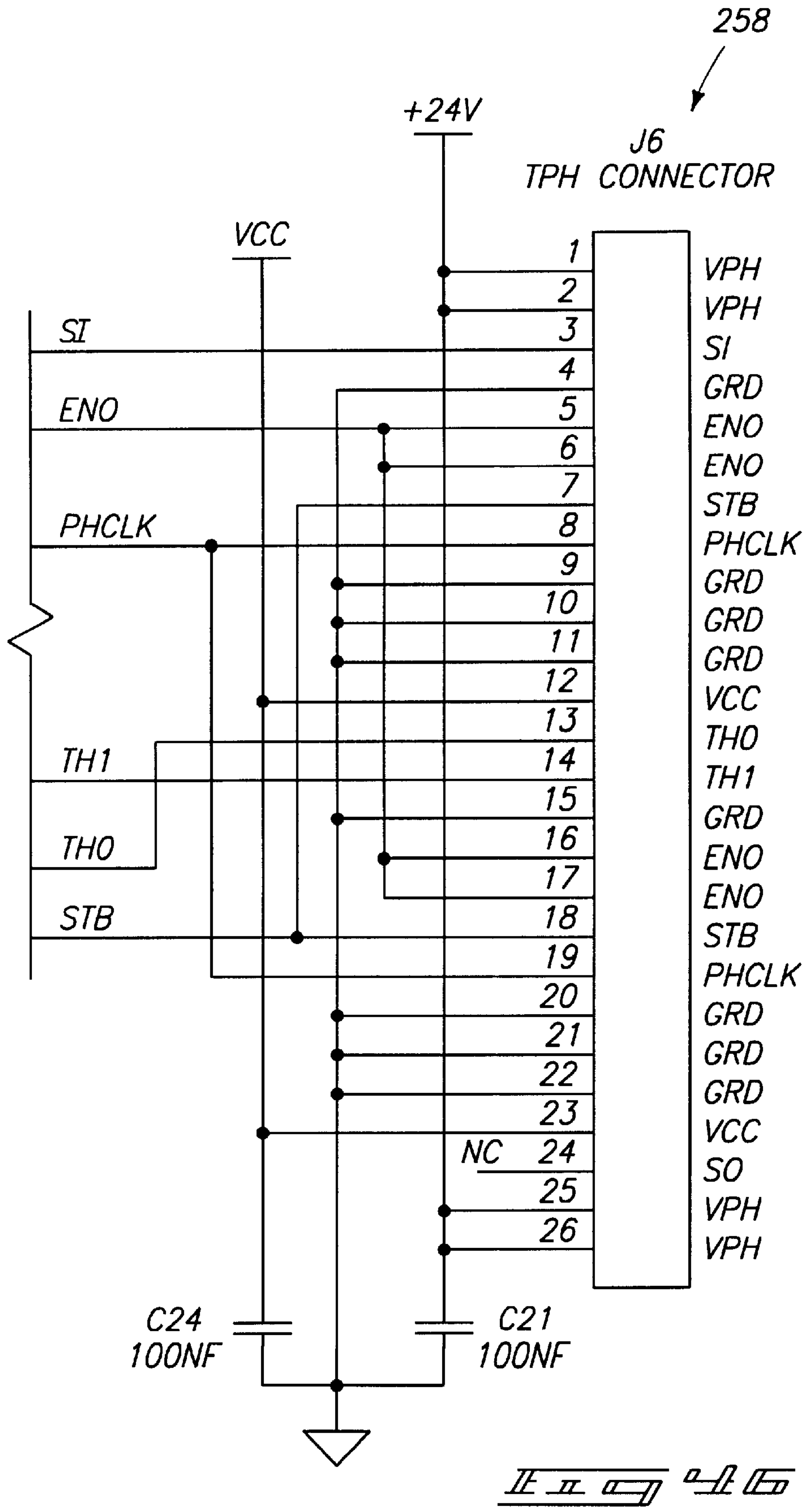
Figure 42:
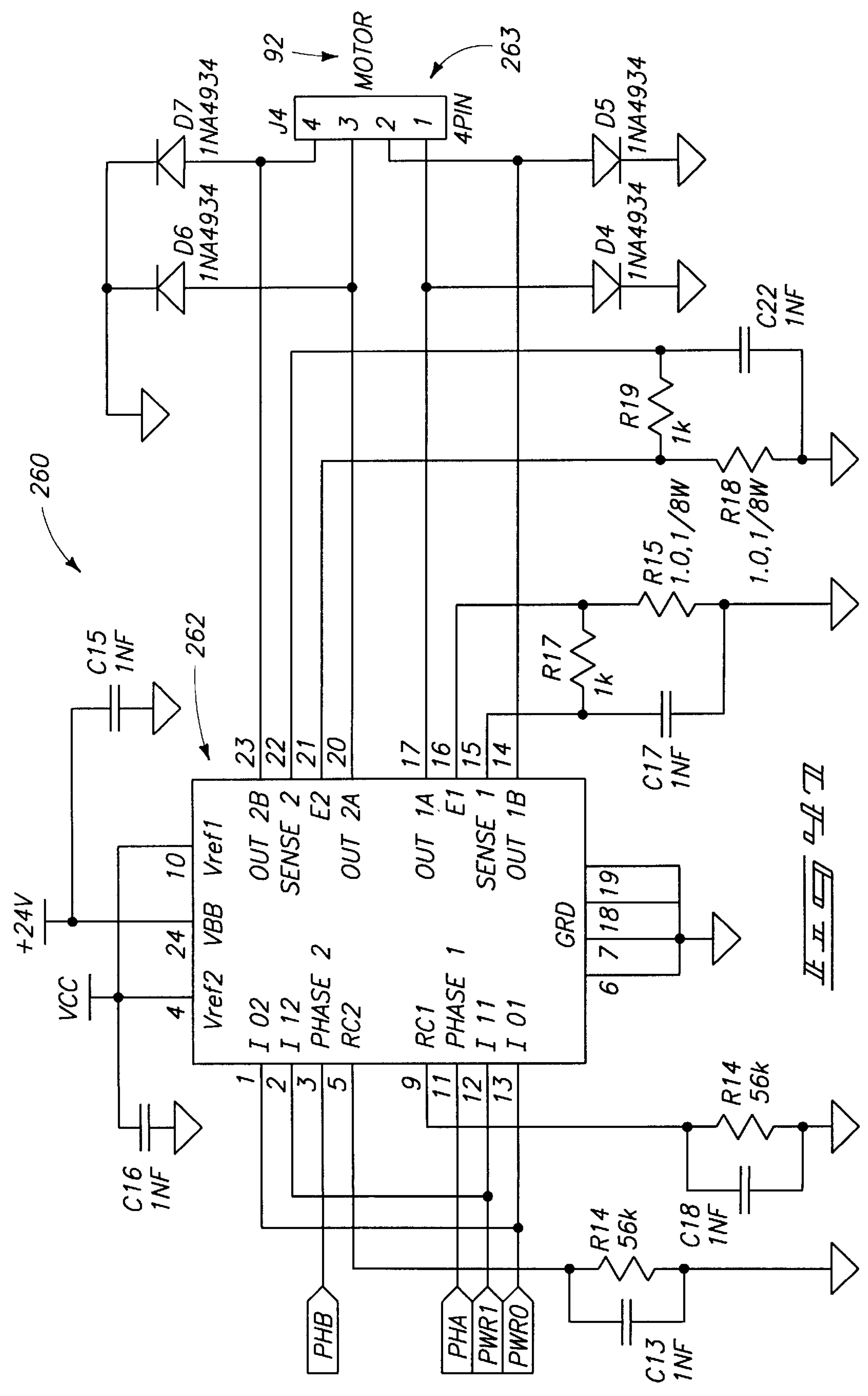

FIGS. 44–46 illustrate thermal print head (TPH) connector circuitry 256 that is provided on each printer PC board 113 (of FIG. 5).

More particularly, TPH connector circuitry 256 includes a thermal print head (TPH) connector 258 that enables coupling between thermal print head interface 112 and thermal print head 88 (of FIG. 5). In one implementation, thermal print head interface 112 (of FIG. 5) comprises TPH connector circuitry 256. Other implementations are also possible. Connector 258 couples with thermal print head 88, manufactured by Axiohm (as discussed previously above).

FIG. 47 illustrates motor drive circuitry 260 which is provided on each printer PC board 113 (of FIG. 5). More particularly, motor drive circuitry 260 includes a motor drive 262 that operatively couples via a 4-pin connector 263 with motor 92. According to one construction, motor 92 comprises a stepper motor, model No. PM35S-048-AXC1, manufactured by Minebea Company, Ltd., of Thailand.

Figure 48:
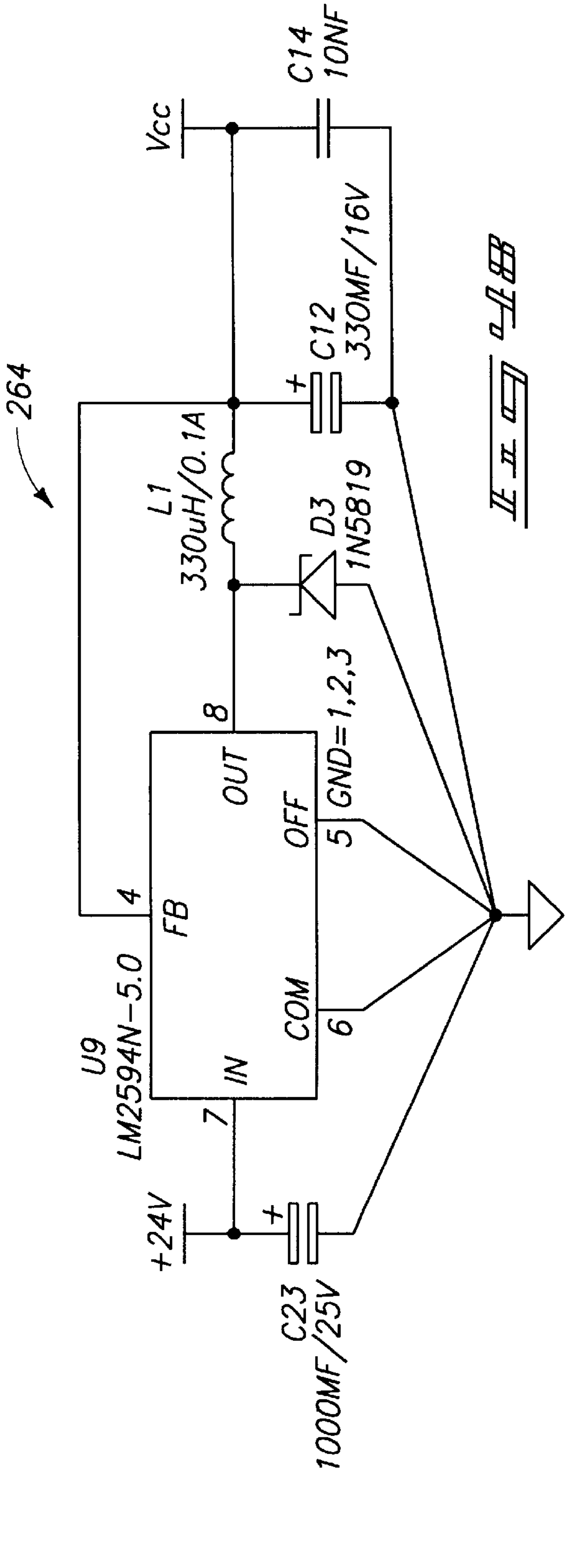
FIG. 48 is a schematic block diagram of a power supply regulator for the circuitry illustrated in FIGS. 38–49.
Figure 49:
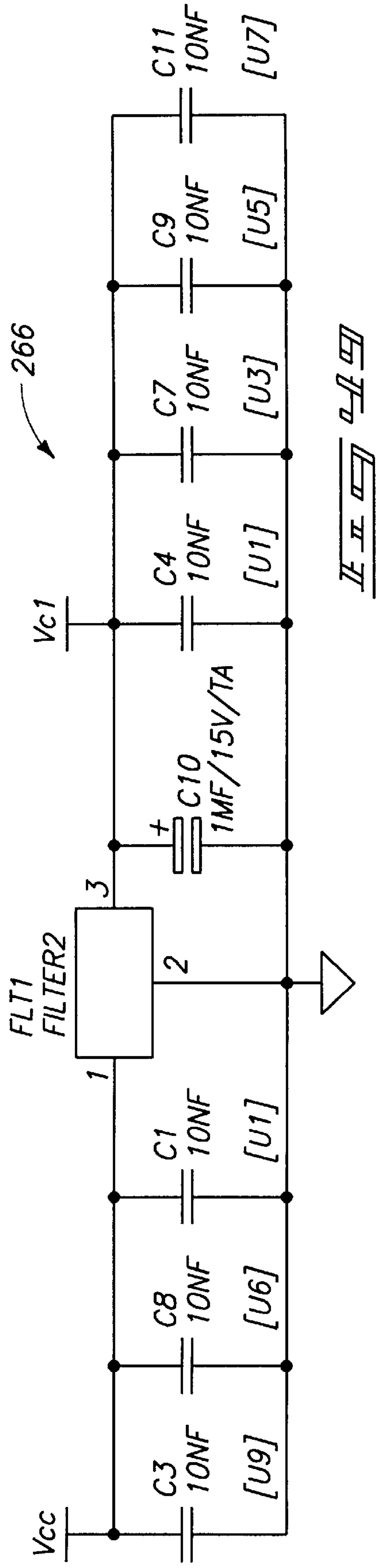
FIG. 49 is a schematic block diagram of signal conditioning circuitry usable with the circuitry depicted in FIGS. 38–49.

FIG. 48 illustrates a switching regulator power supply 264 which forms a regulated power supply for the circuitry depicted in FIGS. 39–47. FIG. 49 illustrates conditioning circuitry 266 comprising filtering circuitry and discrete filters that are used to condition signals within the circuitry of FIGS. 38–48.

FIGS. 50–59 illustrate state diagrams for programming the embodiment depicted in FIGS. 1–3 and 5–49. Such state diagrams enable realization of functionality via program routines that impart the new and novel features of Applicant's invention by way of the hardware previously described.

Figure 50:
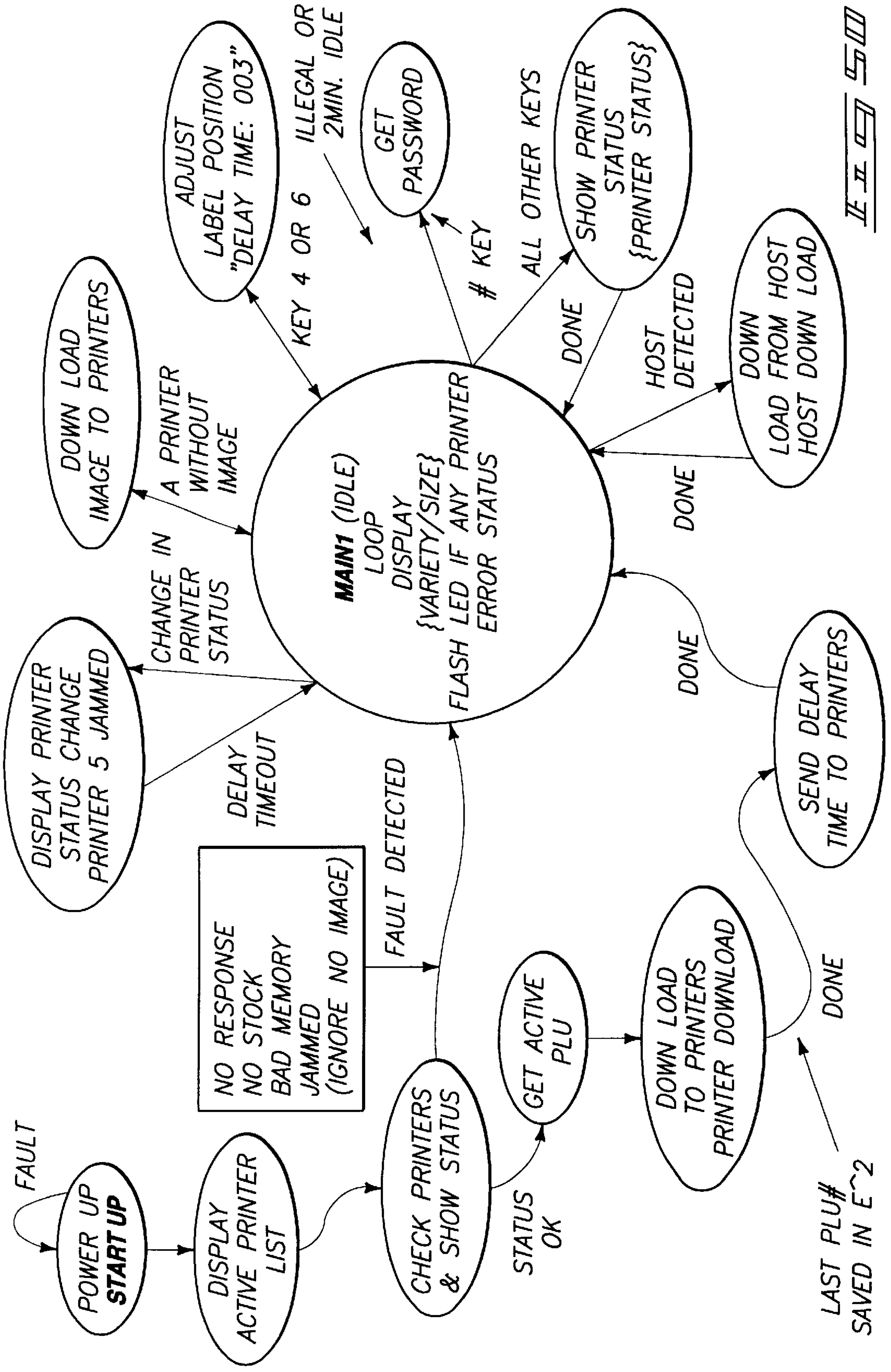
FIG. 50 is a general state diagram depicting "START UP" and "MAIN1" operating program implementations for the automated labelling machine of this invention illustrated in FIGS. 1–3 and 5–49.

FIG. 50 illustrates a "STARTUP" and a "MAIN1" software routine for the automated labelling machine wherein power-up occurs, print head assemblies for each label transfer mechanism are queried to check and show status, and an active printer list is displayed. When the status is determined as being "O.K.", an active PLU number (PLU#) is retrieved from a memory location and downloaded to each print head assembly. The most recently used PLU number (PLU#) is saved in memory, which enables retrieval and downloading thereof. If a new label transfer mechanism is loaded, or no PLU number is found, the last PLU number is retrieved from memory and reloaded onto such mechanism automatically. A delay time is then configured for such printers and a "MAINI" loop display is initiated, showing the apple variety/size or information that is configured to be printed by each printer. For the case where a printer error is detected, LED 248 (of FIG. 40) is configured to flash so as to visually alert a user of the presence of a printer error status.

The implementation of such visual alert to a user via a flashing LED occurs when one or more of several status conditions are detected, including "no response", "no stock (labels in carrier)", "bad memory", and "jammed (print mechanism)". Additionally, several other printer operating states are depicted which are realizable from the "MAIN 1" loop display. For example, where a printer is determined to not have an image, an image is downloaded to such printer. Additional printer states are also depicted in FIG. 50.

Figure 51:
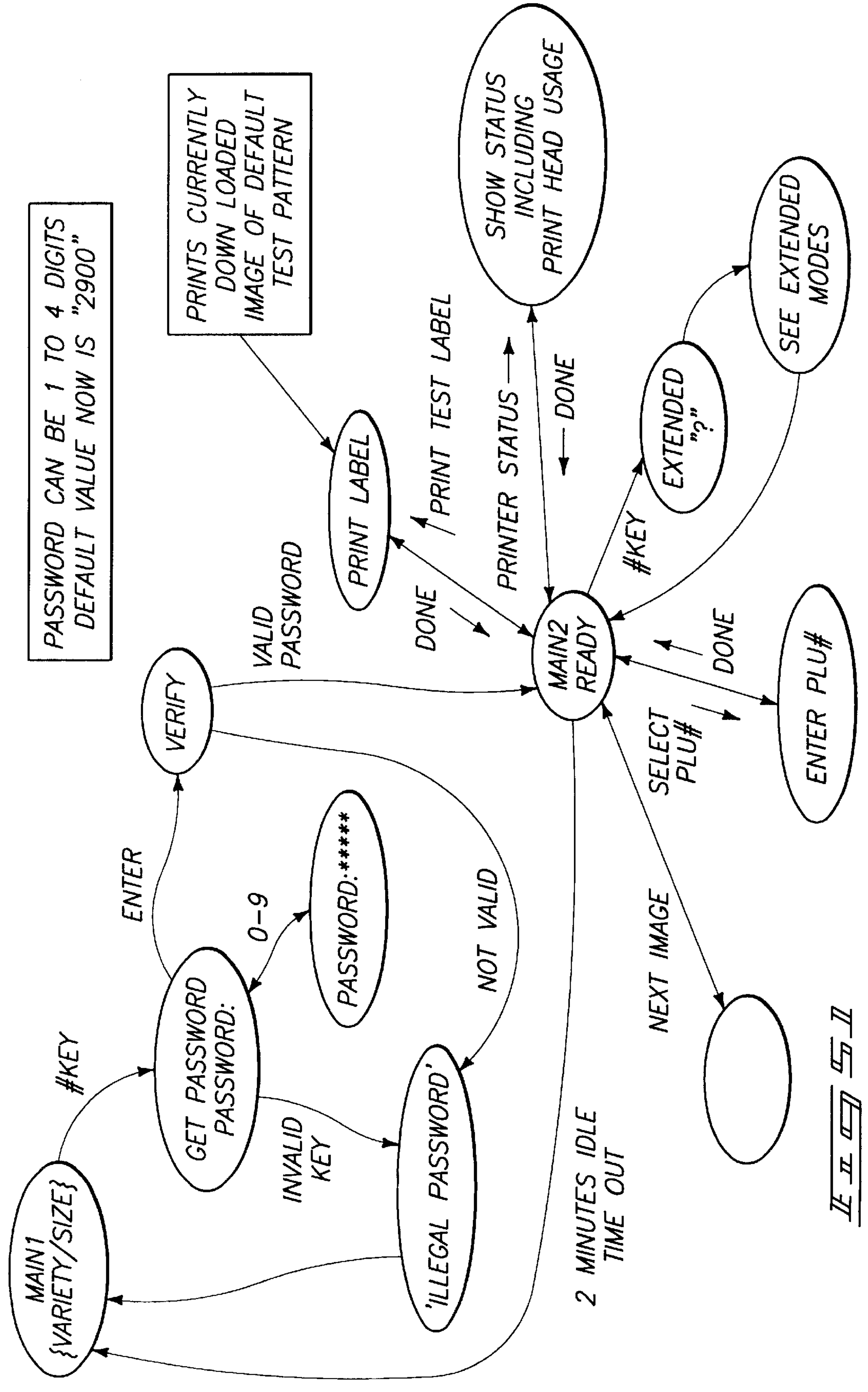
FIG. 51 is a general state diagram depicting a "MAIN2" operating program implementation and illustrating the various operating states for an operating program for verifying passwords, entering PLU numbers, displaying status such as print head usage, printing currently downloaded images or default test patterns, and configuring a next image.

FIG. 51 illustrates a "MAIN2" software routine depicting the steps involved in transferring between "MAIN1" loop display state and "GET PASSWORD" state depicted in FIG. 50. Once such password has been verified as being "VALID", a "MAIN2" state is realized. Accordingly, the "MAIN2" state interacts with several other states in order to print currently downloaded images of a default test pattern, show the status including printer head usage, enter a PLU number (PLU#), and see extended modes.

Figure 52:
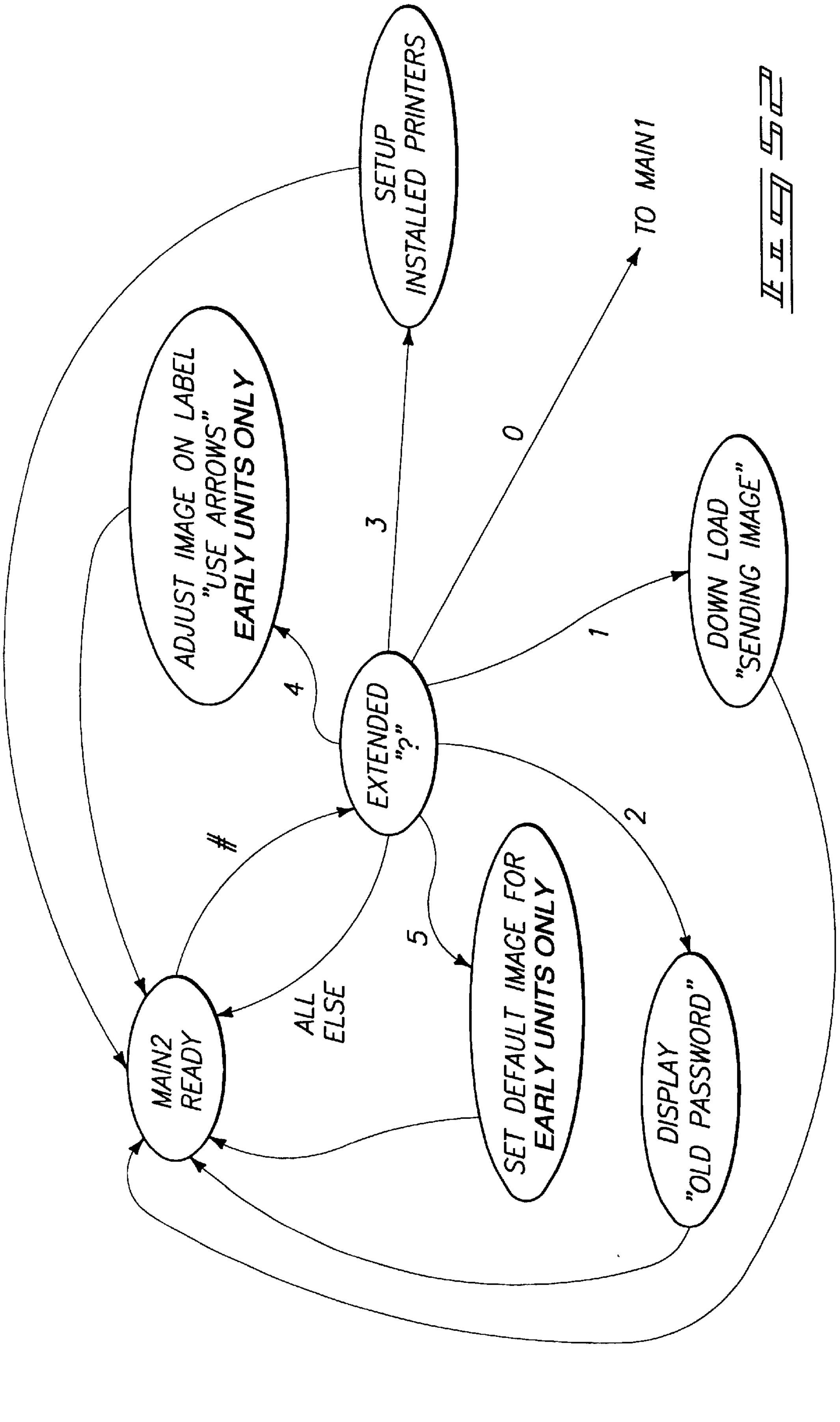
FIG. 52 is a general state diagram depicting an "EXTENDED MODES" operating program implementation, and illustrating the various operating states for extended modes of the operating system.

FIG. 52 illustrates an "EXTENDED MODES" software routine for the automated labelling machine. Implementation of the state diagram depicted in FIG. 52 enables a user to select between several operating modes by depressing the appropriately labelled input key which corresponds with numbered selections that are depicted on a display screen 156 (of FIG. 6). A user moves from the "MAIN2" state to the "EXTENDED?" state by depressing input key "#". Such "EXTENDED ?" state displays user selections that can be enabled by a user via selecting the appropriate input key on keypad 158 (of FIG. 6). The "EXTENDED ?" state can lead back to the "MAIN1" loop when any other input key is depressed by a user. As shown in FIG. 52, the transition between specific states is initiated by touching the associated input keys illustrated in FIG. 6; namely, by selecting any of numerals 0–9 and "#". For example, a user can depress input key "5" in order to set a default image (as described in further detail with respect to FIG. 59). Similarly, a user can depress input key "4" in order to adjust the image on a label using the keyboard arrows (as discussed below in greater detail with reference to FIG. 57).

Figure 53:
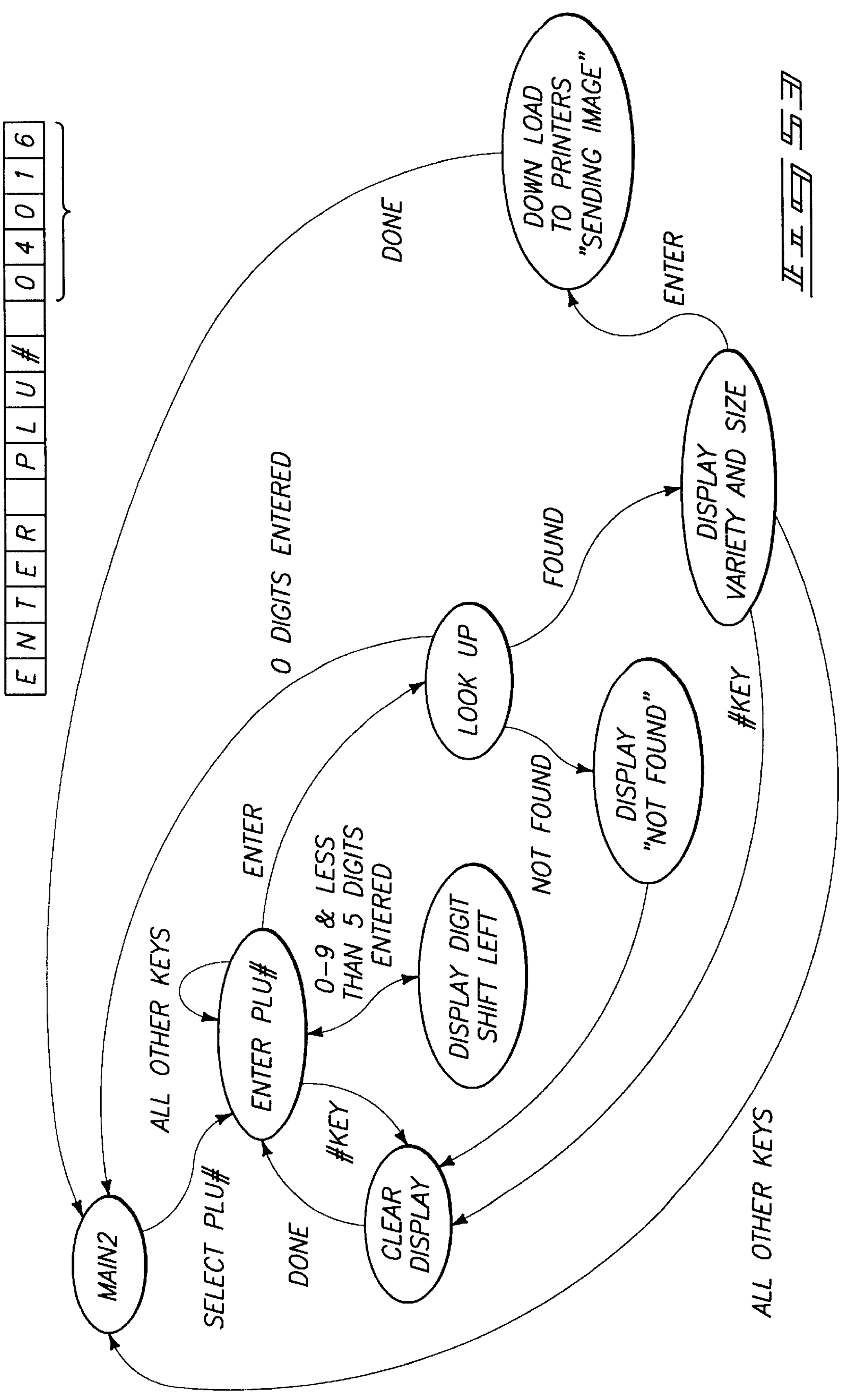
FIG. 53 is a general state diagram depicting a "SELECT PLU#" operating program implementation, and illustrating various operating states realized when selecting a PLU number during a setup mode.

FIG. 53 illustrates a "SELECT PLU#" software routine for the automated labelling machine. The process of selecting a PLU number (PLU#) is illustrated as a series of operating states, with specific input keys causing changes in state that are depicted by the characters or markings used to identify the input keys shown on keyboard 158 (of FIG. 6). Accordingly, such associated states are realized based upon the markings (input by) depressed on keyboard 158 (of FIG. 6) as shown by the interconnecting arrows extending between states. One exemplary display screen configuration is illustrated in FIG. 53, with one exemplary input PLU number (PLU#) "04016". Various system operating states are depicted, with certain operator actions being selectively configured via keyboard 158 (of FIG. 6) in order to transition between the depicted operating states.

FIG. 54 illustrates a "DOWN LOAD OPERATION" software routine for the automated labelling machine. Changes between operating states depicted in FIG. 54 are shown as arrows and are conditioned upon the labelled occurrences. Such information is downloaded from "MAIN2". Optionally, such information can be entered from select PLU, or by a default setup implemented via power-up as depicted in FIG. 52. Such information is then downloaded to printers by "SENDING AN IMAGE" to each print head assembly. Once such downloading has occurred, a "STOP" is issued to all printers. Once all have been downloaded and issued, printer status is queried until all printers have been issued such information. Following such implementation, an "IMAGE2PRINTER" state is implemented such that the currently selected PLU number is downloaded. Subsequently, printer status is queried. If one or more of such queried printers does not have an image, either a "DISPLAY LOAD ERROR" is displayed to an operator, or a stop is issued to all printers and the query is re-initiated. Once all printers have an image, such state returns to the initial "DOWN LOAD" state.

Figure 55:
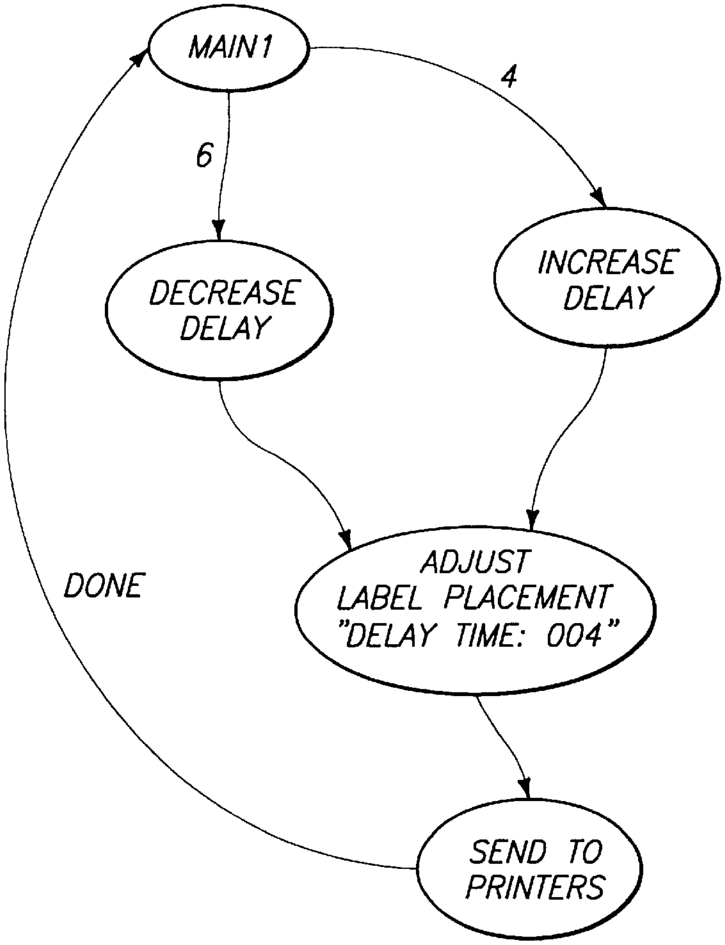
FIG. 55 is a general state diagram depicting an "ADJUST LABEL PLACEMENT" operating program implementation, and illustrating the various operating states realized by the automated labelling machine control system when adjusting the location of printed information on a label, or label placement, during an actively printing label operation.

FIG. 55 illustrates an "ADJUST LABEL PLACEMENT" software routine for the automated labelling machine. This routine, or operation, is intended to be performed while the printers are actively printing labels. An operator can select input key "4" in order to increase the amount of delay and can press input key "6" in order to decrease the amount of delay. As illustrated in FIG. 55, the "MAIN1" state corresponds with such state depicted in FIG. 50. Essentially, depressing the input button labelled "4" causes an increase in delay, whereas depressing input button "6" causes a decreased delay. Accordingly, label placement is adjusted, and a delay time is initiated. Such adjustment is then sent to each printer. A list of conditions displayed to an operator via display screen 156 (of FIG. 6) which are triggered by such a delay time are listed in FIG. 55.

Figure 56:
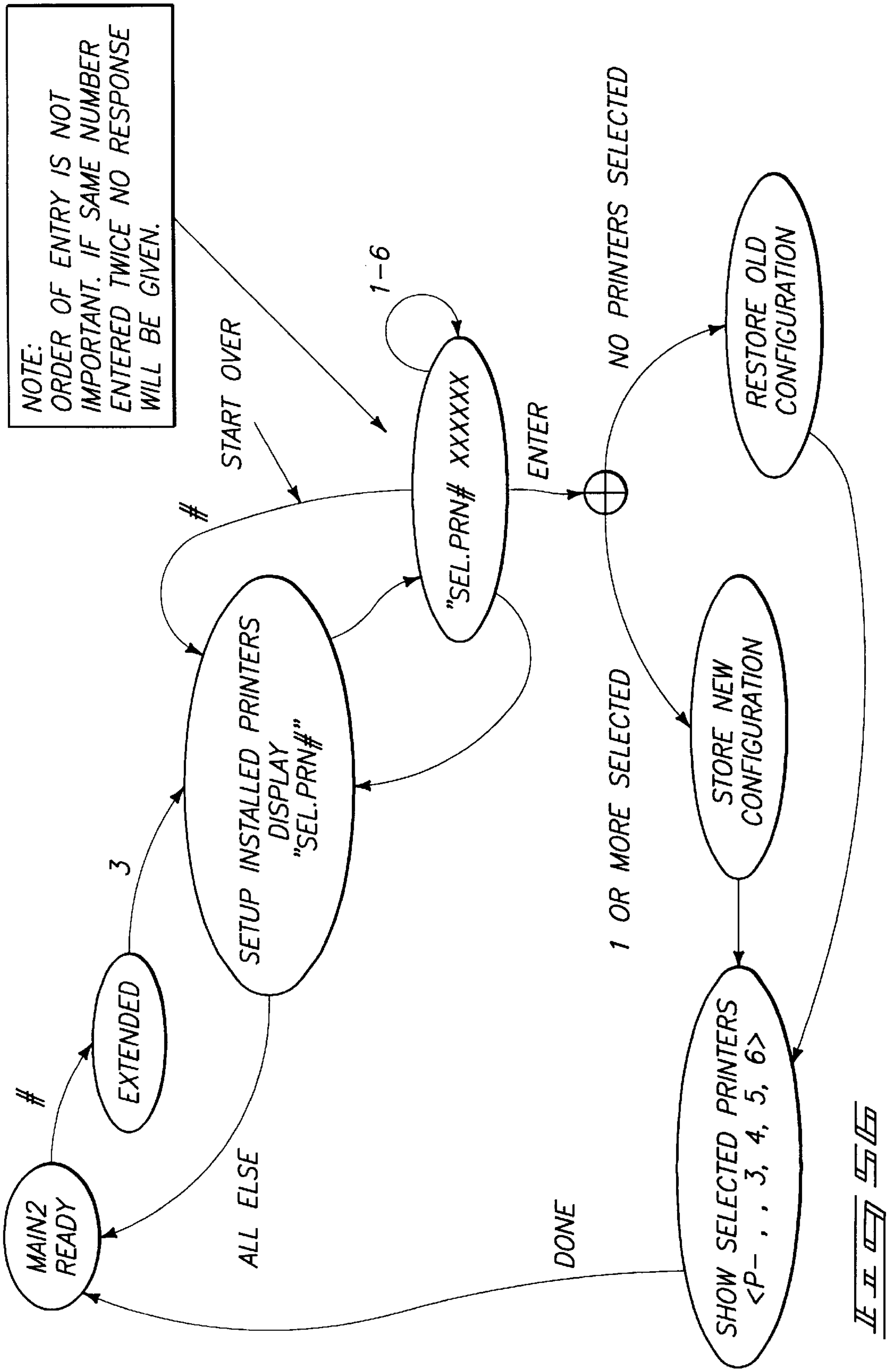
FIG. 56 is a general state diagram depicting a "SETUP INSTALLED PRINTERS" operating program implementation, and illustrating the various operating states realized by the automated labelling machine control system when setting up installed printers.
Figure 57:
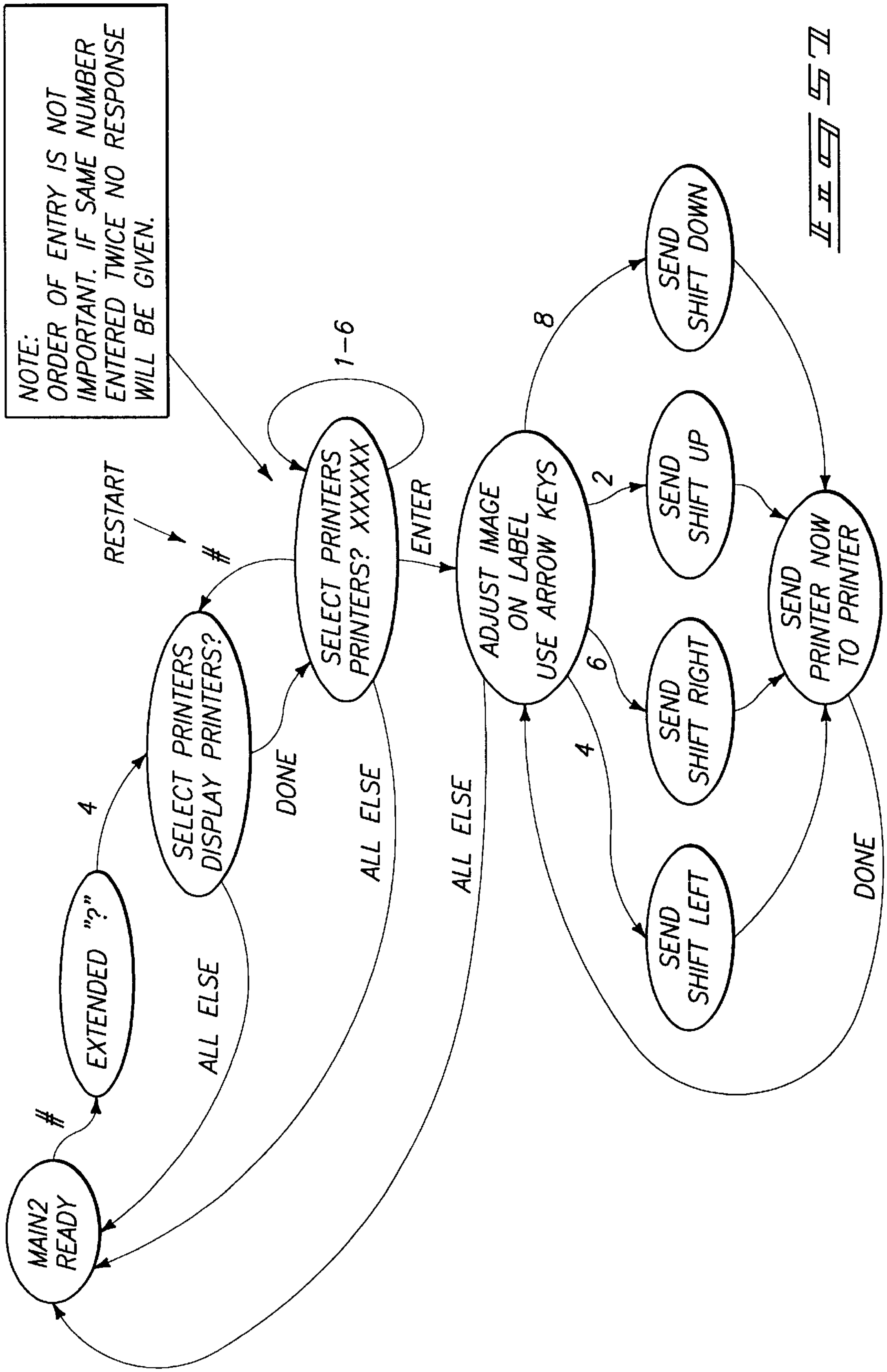

FIG. 56 illustrates a "SETUP INSTALLED PRINTERS" software routine for the automated labelling machine. The transition between operating states is depicted with arrows that are labelled with the input key labels for keypad 158 (of FIG. 6). Selection of such input keys by a user enables transfer between such operating states. Such operating states indicate the setup of installed printers, and corresponding information that is displayed on display screen 156 (of FIG. 6) in setting up a configuration of printers to be controllably operated pursuant to the teachings of Applicant's invention. For example, such sub-routine enables the selective configuring of any one or more of label transfer mechanisms 12 of automated labelling machine 10, as depicted in FIG. 1.

Figure 57:
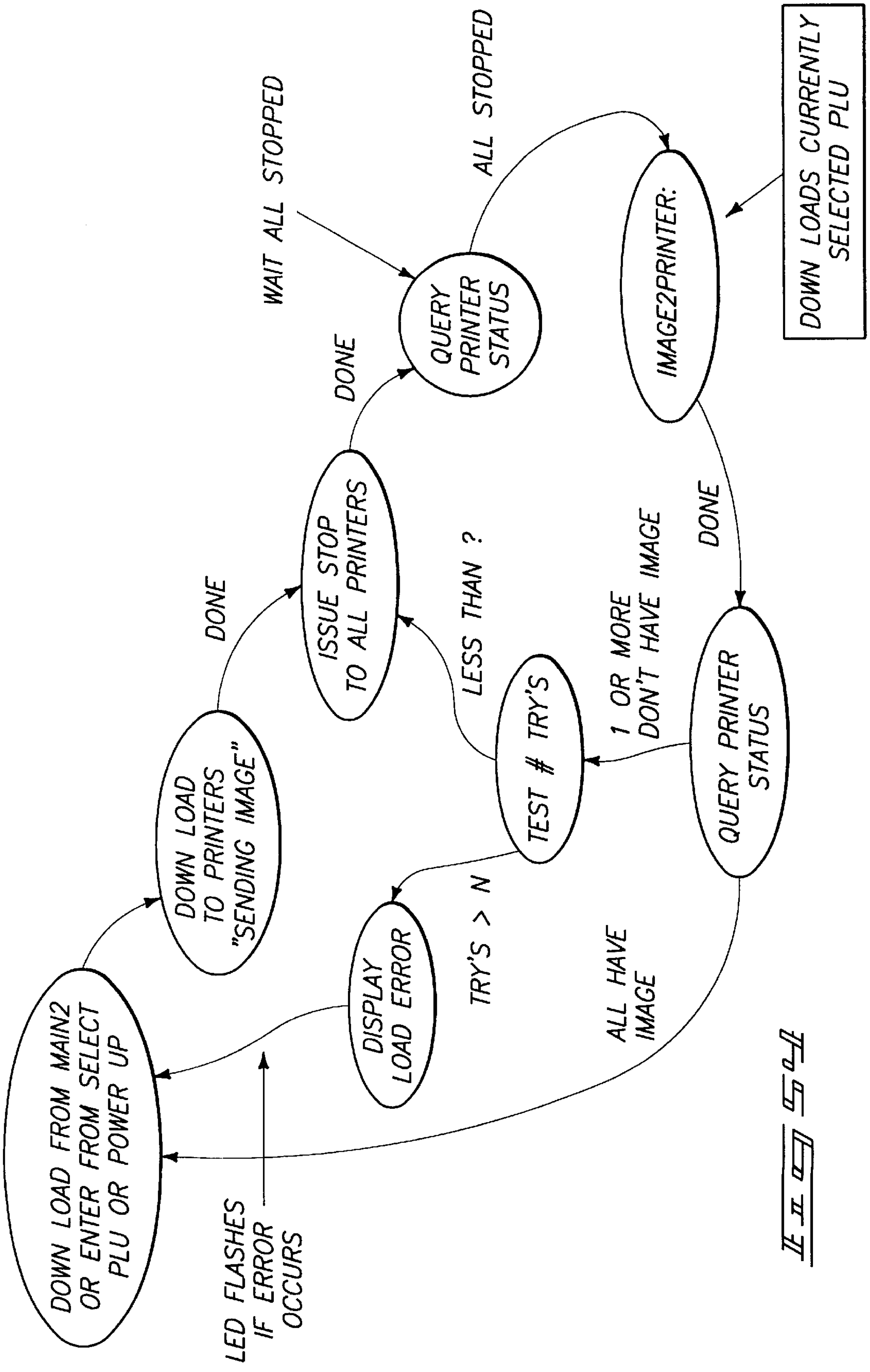
FIG. 57 is a general state diagram depicting an "ADJUST IMAGE PLACEMENT ON LABELS" operating program implementation, and illustrating the various operating states realized by the automated labelling machine control system when adjusting image placement of printed information on individual labels, such as the printed label depicted in FIG. 4.

FIG. 57 illustrates an "ADJUST IMAGE PLACEMENT ON LABELS" software routine for the automated labelling machine. The operating states required to select printers are shown, then adjust image placement on each selected printer via use of the arrow keys corresponding to the input keys of keypad 158 (of FIG. 6). The transition between operating states is shown by arrows that are labelled with the input key labels shown on keypad 158 (of FIG. 6). Accordingly, printed information, or images, can be placed accurately so as to produce a desired result via keyboard 15.8 (of FIG. 6) so as to produce print information 108 and 110 (of FIG. 4).

Figure 58:
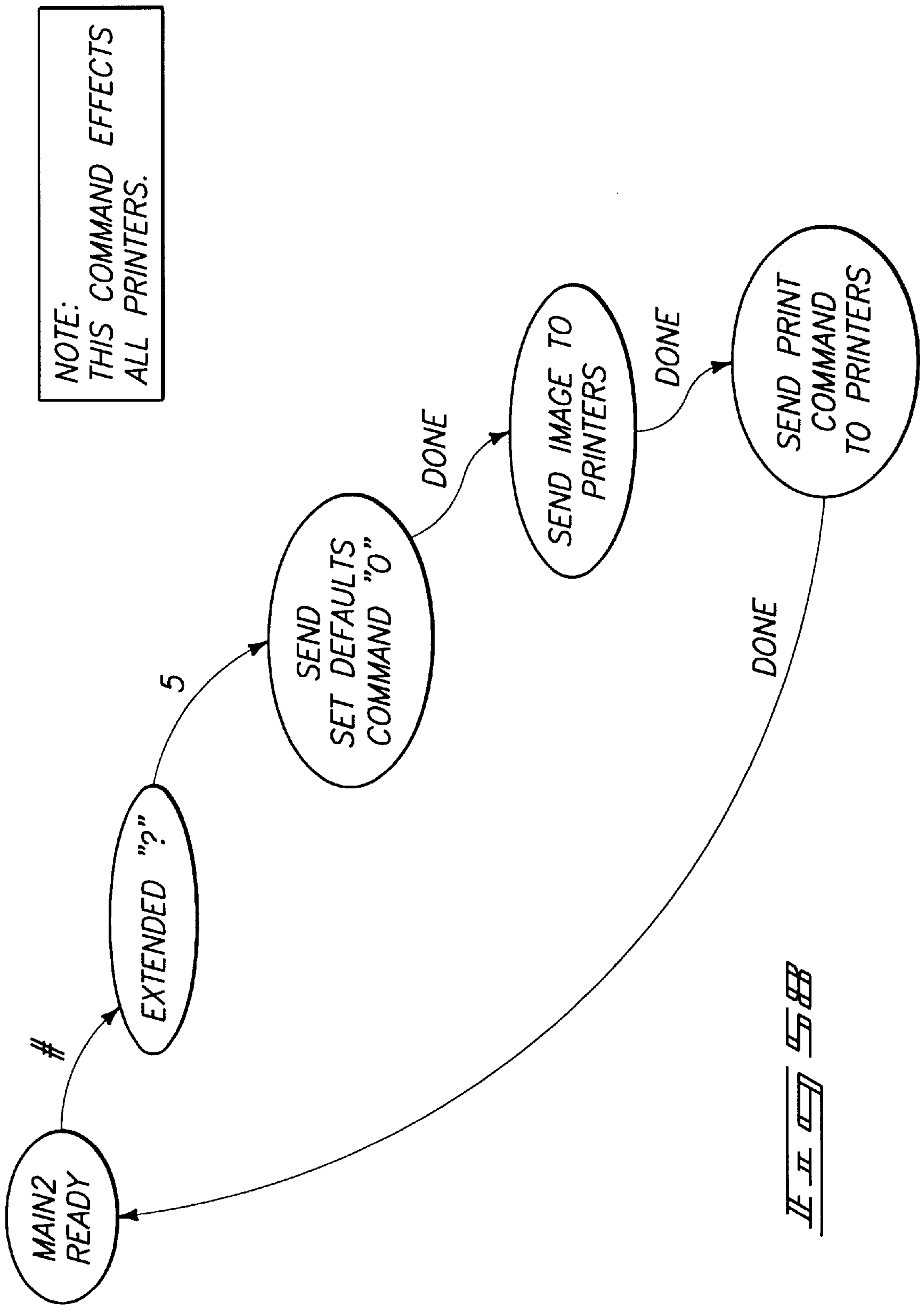
FIG. 58 is a general state diagram depicting a "SET DEFAULT IMAGE PLACEMENT ON LABELS" operating program implementation, and illustrating the various operating states realized by the automated labelling machine control system for setting a default image placement of printed information onto labels for all printers such as the printed label depicted in FIG. 4.

FIG. 58 illustrates a "SET DEFAULT IMAGE PLACEMENT ON LABELS" software routine for the automated labelling machine. State diagrams depict the transition between the "MAIN2" state to other states which triggers the sending of an image to printers such that a test print command is delivered to all printers for printing and verification by a user. The transition between states is depicted by arrows which are identified by the input key labels illustrated on keyboard 158 as shown on FIG. 6.

Figure 59:
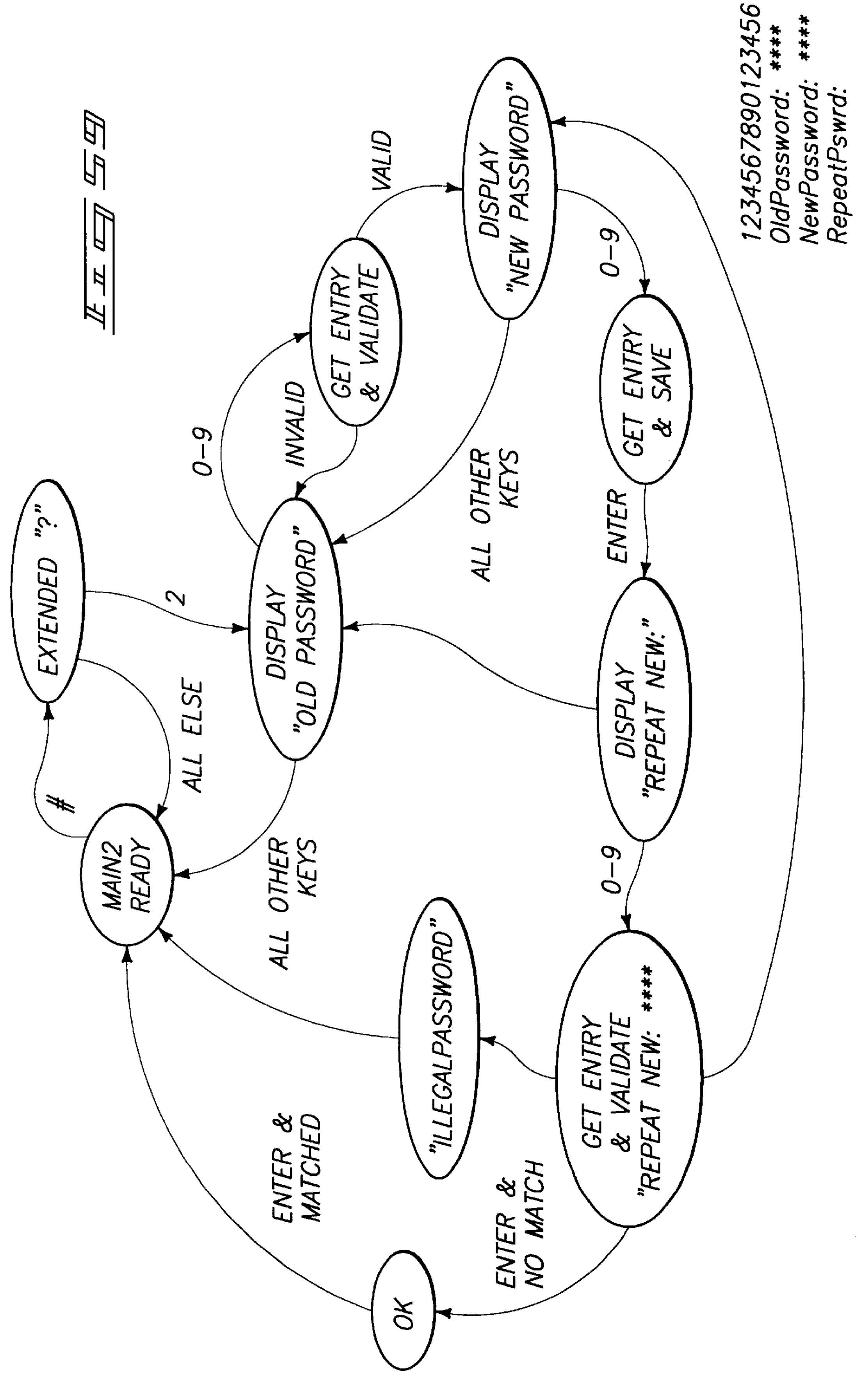
FIG. 59 is a general state diagram depicting a "PASSWORD CHANGE" operating program implementation, and illustrating the various operating states realized by the automated labelling machine control system when changing a user password.

FIG. 59 illustrates a "PASSWORD CHANGE" software routine for the automated labelling machine. State diagrams depict the transition between the "MAIN2" state and the "EXTENDED ?" state, and various states relating to the entry, display and verification of a user password when gaining access to the control system implemented by the electronics and software of Applicant's invention. The transition between states is depicted by arrows which are labelled by input key labels shown for each input key depicted on keyboard 158 of FIG. 6.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A labelling machine, comprising:

a peel plate assembly including a peel plate to deliver carrier-supported labels to articles;

a sensor associated with the peel plate to detect movement of the peel plate when an article engages the peel plate during delivery of a label to the article; and processing circuitry configured to receive an output signal from the sensor and control label delivery in response to the output signal.

2. The labelling machine of claim 1 wherein the sensor comprises a Hall-effect sensor, a magnetic marker is carried by one of the peel plate and a stationary member of the machine, and the Hall-effect sensor is carried by another of the peel plate and the stationary member, wherein the Hall-effect sensor is configured to detect one of relative movement and timing of movement of the peel plate by detecting relative movement between the sensor and the magnetic marker.

3. The labelling machine of claim 2 wherein the magnetic marker is carried by the peel plate, the Hall-effect sensor is carried by a stationary base plate that supports the peel plate, and movement of the peel plate relative to the base plate generates an analog signal from the Hall-effect sensor that is detectable by the processing circuitry.

4. The labelling machine of claim 1 wherein the peel plate is carried for pivotal movement in relation with the sensor, wherein an output signal from the sensor corresponds with detected movement of the peel plate, and wherein the processing circuitry receives the output signal and controls label delivery in response to the output signal.

5. The labelling machine of claim 1 further comprising a drive motor configured to move carrier-supported labels over the peel plate for delivery from the peel plate to individual articles, wherein the processing circuitry is operative to control advancement and delivery of labels responsive to detected movement of the peel plate.

6. The labelling machine of claim 1 wherein the sensor comprises an analog sensor that generates an analog output signal, and further comprising a digital-to-analog (D/A) converter operative to convert the analog output signal to a digital signal for delivery to the processing circuitry.

7. The labelling machine of claim 1 wherein the processing circuitry controls the timing of label advancement for presentment to an article on the peel plate in response to the output signal.

8. The labelling machine of claim 1 further comprising a threshold detector operative to detect changes in the output signal indicative of contact of the peel plate with an article.

9. The labelling machine of claim 1 wherein the peel plate is pivotally supported from a support base, tray-supported articles are moved to co-act and displace the peel plate, and the sensor and processing circuitry cooperate to monitor and characterize variations in article contact with the peel plate, wherein the processing circuitry controls the timing with which labels are delivered to a delivery edge of the peel plate for delivery onto articles.

10. The labelling machine of claim 1 wherein the output signal corresponds with a displacement curve of the peel plate and the output signal is used by the processing circuitry to adjust label delivery to optimize positioning of a label onto an article.

11. The labelling machine of claim 1 wherein the output signal comprises a digital feedback signal provided to the processing circuitry, the processing circuitry is provided by a controller, and the controller monitors the feedback signal to optimize the feeding of a label from the peel plate onto an article.

12. A label transfer mechanism, comprising:

a support frame;

a peel plate carried for articulating movement relative to the support frame and operative to deliver labels from a carrier onto articles which co-act in engagement with the peel plate such that relative movement occurs between the peel plate and the support frame;

a sensor configured to detect relative movement between the peel plate and the support frame; and control circuitry communicating with the sensor and configured to receive an output signal from the sensor, and operative to controllably deliver labels in response to the output signal.

13. The label transfer mechanism of claim 12 further comprising a drive motor operatively coupled with the control circuitry, the control circuitry further operative to controllably activate the drive motor to move labels and a carrier over the peel plate and deliver labels to articles at least in part in response to the output signal.

14. The label transfer mechanism of claim 13 wherein the peel plate is pivotally carried by the support frame, the output signal is proportional to the relative displacement between the peel plate and the support frame, and wherein the control circuitry regulates operation of the drive motor such that the timing of label delivery from the peel plate to articles is correlated with the detected movement between the peel plate and the support frame caused by articles that have previously contacted the peel plate during application of labels to the articles.

15. The label transfer mechanism of claim 12 wherein the output signal comprises a feedback signal to the control circuitry, and the control circuitry monitors the feedback signal to optimize the feeding of labels from the peel plate to articles.

16. A labelling machine operable for applying carrier-supported labels for delivery to produce articles arranged in rows in a tray, comprising:

at least one label transfer mechanism operative to apply labels from a carrier onto produce articles;

memory operative to store print information;

a printer positioned upstream of the label transfer mechanism and operative to print user-configurable print information;

control circuitry electrically coupled to the printer and the memory, and operative to configure the printer to print user-configurable print information;

a user interface signal-coupled to the control circuitry and memory, and operable by a user to select the user-configurable print information to be printed by the printer; and a sensor associated with a peel plate of the peel plate assembly, and operative to detect displacement of the peel plate with a produce article during label delivery thereto.

17. The labelling machine of claim 16 wherein the sensor generates an output signal corresponding to a displacement curve of the peel plate, such output signal received by the control circuitry and usable to adjust timing when labels are advanced for application to produce articles.

* * * * *

UNITED STATES PATENT AND TRADEMARK OFFICE

CERTIFICATE OF CORRECTION

PATENT NO. : 6,179,030 B1
DATED : January 30, 2001
INVENTOR(S) : William R. Rietheimer It is certified that error appears in the above-identified patent and that said Letters Patent is hereby corrected as shown below:

Column 2,
Line 43, delete "separate out", and insert -- separated out --.

Column 8,
Lines 60-61, delete "to engaged the", and insert -- to engage the --.

Column 12,
Line 62, delete "accurately rolled with", and insert -- accurately controlled with --.

Column 13,
Line 21, delete "Ser. No. 091070,941", and insert -- Ser. No. 09/070,941 --.

Column 20,
Line 56, delete "upward 0.1 mm", and insert -- upward .1 mm --.

Column 25,
Lines 53-54, delete "and a "MAINI" loop", and insert -- and a "MAIN1" loop --.

Column 25,
Lines 64-65, delete "from the "MAIN 1" loop", and insert -- from the "MAIN1" loop --.

Column 26,
Lines 15-16, delete "to the "EXTENDED?" state by", and insert -- to the "EXTENDED ?" state by --.

Column 27,
Line 36, delete "via keyboard 15.8", and insert -- via keyboard 158 --.

Signed and Sealed this

Second Day of October, 2001

*Attest:*

Nicholas P. Godici

NICHOLAS P. GODICI

*Attesting Officer* *Acting Director of the United States Patent and Trademark Office*